United States Patent
Dong et al.

(10) Patent No.: US 12,202,215 B2
(45) Date of Patent: Jan. 21, 2025

(54) SYSTEM AND METHOD FOR MANUFACTURING CROSS-PLY PRE-IMPREGNATED MATERIAL

(71) Applicants: The Boeing Company, Arlington, VA (US); University of Washington, Seattle, WA (US)

(72) Inventors: Shuonan Dong, Seattle, WA (US); Silas L. Studley, Redmond, WA (US); Samuel F. Pedigo, Lake Forest Park, WA (US); Nathan A. Secinaro, Seattle, WA (US); Lukas Wavrin, Seattle, WA (US); Kevin Hsu, Seattle, WA (US); James Hutchinson, Seattle, WA (US); Connor Burch, Kaneohe, HI (US); Nini Hong, Renton, WA (US); Devin Ide, Seattle, WA (US); Lucky Singh, Seatac, WA (US); Santosh Devasia, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/416,089

(22) Filed: Jan. 18, 2024

(65) Prior Publication Data
US 2024/0149538 A1 May 9, 2024

Related U.S. Application Data

(62) Division of application No. 17/655,155, filed on Mar. 16, 2022, now Pat. No. 11,919,256.
(Continued)

(51) Int. Cl.
*B29C 70/30* (2006.01)
*B29C 70/00* (2006.01)
(Continued)

(52) U.S. Cl.
CPC ............ *B29C 70/30* (2013.01); *B29C 70/545* (2013.01); *B29C 2793/0081* (2013.01); *B29K 2105/0881* (2013.01)

(58) Field of Classification Search
None
See application file for complete search history.

(56) References Cited

U.S. PATENT DOCUMENTS

| 4,531,992 A | 7/1985 | Eaton |
| 4,778,551 A | 10/1988 | Coffman |

(Continued)

FOREIGN PATENT DOCUMENTS

| DE | 102012111761 | 6/2014 |
| DE | 102017128336 | 5/2019 |

(Continued)

OTHER PUBLICATIONS

Accudyne Systems, web page describing "Variable-Angle, 2-Ply Laminator," available at <https://www.accudyne.com/composites-automation/cross-ply-fabric-lamination/variable-angle-2-ply-laminator/>, last accessed on Apr. 8, 2021.
(Continued)

*Primary Examiner* — Linda L Gray

(57) ABSTRACT

A method of manufacturing a backed cross-ply prepreg comprises cutting, using a cutting machine, a first continuous length of a unidirectional prepreg into first prepreg segments, each having an opposing pair of segment cut edges that are non-parallel to a lengthwise direction of the unidirectional prepreg. The method also includes picking up, using a pick-and-place system, the first prepreg segments off of the cutting machine, and placing the first prepreg segments in end-to-end relation onto a conveyor belt of an adhesion machine, and in an orientation such that the segment cut edges are generally parallel to a lengthwise direction of the conveyor belt. The method also includes
(Continued)

feeding, using the conveyor belt, the first prepreg segments to an adhesion station of the adhesion machine, and adhering, using the adhesion station, the first prepreg segments to a continuous length of a backing material.

20 Claims, 34 Drawing Sheets

Related U.S. Application Data

(60) Provisional application No. 63/181,082, filed on Apr. 28, 2021.

(51) Int. Cl.
*B29C 70/54* (2006.01)
*B29K 105/08* (2006.01)

(56) References Cited

U.S. PATENT DOCUMENTS

| | | |
|---|---|---|
| 5,824,178 A | 10/1998 | Shingu |
| 6,742,561 B2 | 6/2004 | Nam |
| 10,076,883 B2 | 9/2018 | Prebil |
| 2004/0155137 A1 | 8/2004 | Sharpe |
| 2017/0341315 A1 | 11/2017 | Amari |

FOREIGN PATENT DOCUMENTS

| | | |
|---|---|---|
| JP | H0416310 | 1/1992 |
| JP | H04122611 | 4/1992 |
| WO | WO2018088173 | 5/2018 |

OTHER PUBLICATIONS

EPO, Extended European Search Report, Application No. EP22168598, issued on Sep. 14, 2022.

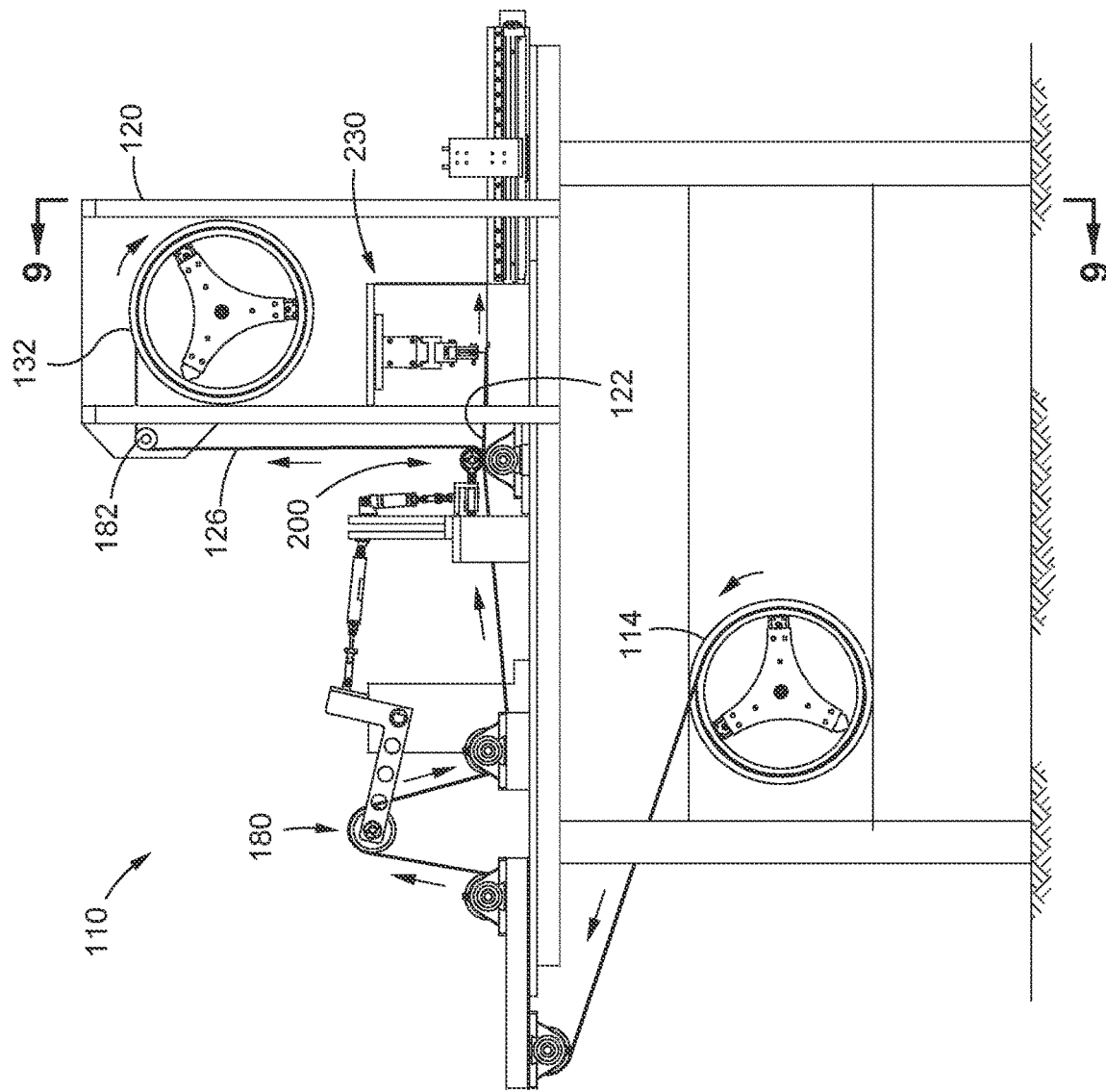
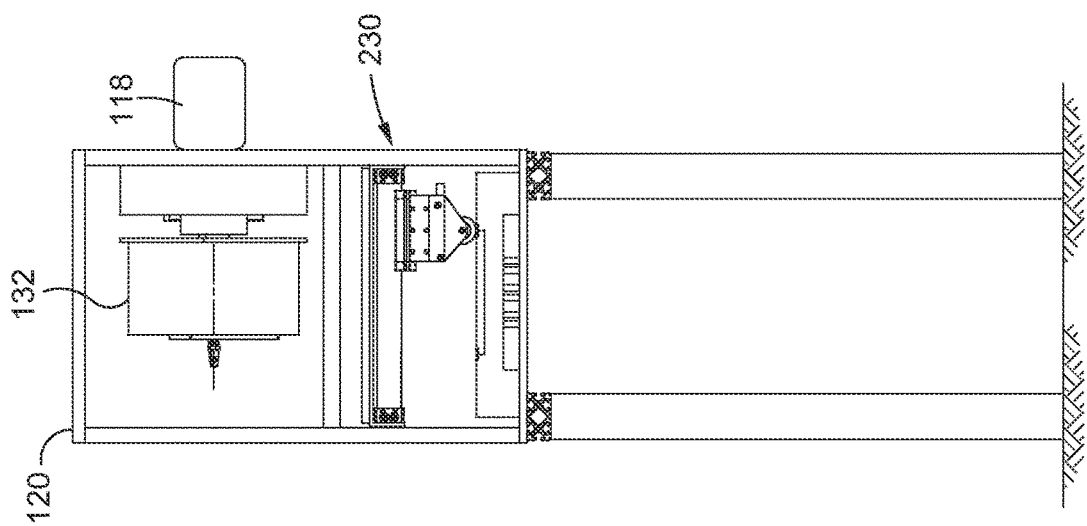
FIG. 8
FIG. 9

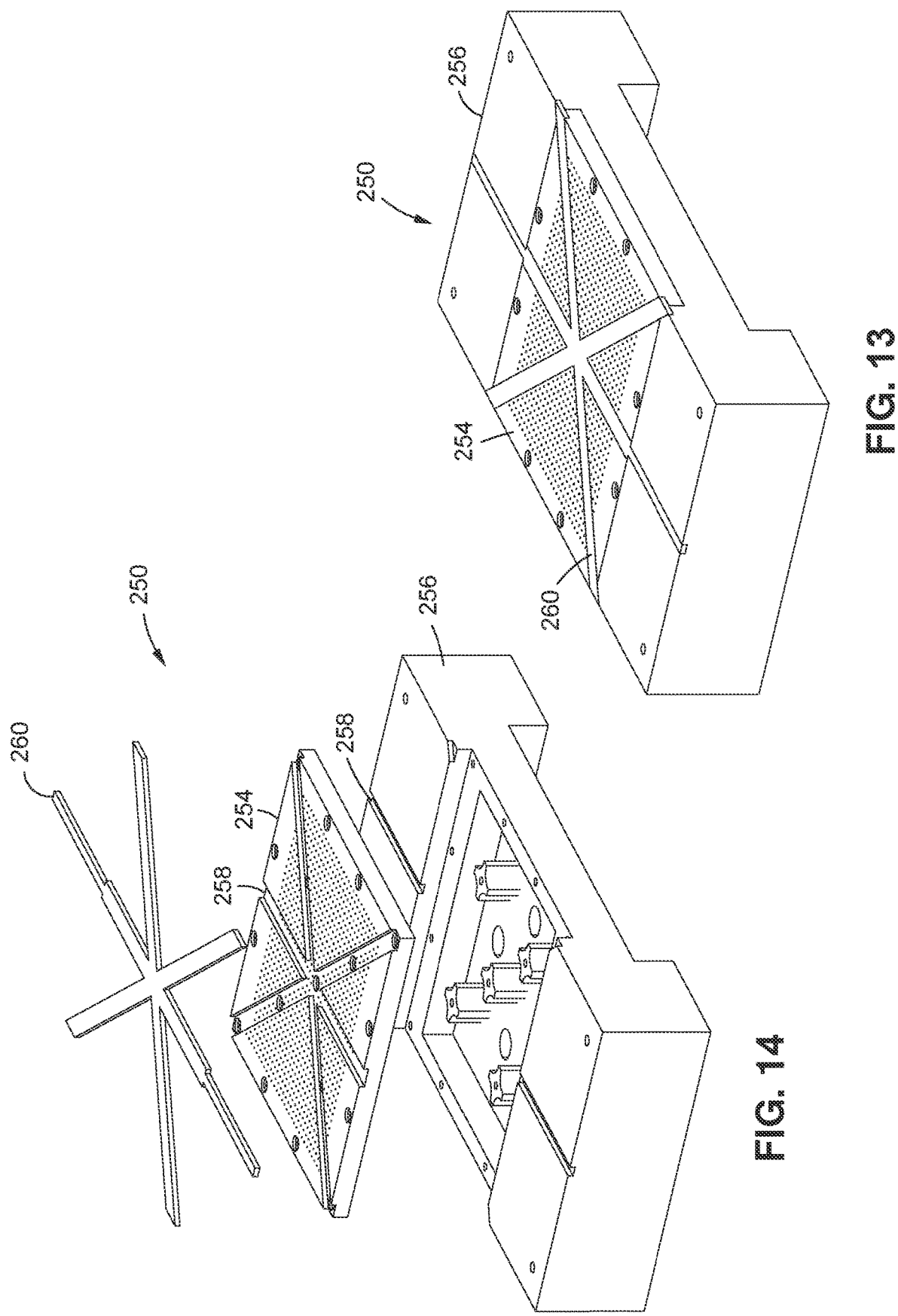

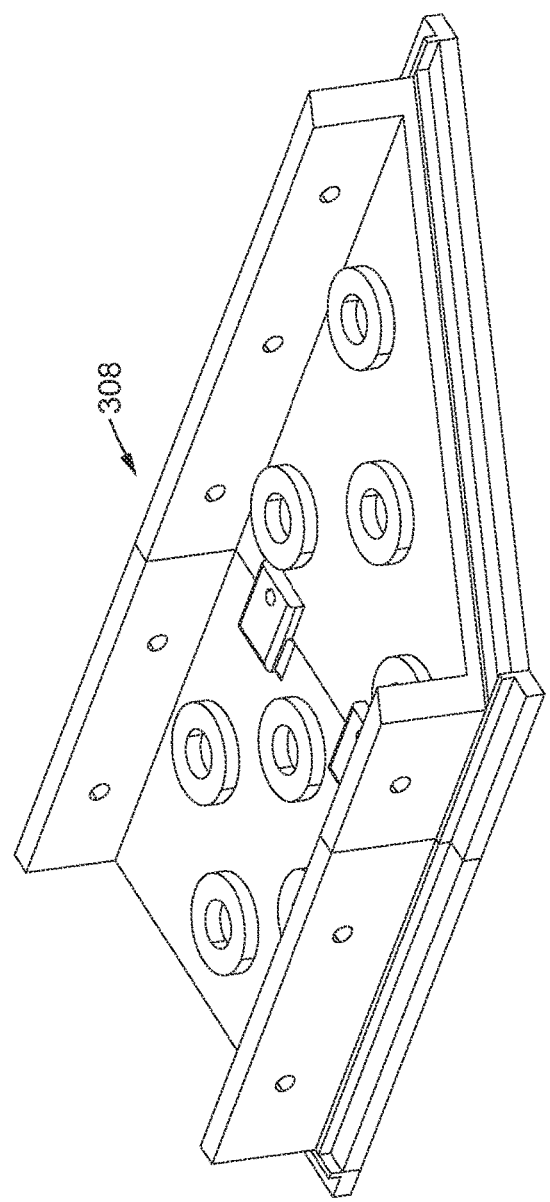
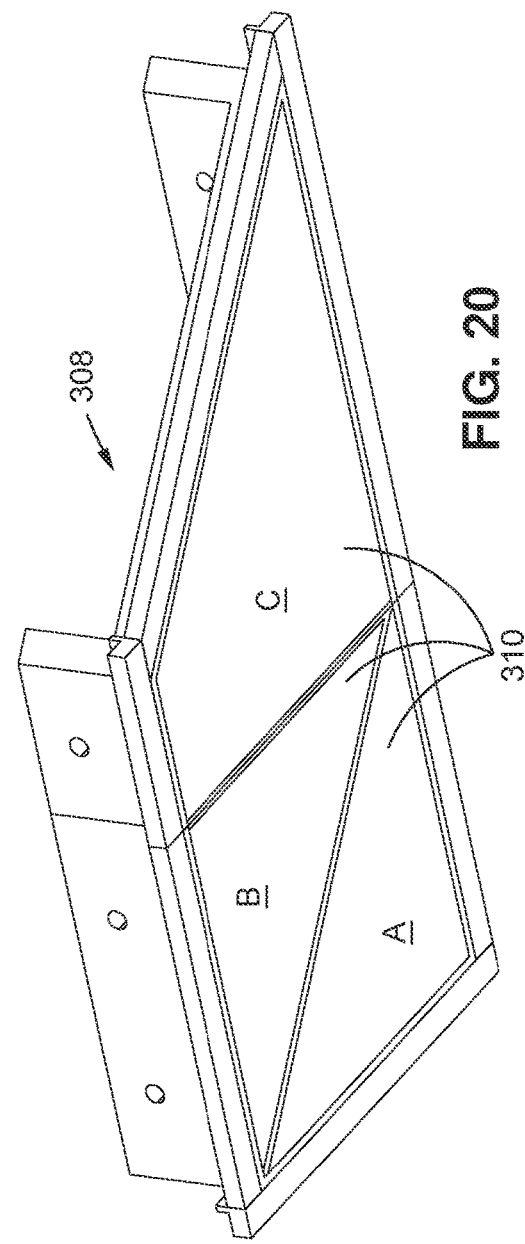
FIG. 19
FIG. 20

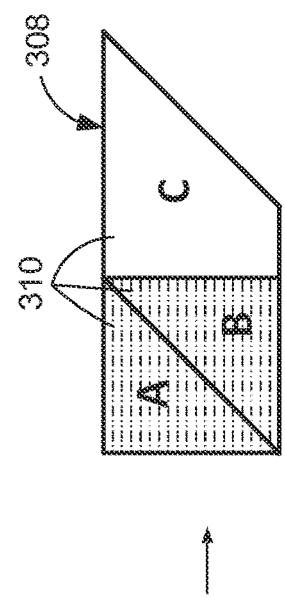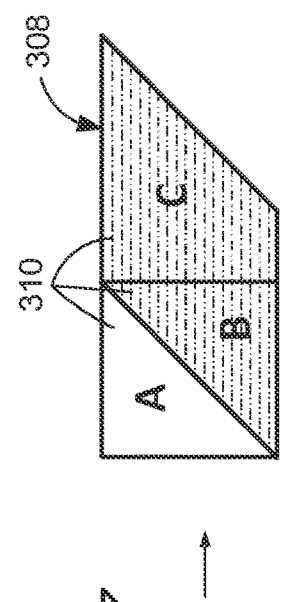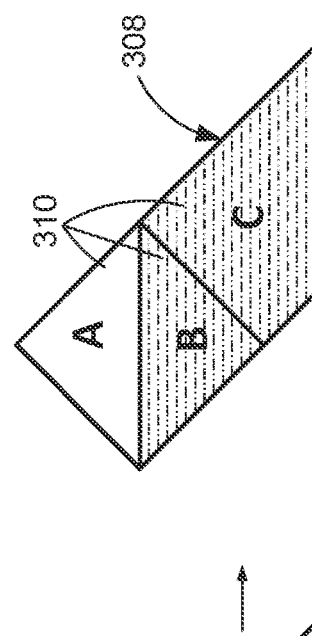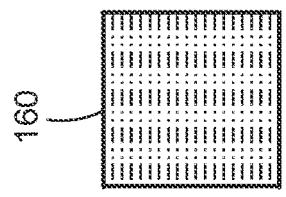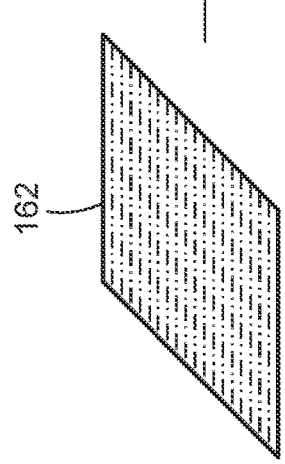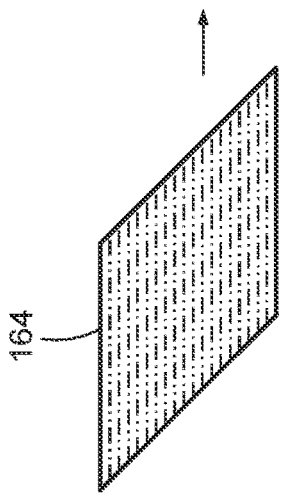
FIG. 21　　FIG. 22　　FIG. 23

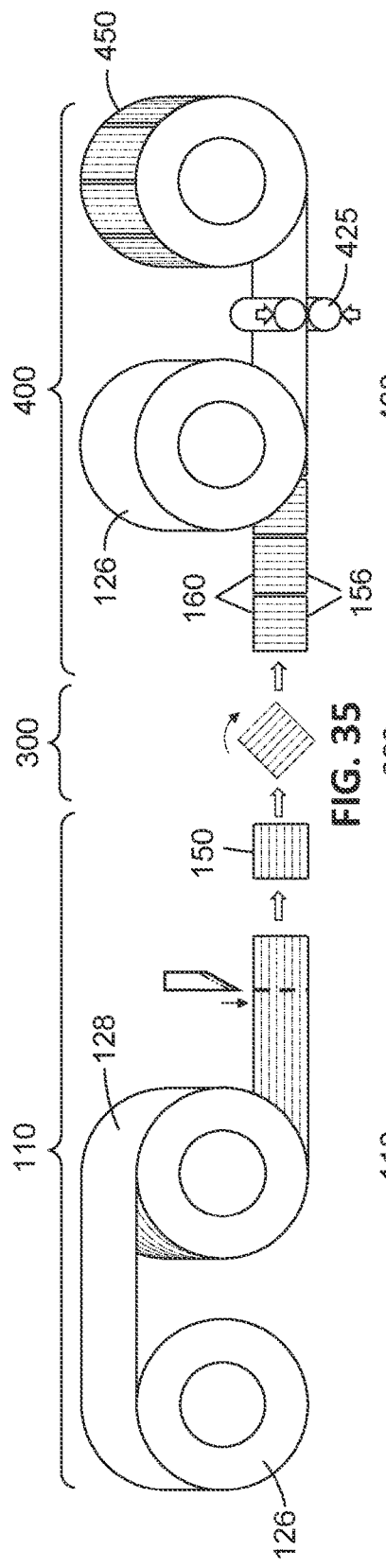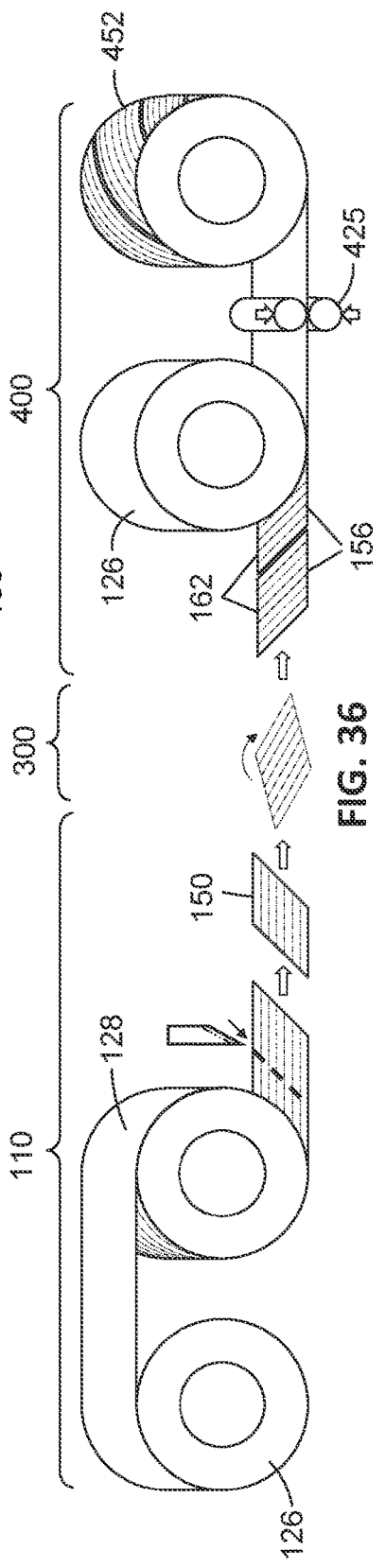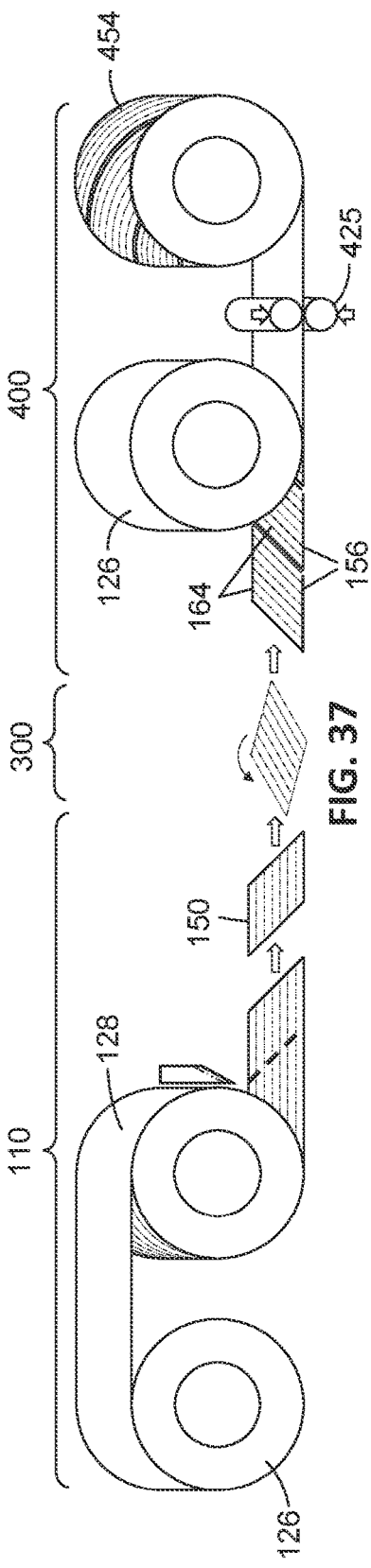

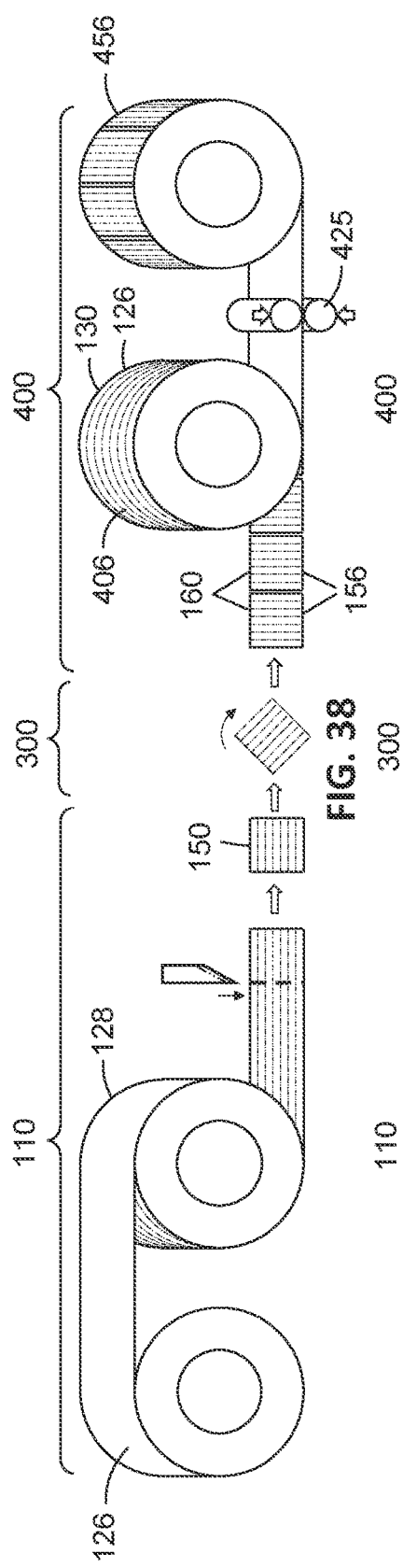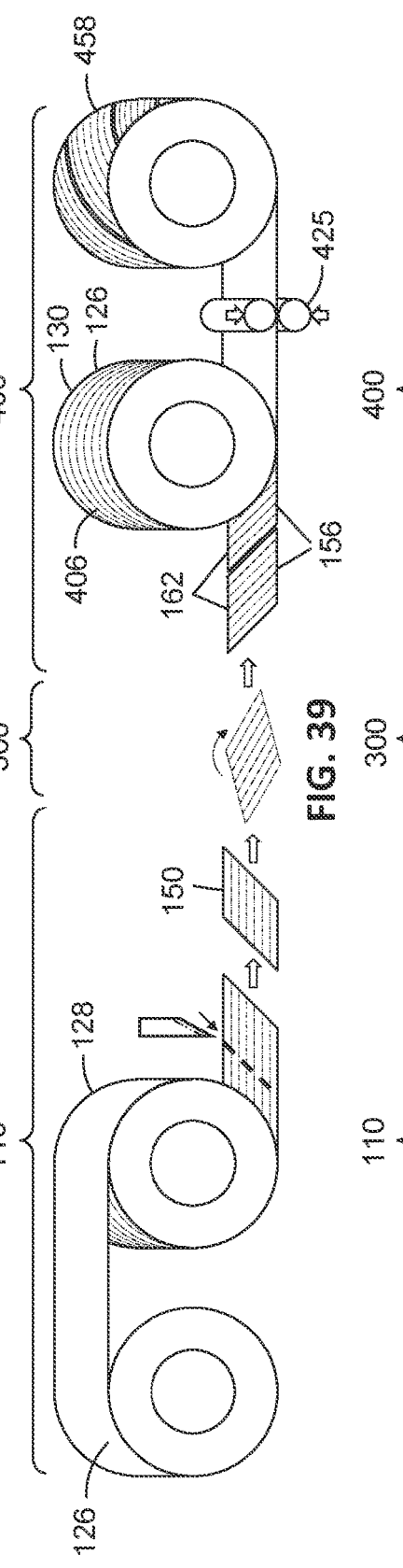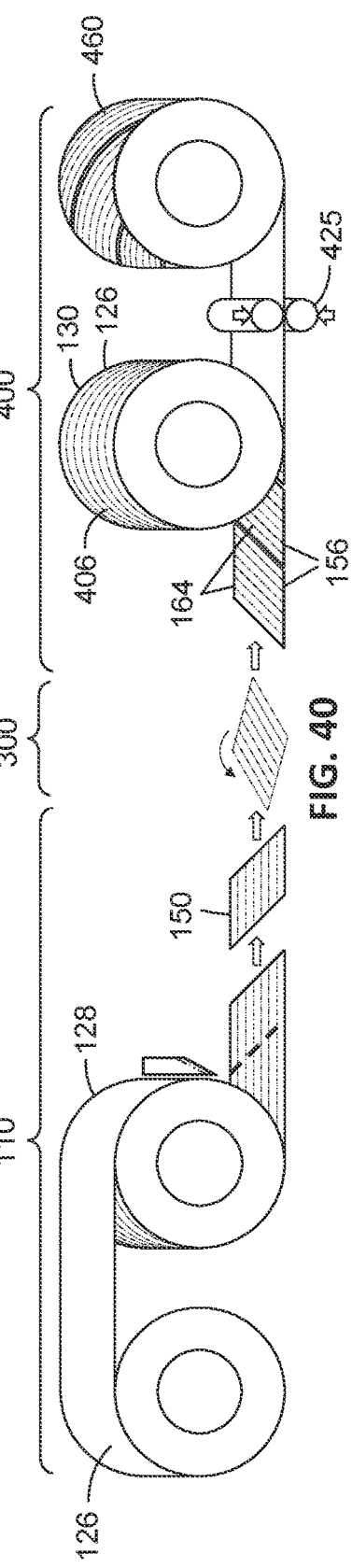

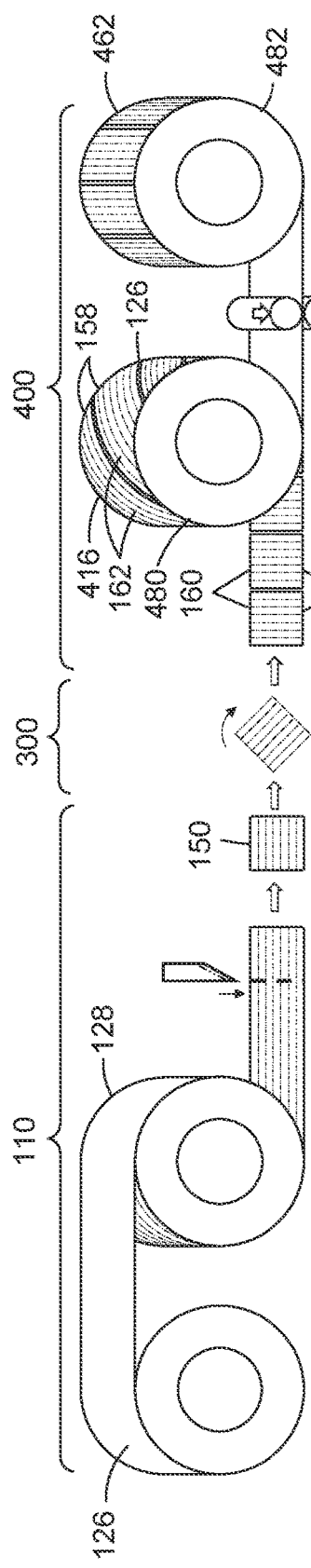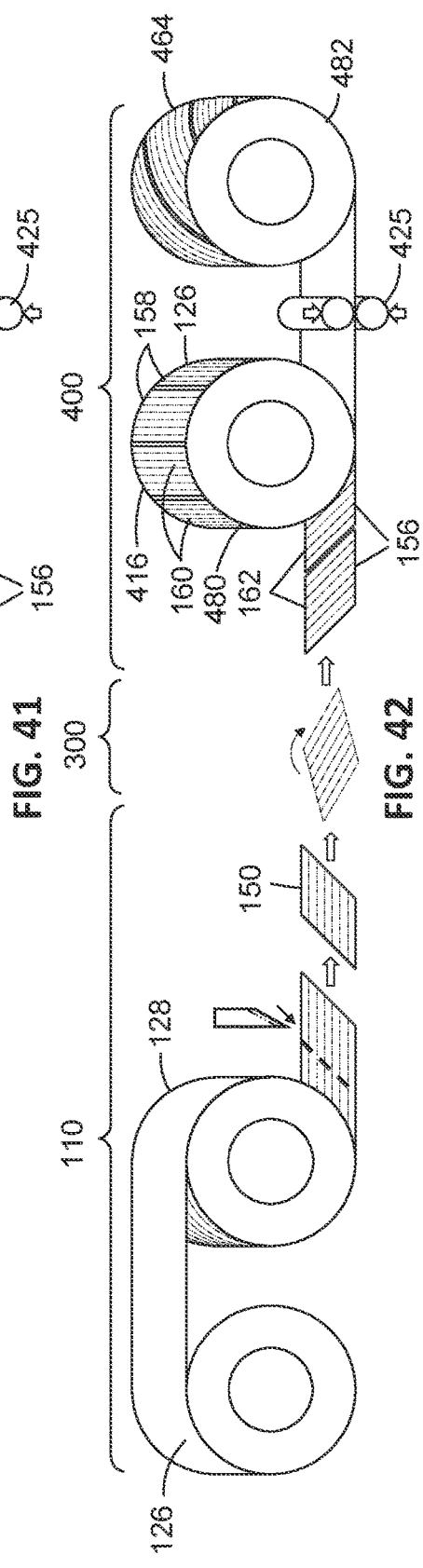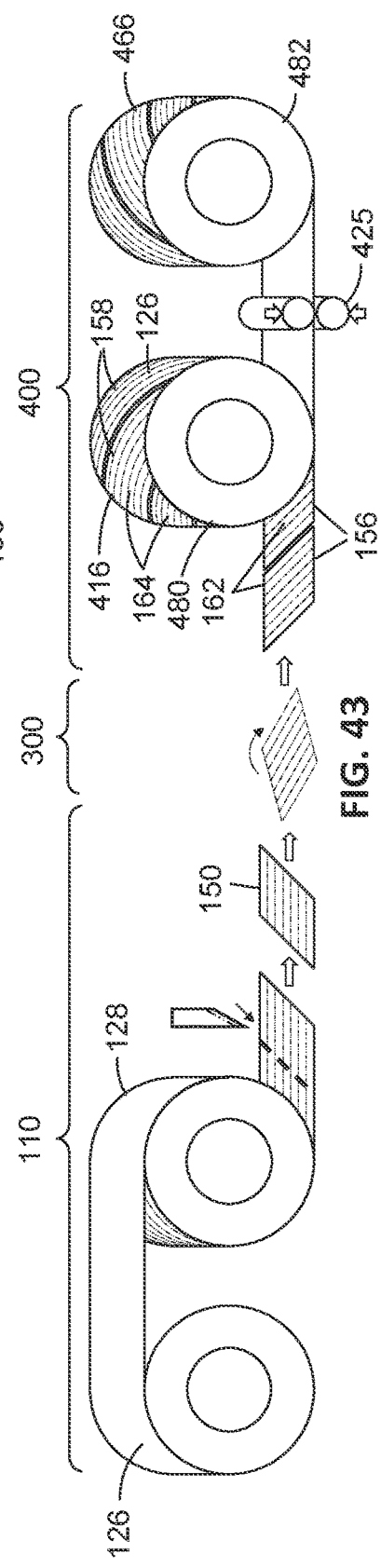

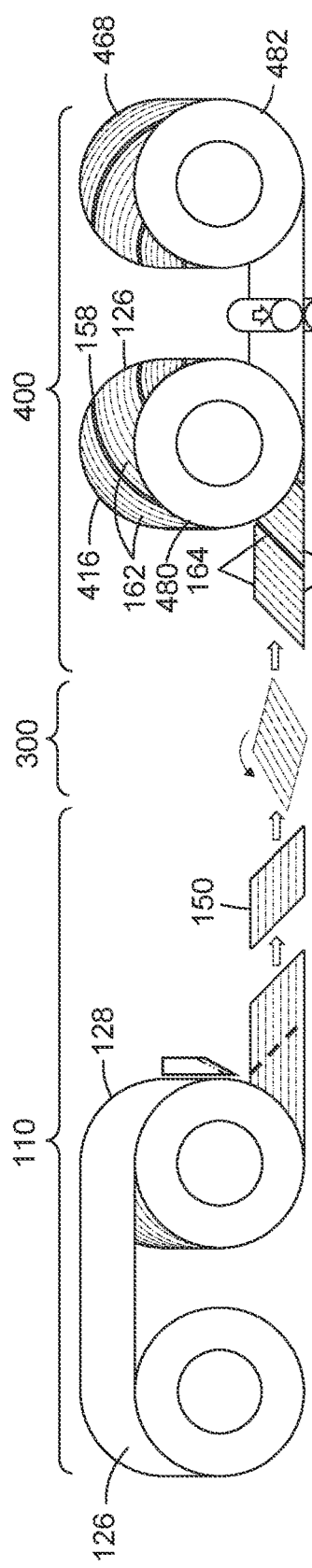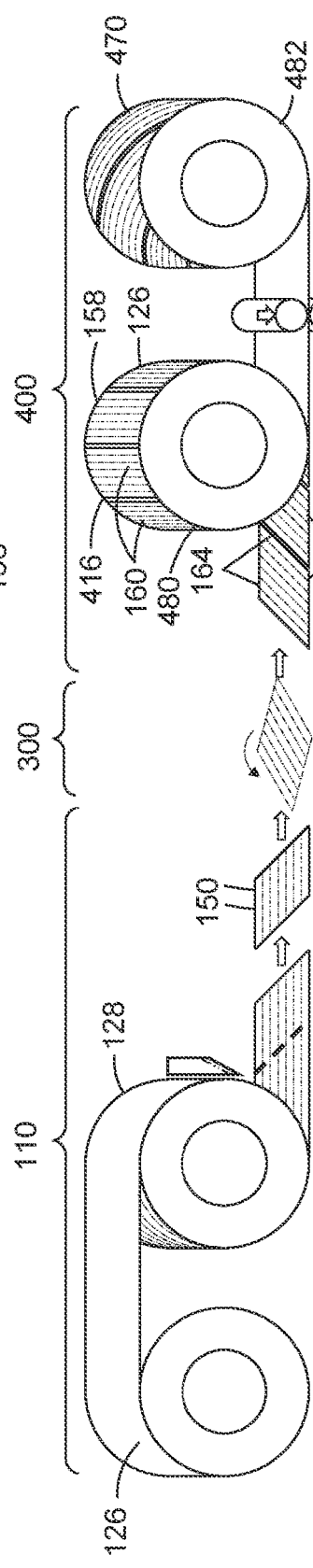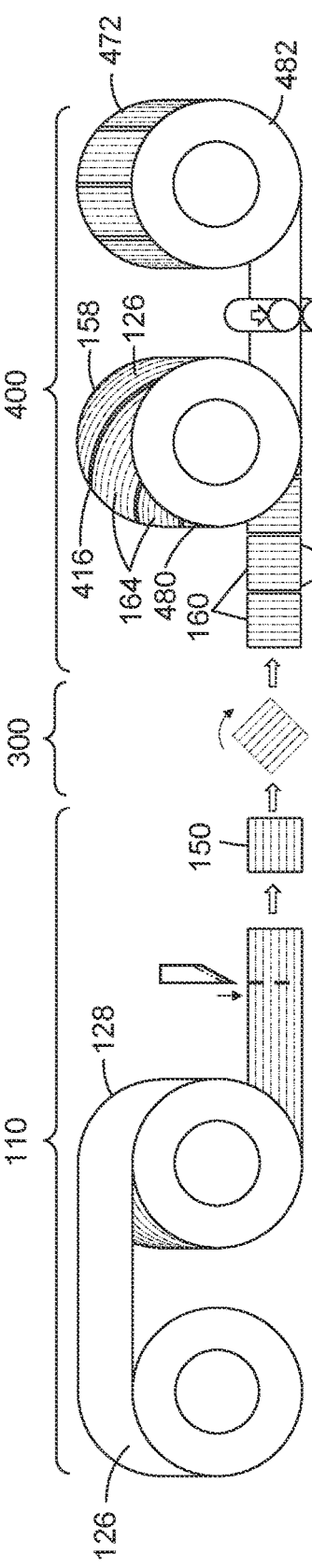

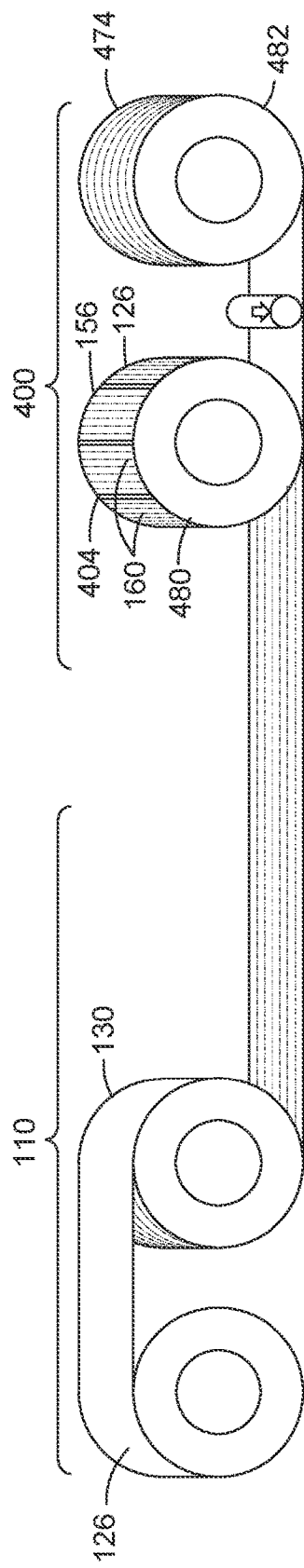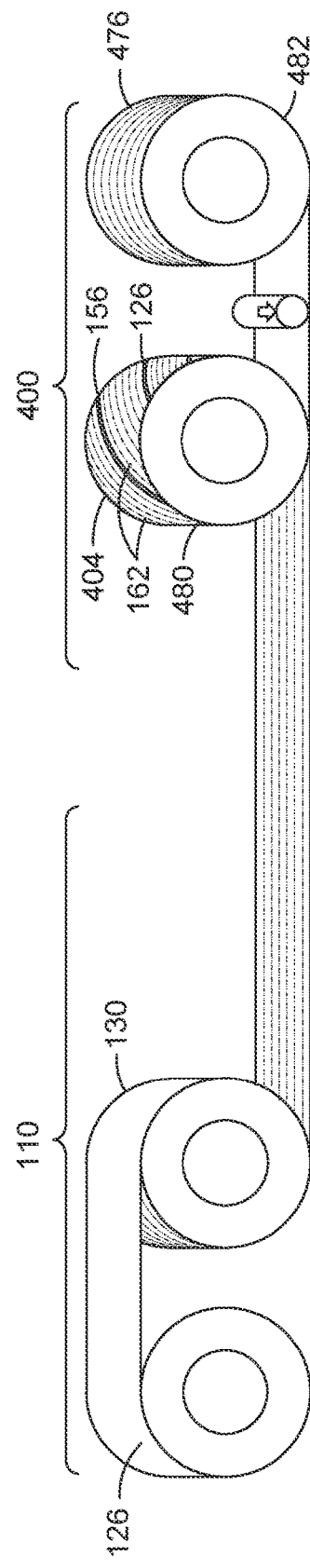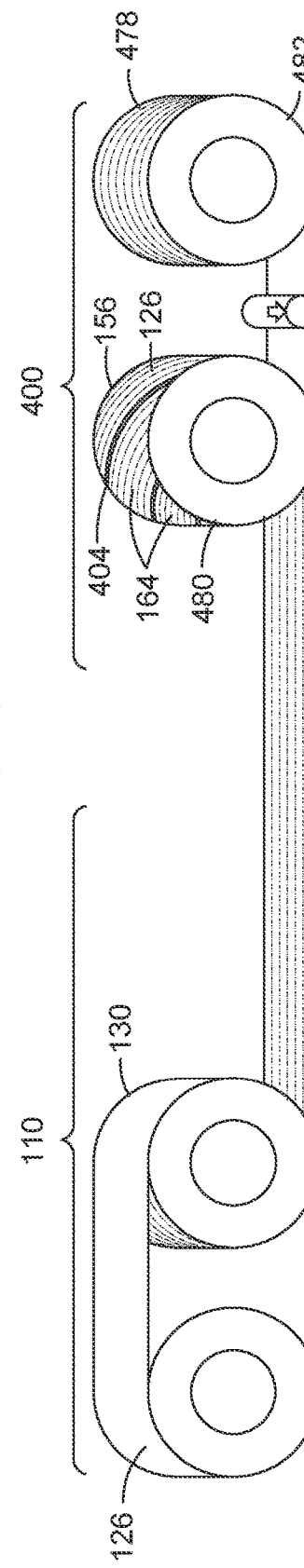

SYSTEM AND METHOD FOR MANUFACTURING CROSS-PLY PRE-IMPREGNATED MATERIAL

CROSS-REFERENCE TO RELATED APPLICATIONS

The present application is a Divisional Application claiming priority to pending U.S. Non-provisional application Ser. No. 17/655,155, entitled SYSTEM AND METHOD FOR MANUFACTURING CROSS-PLY PRE-IMPREGNATED MATERIAL, filed Mar. 16, 2022, and which is incorporated herein by reference in its entirety, and which claims priority to U.S. Provisional Application Ser. No. 63/181,082, entitled SYSTEM AND METHOD FOR MANUFACTURING CROSS-PLY PRE-IMPREGNATED MATERIAL, filed Apr. 28, 2021, and which is incorporated herein by reference in its entirety.

FIELD

The present disclosure relates generally to composite materials and, more particularly, to a system and method for automated manufacturing of a cross-ply pre-impregnated composite material.

BACKGROUND

The manufacturing of a composite part typically involves the lamination of multiple plies of fiber-reinforced polymer matrix material. Each layer is comprised of reinforcing fibers that are pre-impregnated with resin (e.g., prepreg). The fibers in each ply of a composite part are typically oriented at a different fiber angle than the fiber angle of adjacent plies, as a means to optimize the strength and stiffness properties of the composite part, and to improve the quality of the cured composite part. For example, a composite part may include 0-degree plies, and cross-directional plies which typically comprise −45-degree plies, +45-degree plies, and 90-degree plies.

Unidirectional prepreg is a type of prepreg in which the fibers are oriented parallel to the lengthwise direction of the material (i.e., a 0-degree fiber angle). Unidirectional prepreg tape is available in continuous lengths, and is supported on a backing layer and is wound on a roll for use in automated layup equipment. Rolls of unidirectional prepreg tape are available in different widths. For example, unidirectional prepreg tape is typically available in widths of up to 12 inches or more for use in an automated tape laying (ATL) machine.

ATL machines are very efficient in laying up long courses of unidirectional prepreg tape to form 0-degree plies of a composite part. However, the use of unidirectional prepreg tape in an ATL machine to lay up short courses (e.g., less than 5 feet) of cross-directional plies of a long composite part requires that the ATL machine traverses the part numerous times as each cross-directional ply is laid up. The numerous stops and starts required of the ATL machine for laying up each cross-directional ply significantly increases the total amount of time required to complete the layup process. In addition, the ATL machine requires excessive turn-around space at the end of each cross-directional ply.

As can be seen, there exists a need in the art for a system and method for manufacturing continuous lengths of cross-directional prepreg material on a backing layer for use in an ATL machine, to thereby avoid the need for laying up numerous short courses traversing a composite part. Ideally, the system is capable of manufacturing multi-layer cross-ply prepreg material, such as dual-layer cross-ply prepreg (or triple-layer cross-ply prepreg, or quadruple-layer cross-ply prepreg, etc.), to further reduce the amount of time required for laying up the cross-directional plies of a composite part.

SUMMARY

The above-noted needs associated with cross-ply prepreg material are addressed by the present disclosure, which provides a manufacturing system for manufacturing a backed cross-ply prepreg. The manufacturing system includes a cutting machine, an adhesion machine, and a pick-and-place system. The cutting machine includes a cutting station configured to cut a continuous length of a unidirectional prepreg into prepreg segments. Each prepreg segment has an opposing pair of segment cut edges that are non-parallel to a lengthwise direction of the unidirectional prepreg. The adhesion machine has a conveyor belt and an adhesion station. The pick-and-place system is configured to pick up the prepreg segments from the cutting machine, and place the prepreg segments in end-to-end relation on the conveyor belt, and in an orientation such that the segment cut edges are generally parallel to a lengthwise direction of the conveyor belt. The conveyor belt is configured to feed the prepreg segments to the adhesion station. The adhesion station is configured to adhere the prepreg segments to a continuous length of a backing material, thereby transferring the prepreg segments from the conveyor belt to the backing material, and resulting in a continuous length of a backed cross-ply prepreg.

Also disclosed is a method of manufacturing a backed cross-ply prepreg. The method includes cutting, using a cutting station of a cutting machine, a first continuous length of a unidirectional prepreg into first prepreg segments. As mentioned above, each prepreg segment has an opposing pair of segment cut edges that are non-parallel to a lengthwise direction of the unidirectional prepreg. The method also includes picking up, using a pick-and-place system, the first prepreg segments off of the cutting machine, and placing the first prepreg segments in end-to-end relation onto a conveyor belt of an adhesion machine, and in an orientation such that the segment cut edges are generally parallel to a lengthwise direction of the conveyor belt. In addition, the method includes feeding, using the conveyor belt, the first prepreg segments to an adhesion station of the adhesion machine, and adhering, using the adhesion station, the first prepreg segments to a continuous length of a backing material.

Additionally disclosed is a further method of manufacturing a backed cross-ply prepreg, comprising cutting, using a cutting machine, a first continuous length of a unidirectional prepreg into first prepreg segments. In addition, the method includes picking up, using a pick-and-place system, the first prepreg segments off of the cutting machine, and placing the first prepreg segments in end-to-end relation onto a conveyor belt of an adhesion machine, and in an orientation such that the segment cut edges are generally parallel to a lengthwise direction of the conveyor belt. Furthermore, the method includes feeding, using the conveyor belt, the first prepreg segments to an adhesion station of the adhesion machine. The method also includes adhering, using the adhesion station, the first prepreg segments to a continuous length of a backing layer, to thereby form a continuous length of an intermediate backed cross-ply prepreg. Additionally, the method includes adhering, using the adhesion station, either a second continuous length of a unidirectional prepreg or an end-to-end series of second prepreg segments to the first prepreg segments of the intermediate backed cross-ply prepreg, thereby resulting in a final backed cross-ply prepreg.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a side view of an example of the cutting machine in an arrangement wherein the backing layer collection drum is located proximate the cutting station;

FIG. 9 is a sectional view taken along line 9-9 of FIG. 8;

FIG. 13 is a perspective view of an example of a cutting surface configured to support the unidirectional prepreg during cutting by the cutting device;

FIG. 14 is an exploded perspective view of the example of the cutting surface of FIG. 13, illustrating an upper plate, a lower plate, and a sacrificial cutting material configured to be inserted into the grooves formed in the upper plate and lower plate;

FIG. 19 is a top-down perspective view of the vacuum end effector of FIG. 18;

FIG. 20 is a bottom-up perspective view of the vacuum end effector of FIG. 18, and illustrating three vacuum zones (zones A, B, and C) that are independently activatable with vacuum pressure for engaging different shapes of the prepreg segment;

FIG. 21 is a top schematic view of the vacuum end effector of FIGS. 18-20, and showing zones A and B simultaneously activated with vacuum pressure for vacuum pickup of a 90-degree prepreg segment;

FIG. 22 is a top schematic view of the vacuum end effector showing zones B and C simultaneously activated with vacuum pressure for vacuum pickup of a −45-degree prepreg segment;

FIG. 23 is a top schematic view of the vacuum end effector rotated 45° relative to the orientation in FIG. 21, and showing zones A and B simultaneously activated with vacuum pressure for vacuum pickup of a +45-degree prepreg segment;

FIG. 35 is a schematic illustration of 90-degree prepreg segments being cut from a continuous length of unidirectional prepreg via the cutting machine, re-oriented via the pick-and-place system, and adhered via the adhesion machine to a backing layer that is initially devoid of prepreg material;

FIG. 36 is a schematic illustration of −45-degree prepreg segments being cut from a continuous length of unidirectional prepreg, and adhered to a backing layer initially devoid of prepreg material;

FIG. 37 is a schematic illustration of +45-degree prepreg segments being cut from a continuous length of unidirectional prepreg, and adhered to a backing layer initially devoid of prepreg material;

FIG. 38 is a schematic illustration of 90-degree prepreg segments being cut from a first continuous length of unidirectional prepreg, re-oriented, re-oriented, and adhered to a second continuous length of a unidirectional prepreg (i.e., 0-degree prepreg) backed by a backing layer;

FIG. 39 is a schematic illustration of −45-degree prepreg segments being cut from a first continuous length of unidirectional prepreg, and adhered to a second continuous length of a unidirectional prepreg backed by a backing layer;

FIG. 40 is a schematic illustration of +45-degree prepreg segments being cut from a first continuous length of unidirectional prepreg, and adhered to a second continuous length of a unidirectional prepreg backed by a backing layer;

FIG. 41 is a schematic illustration of 90-degree prepreg segments being cut from a continuous length (i.e., a roll) of unidirectional prepreg (i.e., 0-degree prepreg), re-oriented, and adhered to a continuous length of a backed cross-ply prepreg comprising a series of −45-degree prepreg segments backed by a backing layer;

FIG. 42 is a schematic illustration of −45-degree prepreg segments being cut from a continuous length of unidirectional prepreg, and adhered to a continuous length of a backed cross-ply prepreg comprising a series of 90-degree prepreg segments backed by a backing layer;

FIG. 43 is a schematic illustration of −45-degree prepreg segments being cut from a first continuous length of unidirectional prepreg, and adhered to a continuous length of a backed cross-ply prepreg comprising a series of +45-degree prepreg segments backed by a backing layer;

FIG. 44 is a schematic illustration of +45-degree prepreg segments being cut from a first continuous length of unidirectional prepreg, and adhered to a continuous length of a backed cross-ply prepreg comprising a series of −45-degree prepreg segments backed by a backing layer;

FIG. 45 is a schematic illustration of +45-degree prepreg segments being cut from a first continuous length of unidirectional prepreg, and adhered to a continuous length of a backed cross-ply prepreg comprising a series of 90-degree prepreg segments backed by a backing layer;

FIG. 46 is a schematic illustration of 90-degree prepreg segments being cut from a first continuous length of unidirectional prepreg, and adhered to the continuous length of a backed cross-ply prepreg comprising a series of +45-degree prepreg segments backed by a backing layer;

FIG. 47 is a schematic illustration of a continuous length of unidirectional prepreg (i.e., 0-degree prepreg) being adhered to a continuous length of a backed cross-ply prepreg comprising a series of 90-degree prepreg segments backed by a backing layer;

FIG. 48 is a schematic illustration of a continuous length of unidirectional prepreg being adhered to a continuous length of a backed cross-ply prepreg comprising a series of −45-degree prepreg segments backed by a backing layer;

FIG. 49 is a schematic illustration of a continuous length of unidirectional prepreg being adhered to a continuous length of a backed cross-ply prepreg comprising a series of +45-degree prepreg segments backed by a backing layer.

DETAILED DESCRIPTION

Figure 1:
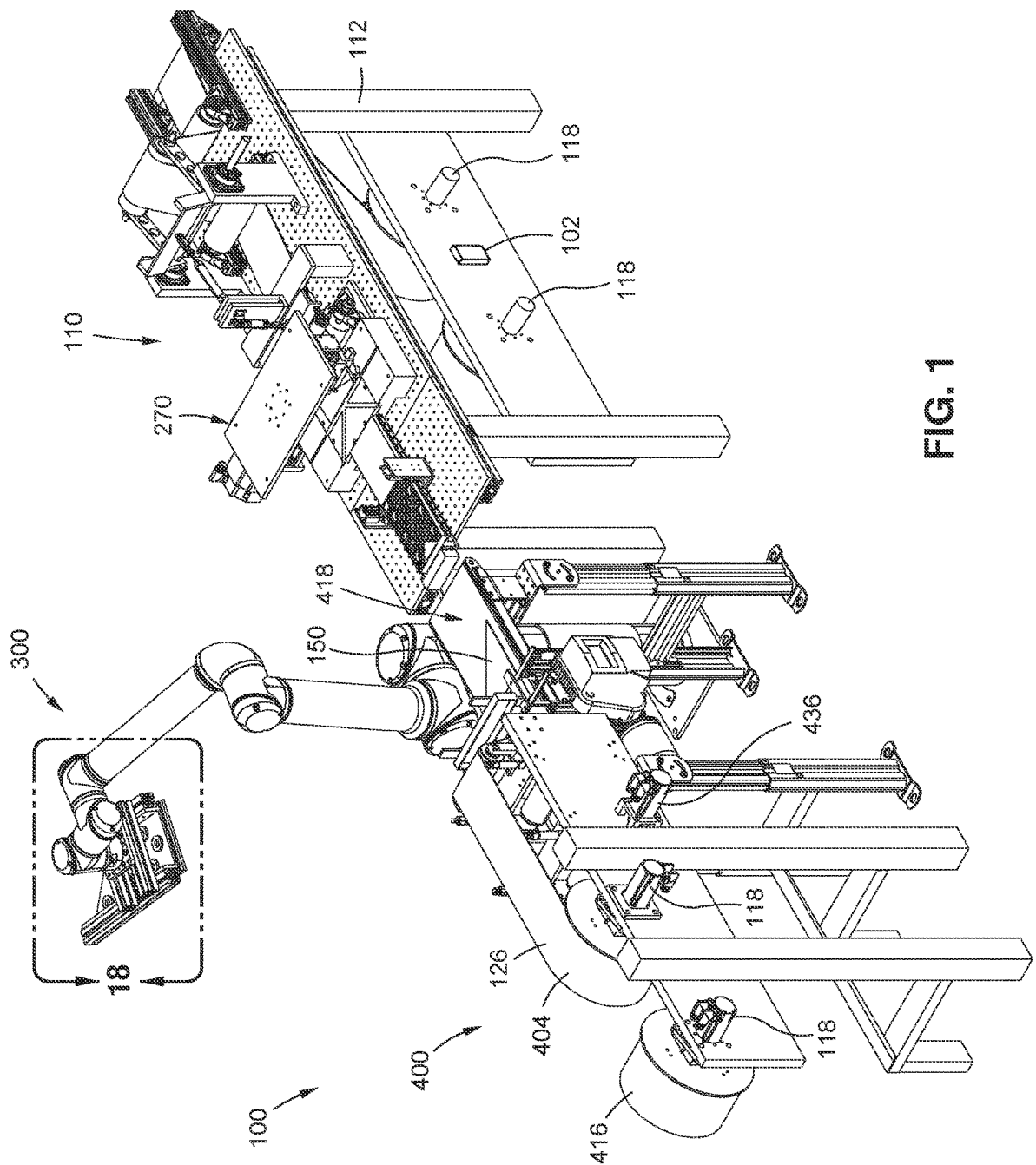
FIG. 1 is a perspective view of a manufacturing system for automated manufacturing of a continuous length of a backed cross-ply prepreg, starting from a continuous length of unidirectional prepreg (i.e., 0-degree prepreg)
Figure 2:
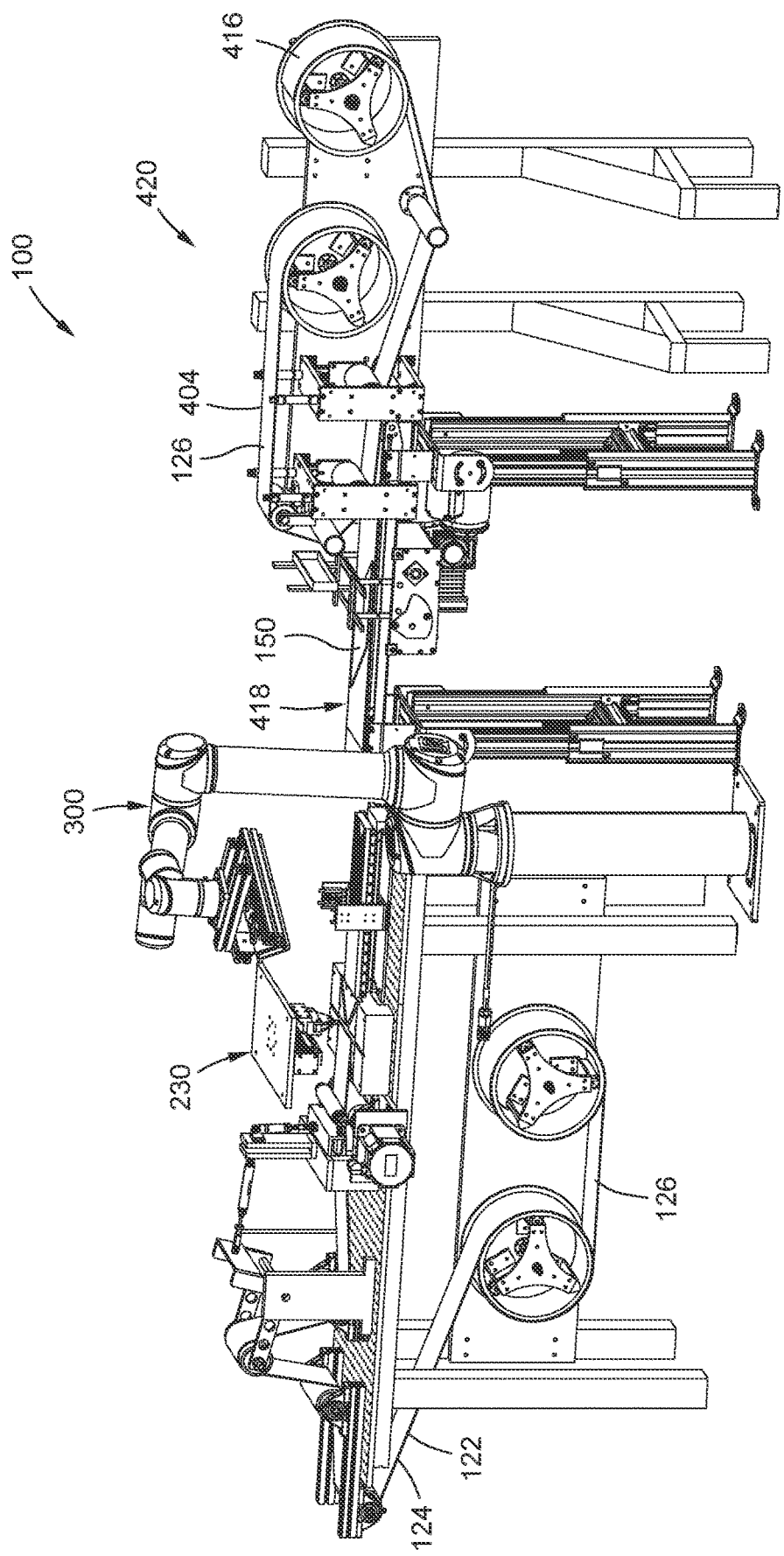
FIG. 2 is a further perspective view of the manufacturing system of FIG. 1, which includes a cutting machine, a pick-and-place system (e.g., a robotic device), and an adhesion machine.
Figure 3:
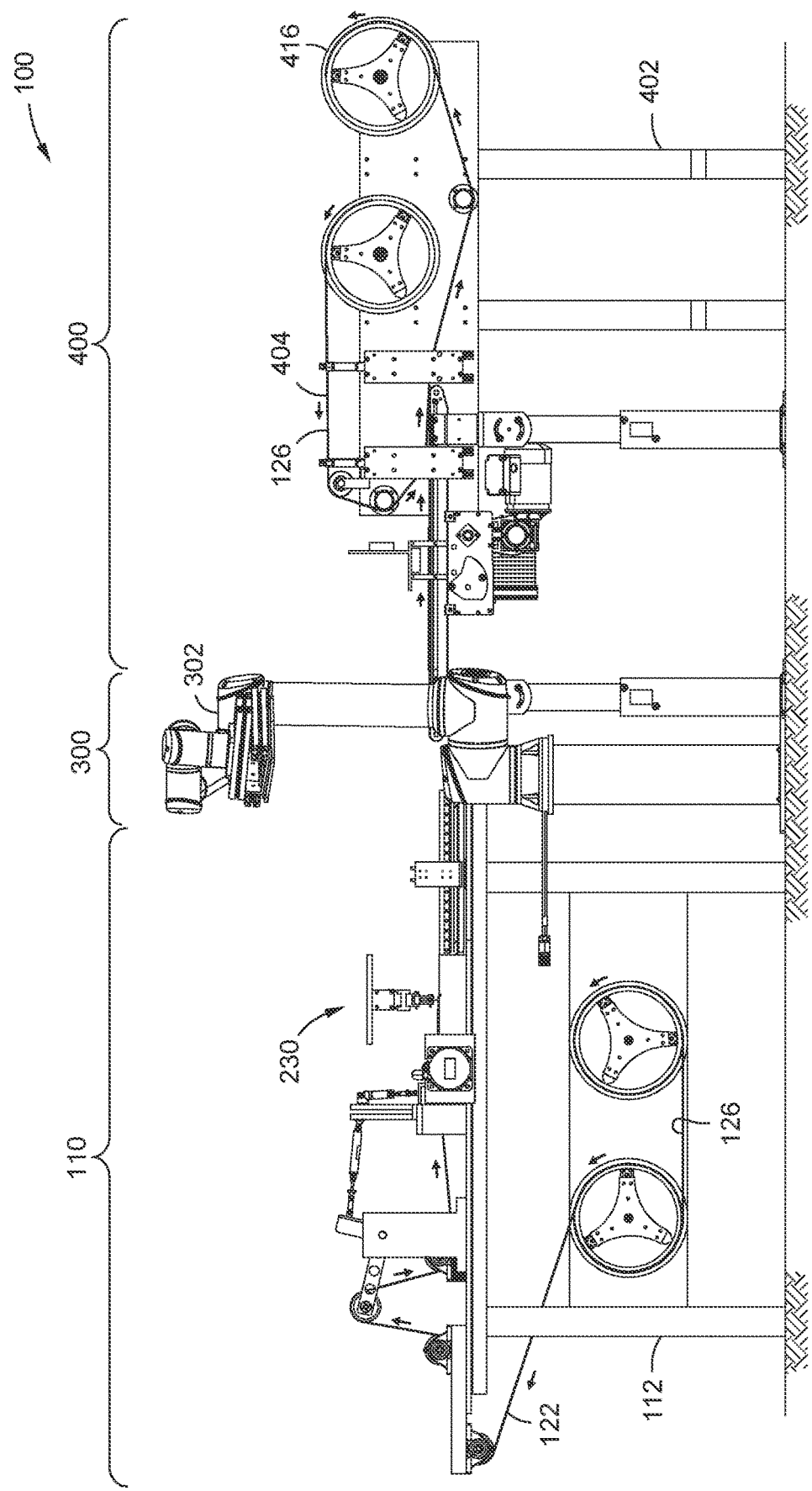
FIG. 3 is a side view of the manufacturing system of FIGS. 1-2.

Referring now to the drawings which illustrate preferred and various examples of the disclosure, shown in FIGS. 1-3 is an example of a manufacturing system 100 for automated manufacturing of a continuous length of a backed cross-ply prepreg 416. The backed cross-ply prepreg 416 comprises at least one layer of end-to-end prepreg segments 150 supported on a backing layer 126. The manufacturing system 100 includes a cutting machine 110, an adhesion machine 400, and a pick-and-place system 300. The cutting machine 110 is configured to support a roll of the continuous length of the unidirectional prepreg 122. The unidirectional prepreg 122 (e.g., unidirectional prepreg tape) contains continuous reinforcing fibers 124 (FIGS. 24 and 27) that are oriented at a fiber angle of 0-degrees relative to the lengthwise direction of the unidirectional prepreg 122. The reinforcing fibers 124 are pre-impregnated with resin. The reinforcing fibers 124 may be formed of any one of a variety of materials such as plastic, glass, ceramic, carbon, metal, or any combination thereof. The resin may be a thermosetting resin or a thermoplastic resin, and may be formed of any one of a variety of organic or inorganic materials. The unidirectional prepreg 122 is supported on a backing layer 126. The backing layer 126 may be a paper material and/or the backing layer 126 may be a polymeric film.

Figure 15:
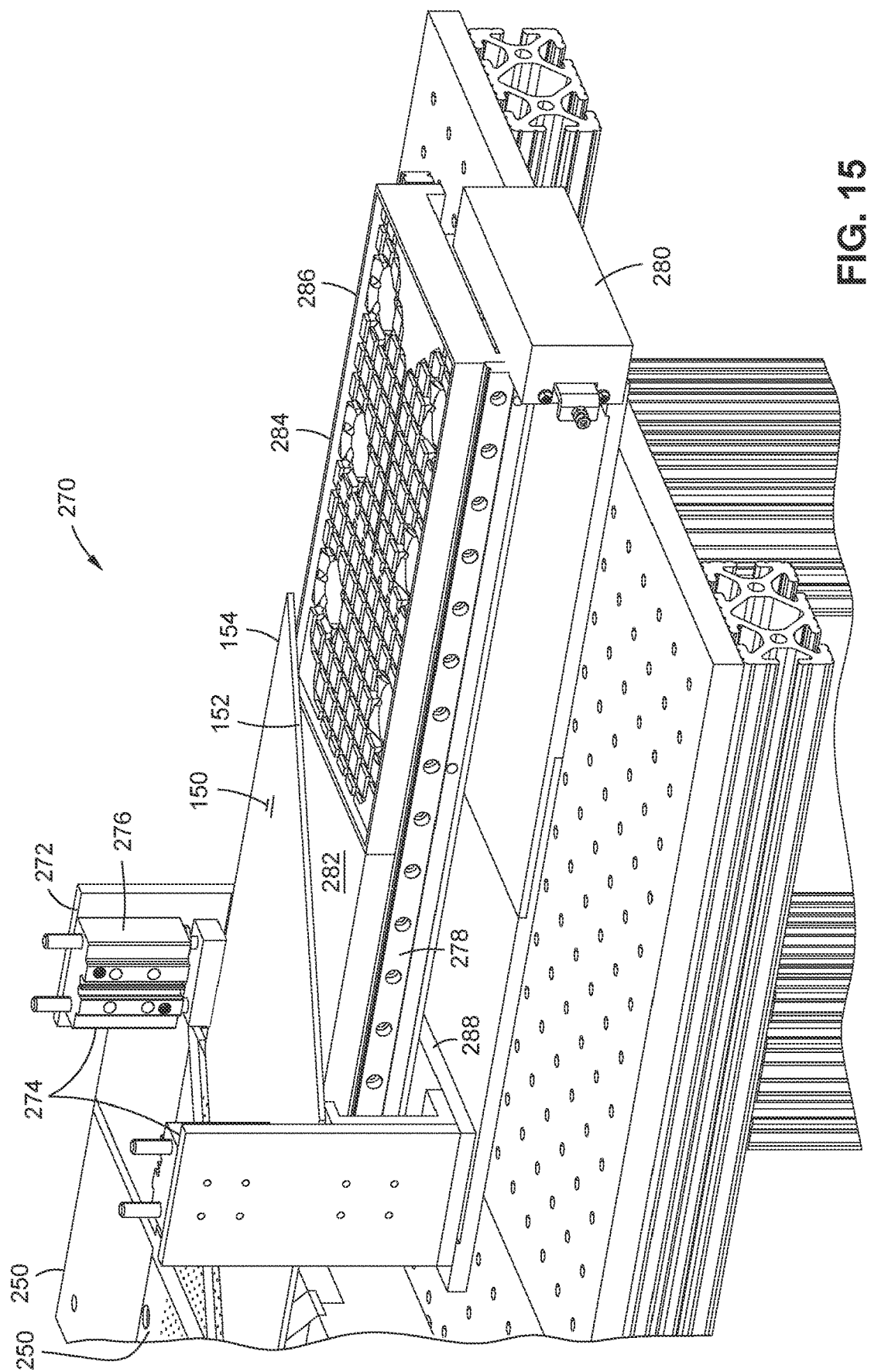
FIG. 15 is a perspective view of an example of a segment delivery system having prepreg clamps configured to transport each prepreg segment from the cutting surface to a segment pickup location.

The cutting machine 110 is configured to peel the backing layer 126 from the continuous length of unidirectional prepreg 122, and feed the peeled unidirectional prepreg 122 to a cutting station 230 where the unidirectional prepreg 122 is sequentially cut into prepreg segments 150. Each prepreg segment 150 has an opposing pair of segment side edges 154 (FIG. 15), and an opposing pair of segment cut edges 152 (FIG. 15). The cutting station 230 cuts the unidirectional prepreg 122 such that the segment cut edges 152 are non-parallel to the lengthwise direction of the unidirectional prepreg 122. For example, as described below, the cutting station 230 is capable of cutting the unidirectional prepreg 122 at an orientation of −45 degrees, +45 degrees, 90 degrees, or any one of a variety of other angles, relative to the lengthwise direction of the unidirectional prepreg 122.

The adhesion machine 400 has a conveyor belt 418 and an adhesion station 420, and is configured to support a roll of a continuous length of a backing material 404. As described below, the backing material 404 may comprise a backing layer 126 similar to the above-mentioned backing layer 126 that the cutting machine 110 peels off of the unidirectional prepreg 122 prior to cutting into prepreg segments 150. Alternatively, the backing material 404 may comprise a roll of backed cross-ply prepreg 416, which may have been previously manufactured by the presently-disclosed manufacturing system 100, as described below. Even further, the backing material 404 may comprise a continuous length (e.g., a roll) of unidirectional prepreg 122.

The pick-and-place system 300 is configured to sequentially pick up the prepreg segments 150 from the cutting machine 110, and place the prepreg segments 150 in end-to-end relation on the moving conveyor belt 418. The pick-and-place system 300 places the prepreg segments 150 on the conveyor belt 418 in an orientation such that the segment cut edges 152 of the prepreg segments 150 are aligned with each other, and are generally parallel to a lengthwise direction of the conveyor belt 418. Once the prepreg segments 150 are placed on the conveyor belt 418, the segment cut edges 152 become the sides of the backed cross-ply prepreg 416 that is produced by the manufacturing system 100. The pick-and-place system 300 preferably places the prepreg segments 150 in non-overlapping relation to each other, and at a maximum gap of 0.10 inch between adjacent prepreg segments 150, although the manufacturing system 100 can be adjusted to accommodate any overlap requirements or gap requirements between the end-to-end prepreg segments 150. In addition, the pick-and-place system 300 preferably orients the prepreg segments 150 such that the fiber angles of the prepreg segments 150 are parallel to each other.

The conveyor belt 418 is configured to feed the series of prepreg segments 150 to the adhesion station 420. In one example, the conveyor belt 418 is moved at a constant speed, and the backing material 404 is moved over the conveyor belt 418 in synchronization with the conveyor belt 418 and/or at the same speed as the conveyor belt 418. The adhesion station 420 is configured to adhere the prepreg segments 150 to the continuous length of the backing material 404, thereby transferring the prepreg segments 150 from the conveyor belt 418 to the backing material 404, and resulting in the continuous length of the backed cross-ply prepreg 416 which is wound onto a drum, as described below. In the present disclosure, a backed cross-ply prepreg 416 contains a backing layer 126, and at least one layer of an end-to-end series of prepreg segments 150 of which the reinforcing fibers 124 are oriented non-parallel to the lengthwise direction of the backed cross-ply prepreg 416. As shown in FIGS. 35-37 and described below, the manufacturing system 100 has the capability to manufacture a single-layer backed cross-ply prepreg 416 (i.e., a single layer of end-to-end prepreg segments 150 defining cross-directional prepreg material on a backing layer 126). In addition, as shown in FIGS. 38-49 and described below, the manufacturing system 100 has the capability to manufacture a dual-layer backed cross-ply prepreg 416 in which at least one of the layers of prepreg material comprises cross-directional prepreg material. Although not shown in the figures, the manufacturing system 100 also has the capability to manufacture a backed cross-ply prepreg 416 having more than two layers of prepreg material on a backing layer 126. For example, the manufacturing system 100 also has the capability to manufacture a backed cross-ply prepreg 416 containing three or more layers of prepreg material on a backing layer 126.

As shown in FIGS. 1-3, the cutting machine 110 is supported on a cutting machine framework 112. The adhesion machine 400 is located proximate the cutting machine 110, and is supported on an adhesion machine framework 402. The pick-and-place system 300 is located proximate the downstream end of the cutting machine 110, and proximate the upstream end of the adhesion machine 400. In the example shown, the pick-and-place system 300 is a robotic device 302, as described in greater detail below. However, in other examples not shown, the pick-and-place system 300 may be configured as a gantry system configured to pick up the prepreg segments 150 from the cutting machine 110, reorient the prepreg segments 150, and place the prepreg segments 150 onto the conveyor belt 418. Although not shown, the manufacturing system 100 is coupled to and/or includes a variety of utility lines interconnecting the various components, and enabling operation of the manufacturing system 100. Such utility lines may include pneumatic lines, vacuum lines, compressed air lines, data and communication lines, and power lines, all of which have been omitted, for clarity of the figures.

In the example of FIGS. 1-3, the cutting machine 110 is positioned in alignment with the adhesion machine 400, such that the direction of movement of the unidirectional prepreg 122 through the cutting machine 110 is aligned with the direction of movement of the conveyor belt 418. As described below, aligning the cutting machine 110 with the adhesion machine 400 allows for the ability to produce a continuous length of backed cross-ply prepreg 416 having a first layer of prepreg comprising a series of prepreg segments 150 on a backing layer 126, and a second layer of prepreg comprising a continuous length (i.e., uncut) of unidirectional prepreg 122 (i.e., 0-degree fiber angle) on top of the first layer of prepreg segments 150. In this regard, the robotic device 302 is positioned to the side of the manufacturing system 100 to avoid interfering with the unidirectional prepreg 122 (i.e., uncut) passing from the cutting machine 110 to the adhesion machine 400.

However, in other examples not shown, the manufacturing machine may be configured such that the cutting machine 110 and the adhesion machine 400 are non-aligned with each other. For example, the cutting machine 110 and the adhesion machine 400 may be positioned side by side, and may be oriented such that the downstream end of the cutting machine 110 is located immediately adjacent to the upstream end of the adhesion machine 400, to allow the pick-and-place system 300 (e.g., a robotic device 302) to easily transfer the prepreg segments 150 from the cutting machine 110 to the conveyor belt 418. However, in such a side-by-side arrangement, a continuous length of unidirectional prepreg 122 (i.e., uncut) is incapable of passing from the cutting machine 110 to the adhesion machine 400.

Figure 4:
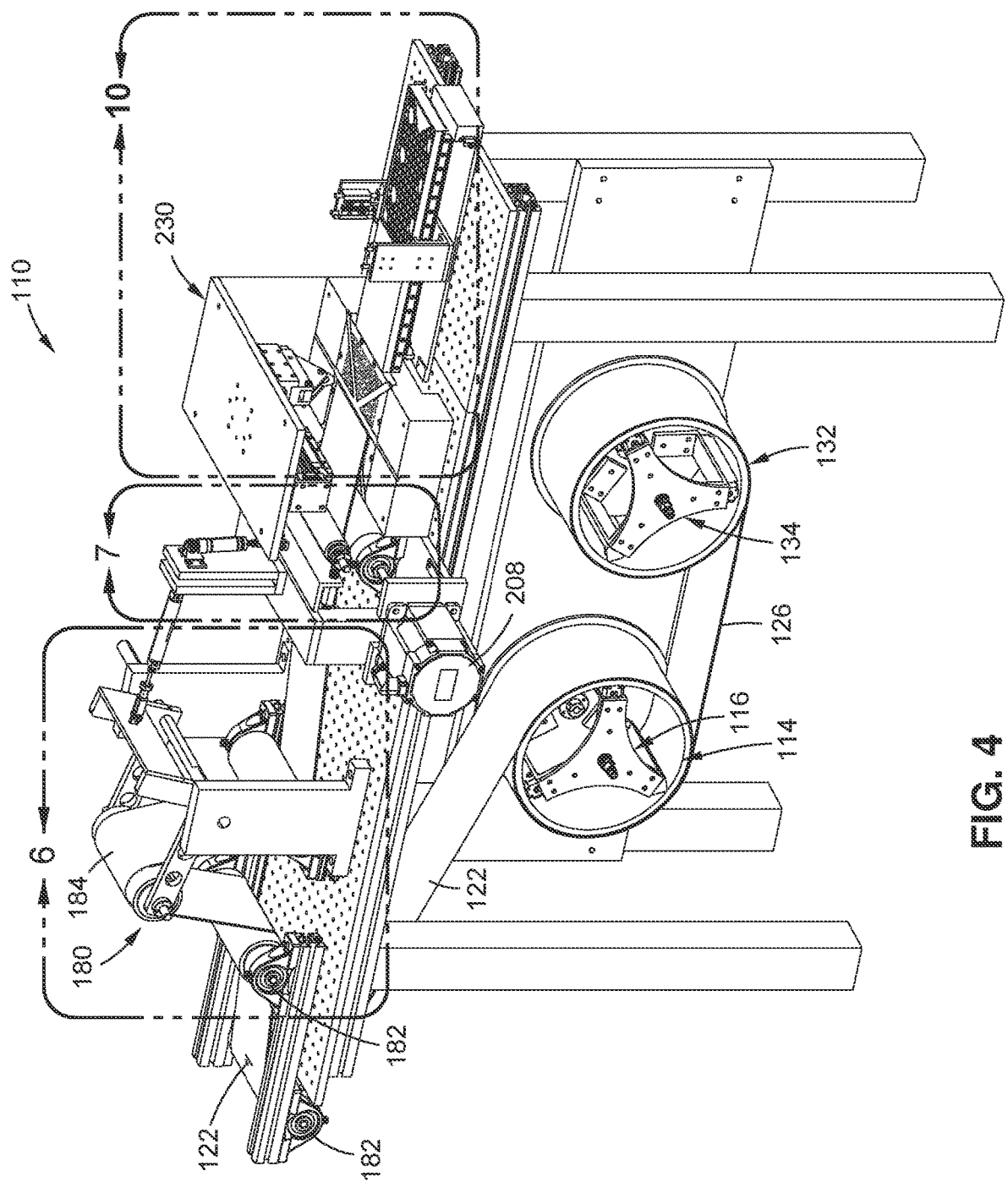
FIG. 4 is a perspective view of an example of the cutting machine showing a backed unidirectional prepreg drum containing a roll of the unidirectional prepreg supported on a backing layer, and further illustrating a backing layer collection drum for collecting the backing layer as the unidirectional prepreg is drawn off the backed unidirectional prepreg drum.
Figure 5:
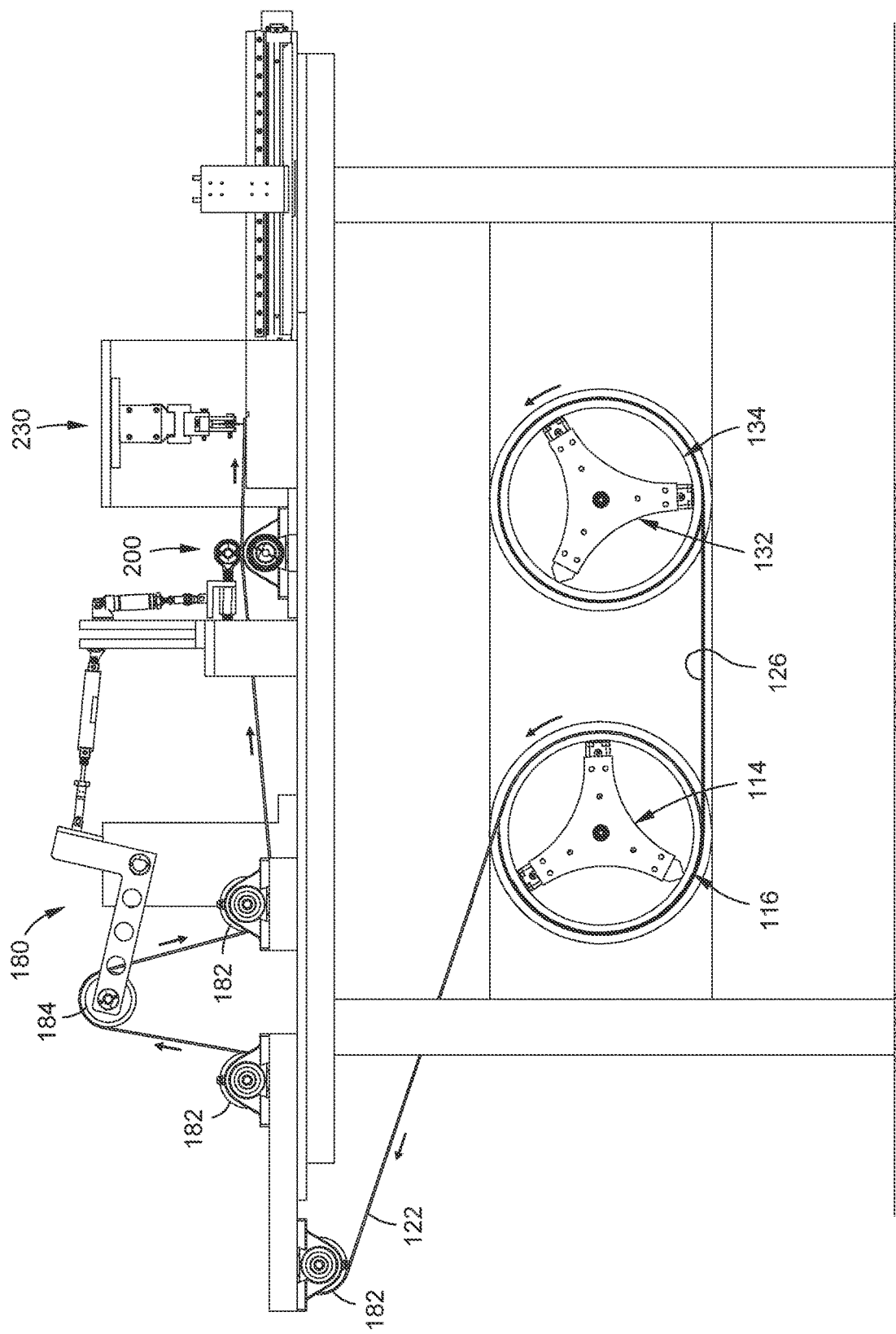
FIG. 5 is a side view of the cutting machine of FIG. 4.

Referring to FIGS. 4-5, shown is an example of the cutting machine 110, which includes a backed unidirectional prepreg chuck 116 configured to support a backed unidirectional prepreg drum 114. The backed unidirectional prepreg drum 114 is configured to support a roll of the continuous length of unidirectional prepreg 122, which itself is supported on a backing layer 126 as mentioned above. In addition, the cutting machine 110 includes a backing layer collection chuck 134 configured to support a backing layer collection drum 132. The backing layer collection drum 132 is configured to collect the backing layer 126 as the backing layer 126 is peeled off of the unidirectional prepreg 122 as the unidirectional prepreg 122 is fed through the cutting machine 110. The backed unidirectional prepreg chuck 116 and the backing layer collection chuck 134 are each rotatably driven by a chuck servomotor 118 (FIG. 1). Each chuck includes pneumatic clamps mounted on separate legs of the chuck. When a drum is mounted on a chuck, compressed air is provided to the pneumatic clamps to urge the pneumatic clamps against the inner wall of the drum, thereby securing the drum to the chuck. Removal of the drum from the chuck is effected by decoupling the compressed air source from the pneumatic clamps.

The cutting machine 110 includes a plurality of rollers (e.g., idler rollers 182, dancer roller 184, etc.) for supporting the unidirectional prepreg 122, and to facilitate directional changes of the unidirectional prepreg 122 through the cutting machine 110. In some examples of the manufacturing system 100, the rollers may each include circumferential alignment ridges (not shown) protruding from the cylindrical outer surface of the rollers. A pair of the circumferential alignment ridges are located respectively on opposing ends of each roller. The circumferential alignment ridges are spaced apart at a width that is equivalent to the width of the unidirectional prepreg 122, and are configured to maintain the alignment of the unidirectional prepreg 122 as the unidirectional prepreg 122 moves through the cutting machine 110. The adhesion machine 400 may also include rollers (e.g., idler rollers 182) that have circumferential alignment ridges. On the adhesion machine 400, the circumferential alignment ridges are spaced apart by a distance equivalent to the width of the backing material 404, and provide a means for maintaining the backing material 404 in alignment with the prepreg segments 150 on the conveyor belt 418 during adhesion.

Referring to FIGS. 4-7, the cutting machine 110 includes a nip roller assembly 200 configured to draw the unidirectional prepreg 122 through the cutting machine 110, and feed a predetermined length of the unidirectional prepreg 122 into the cutting station 230. In the example shown, the nip roller assembly 200 has opposing nip rollers 202 which are positioned relative to each other to define a roller interface 210 between the nip rollers 202. In the example shown, the nip rollers 202 include an upper nip roller 204 and a lower nip roller 206.

The nip roller assembly 200 further includes a nip roller servomotor 208 having a rotary encoder (not shown). The nip roller servomotor 208 is configured to rotatably drive the lower nip roller 206. In the example shown, the lower nip roller 206 is a rigid cylinder (e.g., solid aluminum) having a textured outer surface (e.g., sandblasted) configured to frictionally engage the backing layer 126 that supports the unidirectional prepreg 122. The upper nip roller 204 is freely rotatable, and is formed of a softer, elastomeric material for bearing against the unidirectional prepreg 122 without damaging the material. For example, the upper nip roller 204 may be comprised of ethylene-propylene-diene-monomer (EPDM) rubber or other elastomeric material.

Figure 7:
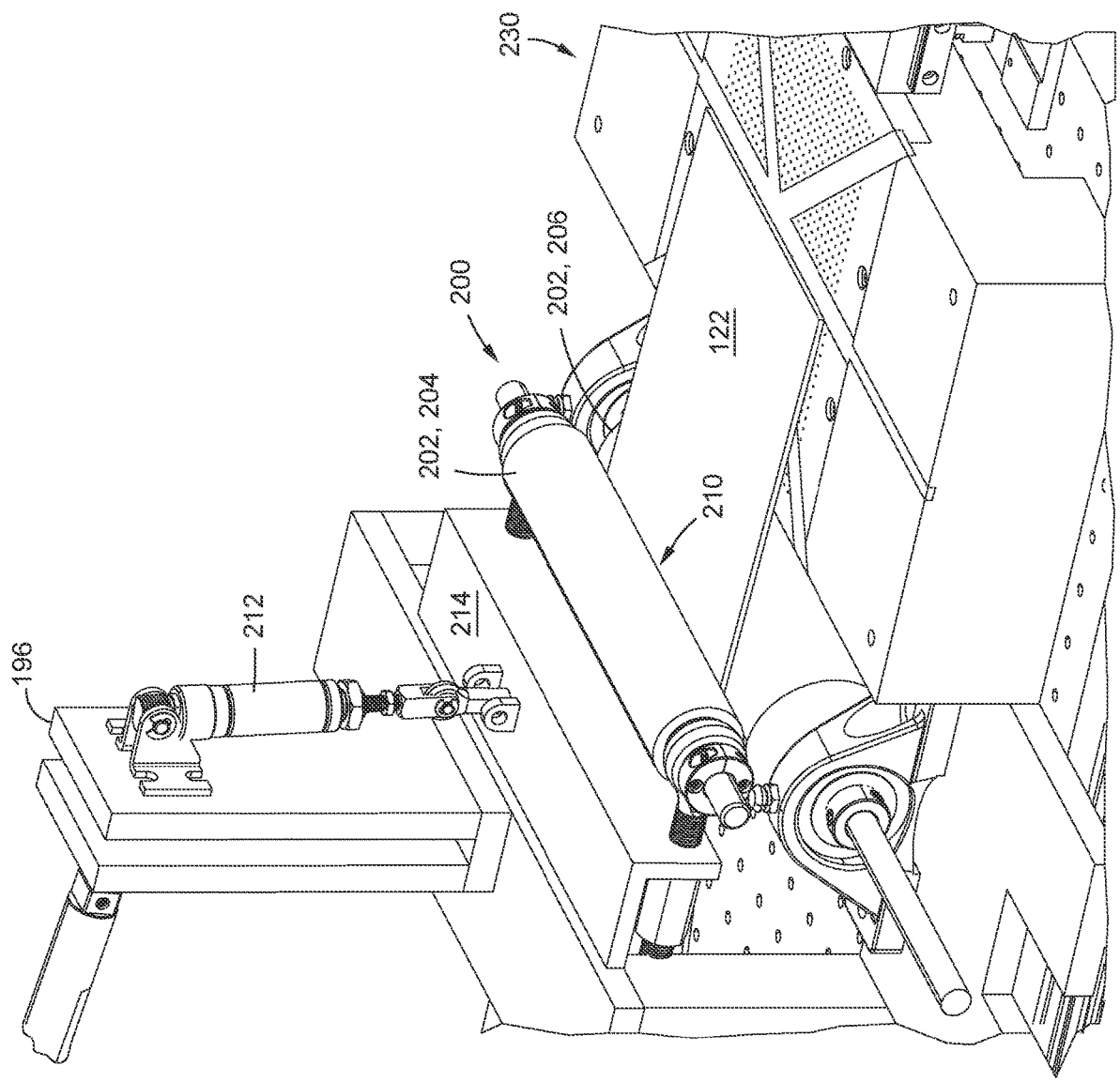
FIG. 7 is an enlarged view of the portion of the cutting machine identified by reference numeral 7 of FIG. 4, and illustrating a nip roller assembly.

The nip roller assembly 200 includes a nip roller actuator 212, which may comprise a pneumatically-driven linear actuator. The nip roller actuator 212 extends between an actuator mounting bracket 196 and a nip roller support fitting 214 (FIG. 7). The nip roller actuator 212 is configured to move the upper nip roller 204 toward and away from the lower nip roller 206, between a closed position and an open position. In the open position, the unidirectional prepreg 122 may be threaded into the roller interface 210, after which the nip roller actuator 212 moves the upper nip roller 204 downwardly into the closed position, thereby clamping onto the unidirectional prepreg 122. When prompted by the controller 102 (FIG. 1) of the manufacturing system 100, the nip roller servomotor 208 is activated to rotate the lower nip roller 206, causing a predetermined length of the unidirectional prepreg 122 to be fed into the cutting station 230 for cutting into a prepreg segment 150. The rotary encoder of the nip roller servomotor 208 provides a means for metering the predetermined length that is extended from the nip roller assembly 200 into the cutting station 230.

Figure 6:
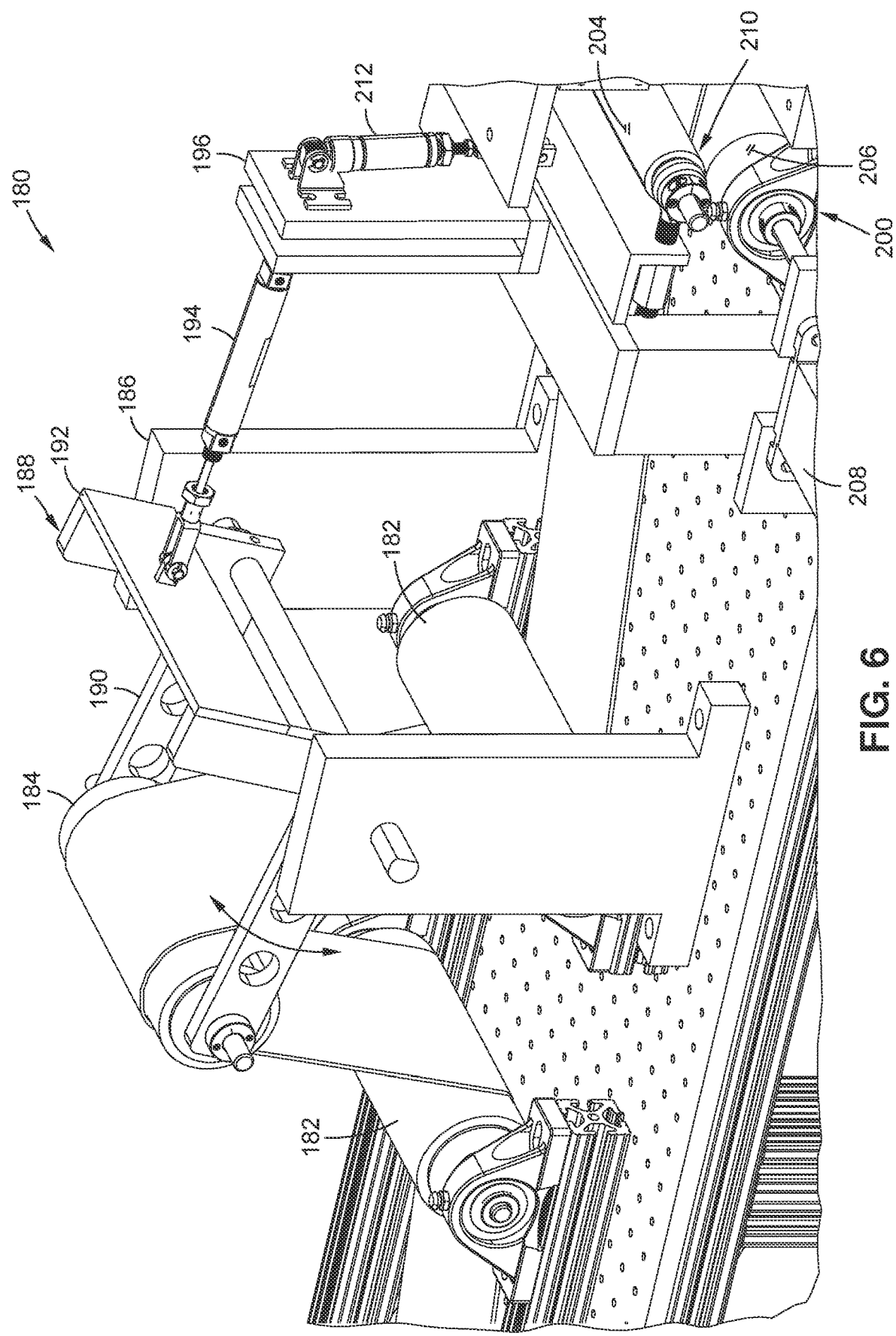
FIG. 6 is an enlarged view of the portion of the cutting machine identified by reference numeral 6 of FIG. 4, and illustrating a pneumatic dancer.

Referring to FIGS. 4-6, the cutting machine 110 further includes a pneumatic dancer assembly 180 located between the backed unidirectional prepreg drum 114 and the nip roller assembly 200. The pneumatic dancer assembly 180 is configured to apply a substantially constant tension load on the unidirectional prepreg 122 as the nip roller assembly 200 draws the unidirectional prepreg 122 off of the backed unidirectional prepreg drum 114. In this regard, the pneumatic dancer assembly 180 maintains a limited amount of tension (e.g., approximately 10 pounds of force) on the unidirectional prepreg 122, and avoids exceeding the tension limit, to avoid stretching damage to the unidirectional prepreg 122. In addition, the tension in the unidirectional prepreg 122 enables the nip roller assembly 200 to dispense a precise length of the unidirectional prepreg 122 into the cutting station 230.

As shown in FIG. 6, the pneumatic dancer assembly 180 includes a pair of idler rollers 182 and a dancer roller 184. The dancer roller 184 and the idler rollers 182 are located in a manner that provides obtuse wraparound angles for the unidirectional prepreg 122 moving through the pneumatic dancer assembly 180, and which allows for accurately controlling the tension load on the unidirectional prepreg 122 and preventing fraying and other damage to the unidirectional prepreg 122. The pneumatic dancer assembly 180 includes a dancer arm 188, and a dancer mounting stand 186 to support the dancer arm 188. The dancer arm 188 is pivotally coupled to the dancer mounting stand 186, and has a roller mounting portion 190, and an actuator mounting portion 192. The roller mounting portion 190 supports the dancer roller 184. A dancer actuator 194 extends between the actuator mounting portion 192 and the actuator mounting bracket 196. In the example shown, the dancer actuator 194 is a linear actuator, such as a low-stiction air cylinder. The pneumatic dancer assembly 180 includes a rotational encoder (not shown) that outputs the position of the dancer arm 188 to a control loop (not shown), to thereby provide feedback to the dancer actuator 194 for maintaining substantially constant tension in the unidirectional prepreg 122.

Referring to FIGS. 8-9, shown is an alternative arrangement of the cutting machine 110 in which the backing layer collection drum 132 is located proximate the cutting station 230. In contrast to the arrangement of FIGS. 1-5 in which the backing layer collection drum 132 is located immediately adjacent to the backed unidirectional prepreg drum 114, the backing layer collection drum 132 in FIGS. 8-9 is located downstream of the nip roller assembly 200 and upstream of the cutting station 230, and is configured to peel the backing layer 126 from the unidirectional prepreg 122 as the unidirectional prepreg 122 exits the nip roller assembly 200 prior to entering the cutting station 230. By peeling the backing layer 126 off of the unidirectional prepreg 122 after exiting the nip roller assembly 200 as shown in FIGS. 8-9, the unidirectional prepreg 122 remains fully supported on the backing layer 126 from the point where the unidirectional prepreg 122 spools off of the backed unidirectional prepreg drum 114, to the point where the unidirectional prepreg 122 passes through the nip roller assembly 200 prior to entering the cutting station 230. By supporting the unidirectional prepreg 122 on the backing layer 126 just prior to entering the cutting station 230, the stability and accuracy of the handling of the unidirectional prepreg 122 is improved, relative to the arrangement of FIGS. 1-5 where the backing layer collection drum 132 is located immediately adjacent to the backed unidirectional prepreg drum 114. In FIGS. 8-9, the backing layer collection drum 132 is supported above the cutting station 230 via a chuck support structure 120. An idler roller 182 (FIG. 8) is included for redirecting the backing layer 126 from the nip roller assembly 200 to the backing layer collection drum 132. As mentioned above, the backing layer collection drum 132 is rotatably driven by a chuck servomotor 118, as shown in FIG. 9.

Figure 10:
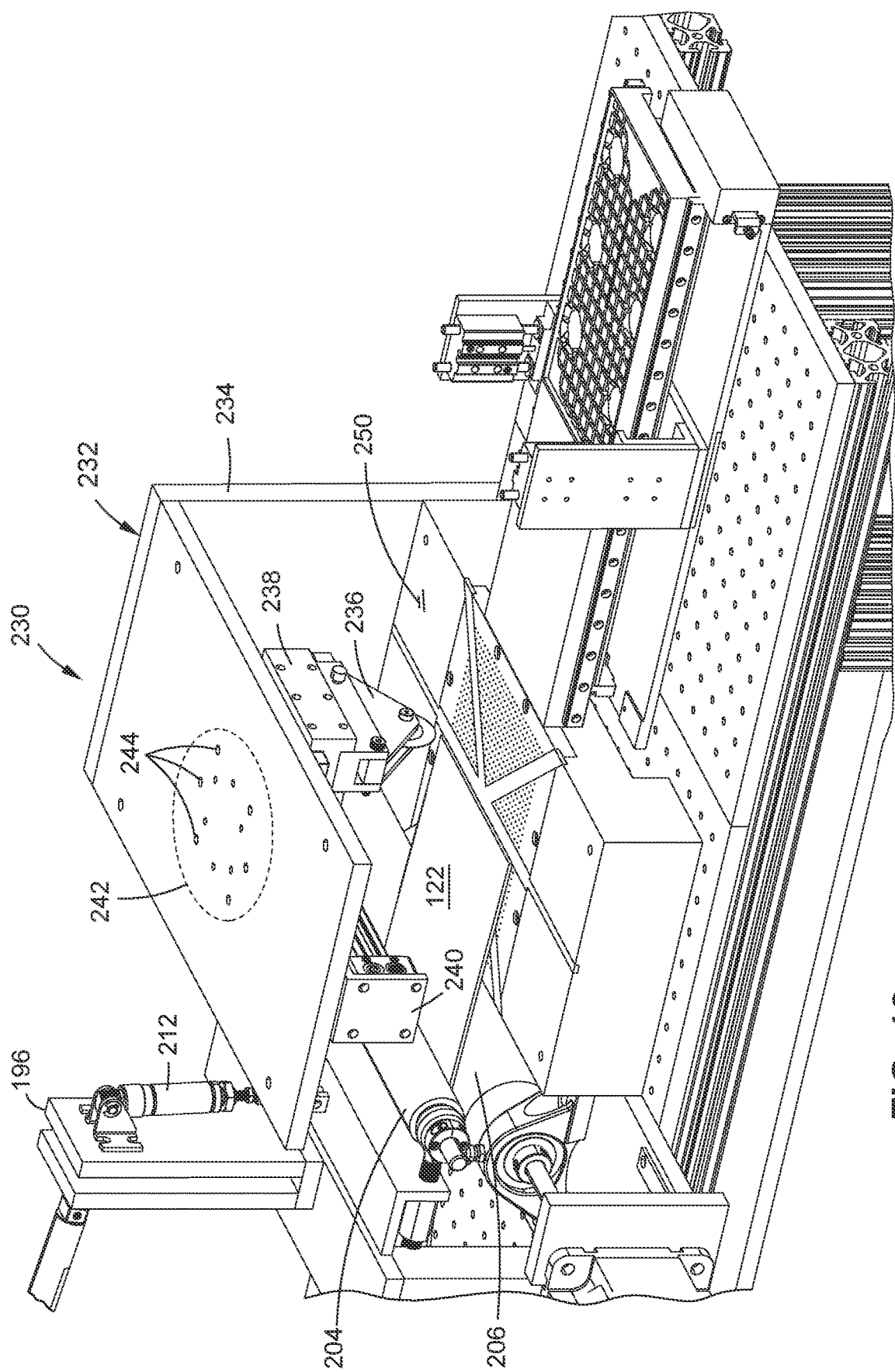
FIG. 10 is an enlarged view of the portion of the cutting machine identified by reference numeral 10 of FIG. 4, and illustrating a cutting station having a turntable supporting a cutting device mounted on a cutting device actuator.
Figure 11:
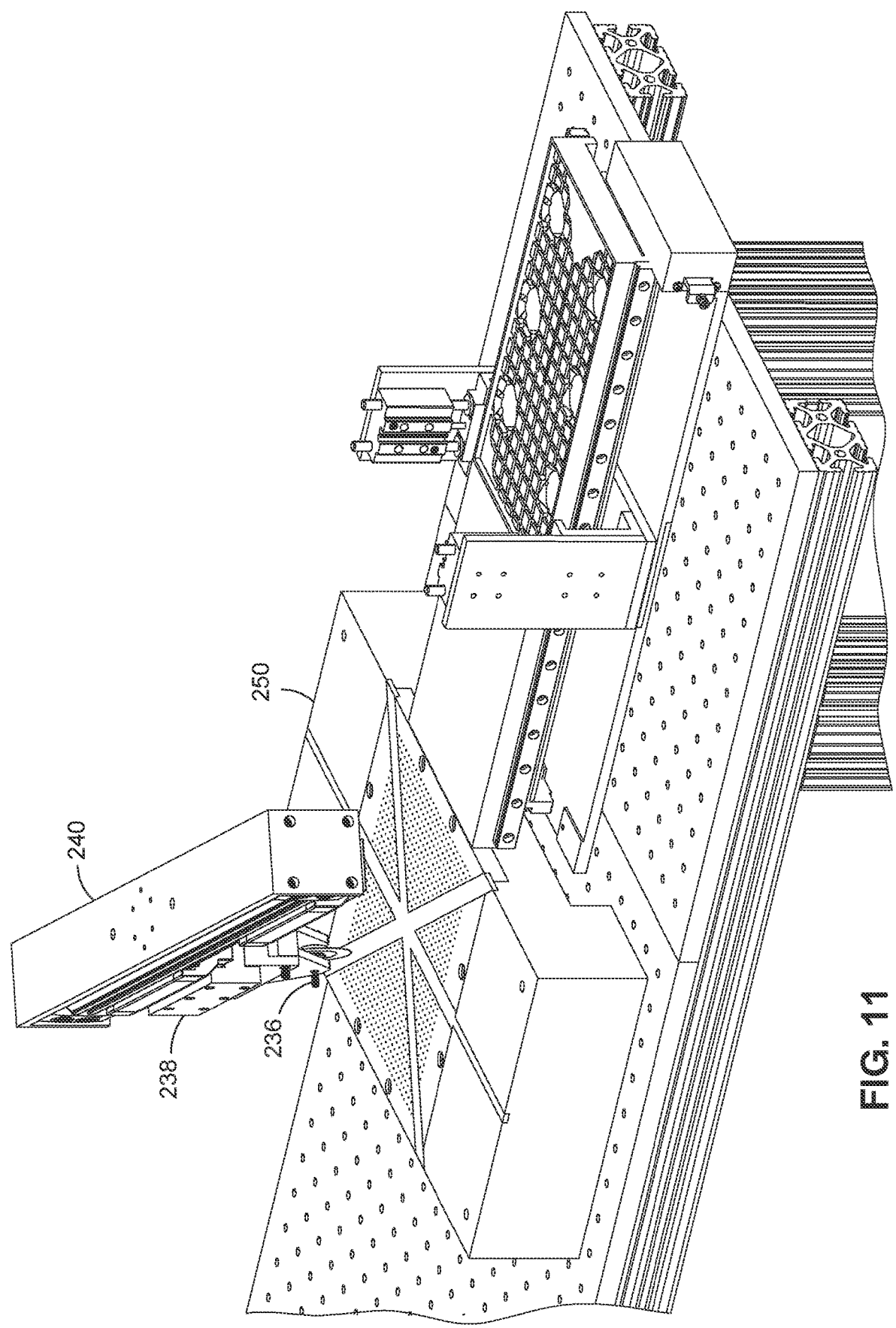
FIG. 11 shows the cutting station of FIG. 10, and illustrating the cutting device and cutting device actuator rotated, via the turntable, to an angle of −45° relative to a lengthwise direction of the unidirectional prepreg.
Figure 12:
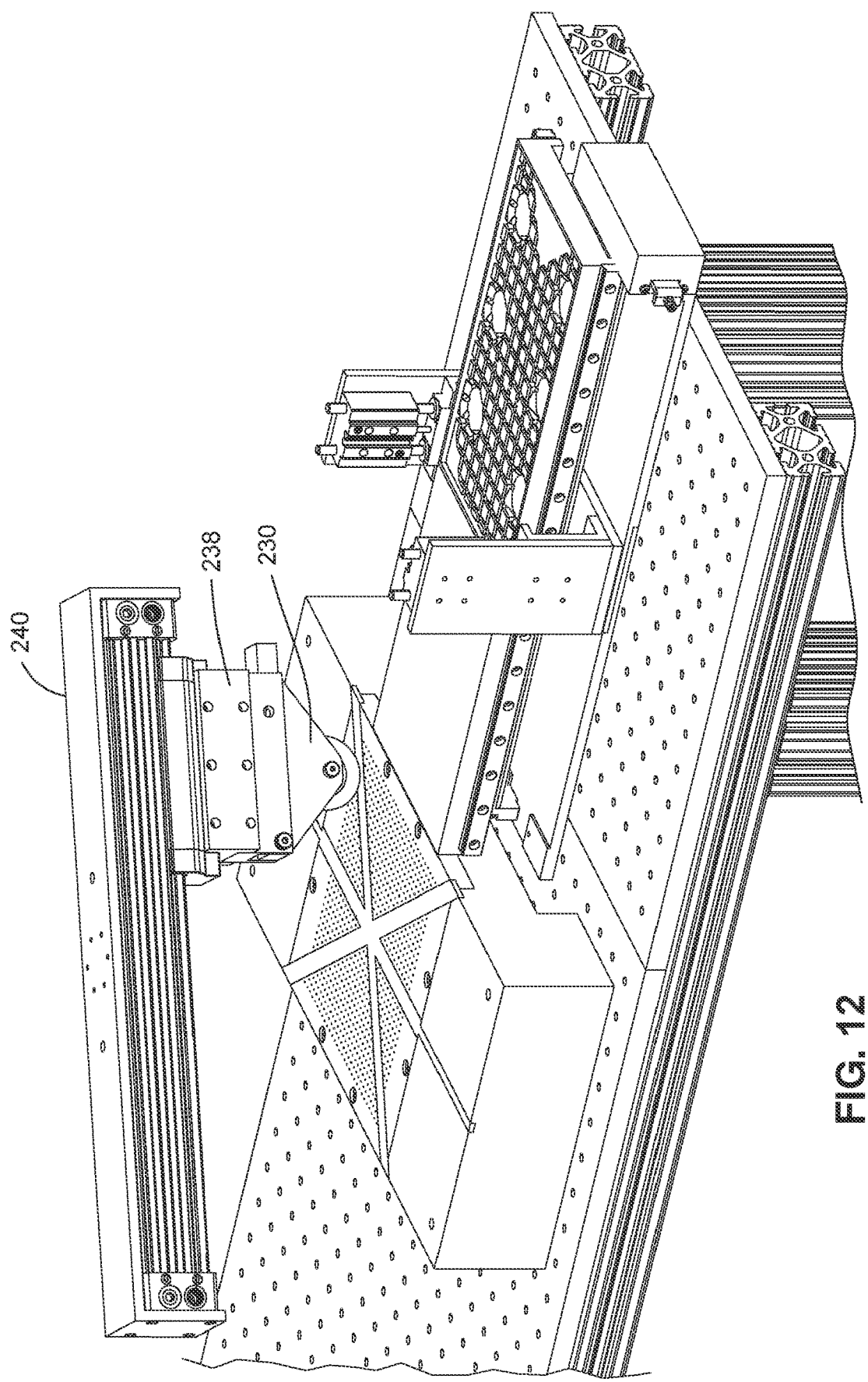
FIG. 12 shows the cutting device and cutting device actuator rotated, via the turntable, to an angle of +45° relative to the lengthwise direction of the unidirectional prepreg

Referring to FIGS. 10-13, shown is an example of the cutting station 230 for cutting the continuous length of the unidirectional prepreg 122 into prepreg segments 150. In the example shown, the cutting station 230 is configured to cut the unidirectional prepreg 122 into prepreg segments 150 (FIG. 15) that have segment cut edges 152 (FIG. 15) oriented at −45 degrees, +45 degrees, or 90 degrees, relative to the lengthwise direction of the unidirectional prepreg 122. Toward this end, the cutting station 230 includes a cutting assembly 232 supported on a cutting assembly frame 234. The cutting assembly 232 includes a cutting device 236, and a turntable 242 (FIG. 10) configured to support the cutting assembly 232. The turntable 242 is configured to lock the orientation of the cutting device 236 relative to the lengthwise direction of the unidirectional prepreg 122. In the example shown, the cutting device 236 is suspended below the turntable 242. The turntable 242 has detents 244 for locking the orientation of the cutting device 236 at 90 degrees (FIG. 10), +45 degrees (FIG. 11), or −45 degrees (FIG. 12). However, the turntable 242 may include detents 244 at any one of a variety of other angular orientations relative to the lengthwise direction of the director prepreg, as may be dictated by the desired fiber angle of the backed cross-ply prepreg 416 to be manufactured by the manufacturing system 100.

In FIGS. 10-12, the cutting device 236 is shown as a cutting wheel. However in other examples, the cutting device 236 may be configured as an ultrasonic device, a cutting blade, or other cutting device configuration that provides a high degree of accuracy and repeatability in cutting the unidirectional prepreg 122. The cutting device 236 is coupled to a cutting device carriage 238. The cutting assembly 232 includes a cutting device actuator 240 for driving the cutting device 236 across the width of the unidirectional prepreg 122 for cutting into the prepreg segments 150. In the example shown, the cutting device actuator 240 is a linear actuator configured as a pneumatic air slide (e.g., a pneumatically-driven actuator). However, the cutting device actuator 240 may be configured as a screw drive mechanism, or other actuator arrangement.

Referring to FIGS. 13-14, the cutting station 230 includes a cutting surface 250 for supporting the unidirectional prepreg 122 during cutting. The cutting surface 250 may be porous or may have a plurality of pores, and is fluidically coupled to a vacuum source such as a compressed air-powered vacuum generator, or a shop vacuum source or pump. The application of vacuum pressure to the cutting surface 250 provides for vacuum coupling of the unidirectional prepreg 122 to the cutting surface 250, and prevents movement of the unidirectional prepreg 122 during cutting by the cutting device 236, which allows for precise cutting and a reduction in the risk of damage to the prepreg segments 150.

In the example shown in FIGS. 13-14, the cutting surface 250 has an upper plate 254 and a lower plate 256. The lower plate 256 includes a chamber, and a recess configured to receive the upper plate 254. The upper plate 254 and the lower plate 256 are formed of a rigid material (e.g., metallic material, such as aluminum), and each contain grooves 258 respectively aligned with the cutting orientations of the cutting device 236 as defined by the detents 244 associated with the turntable 242. The grooves 258 are configured to receive a sacrificial cutting material 260 against which the cutting device 236 bears when cutting the unidirectional prepreg 122. Examples of the sacrificial cutting material 260 include, but are not limited to, a non-porous material such as rubber (e.g., EPDM), or a porous material such as Vyon™ that is capable of vacuum coupling to the unidirectional prepreg 122.

The cutting surface 250 is optionally configured to be fluidically coupled to a pressurized air source (e.g., a compressed air source) for discharging air out of the pores or porous surface, as a means for forcing the prepreg segment 150 away from the cutting surface 250. Forcing the prepreg segment 150 away from the cutting surface 250 prevents stiction to the cutting service, and thereby promotes sliding translation of the prepreg segment 150 off of the cutting surface 250.

Figure 16:
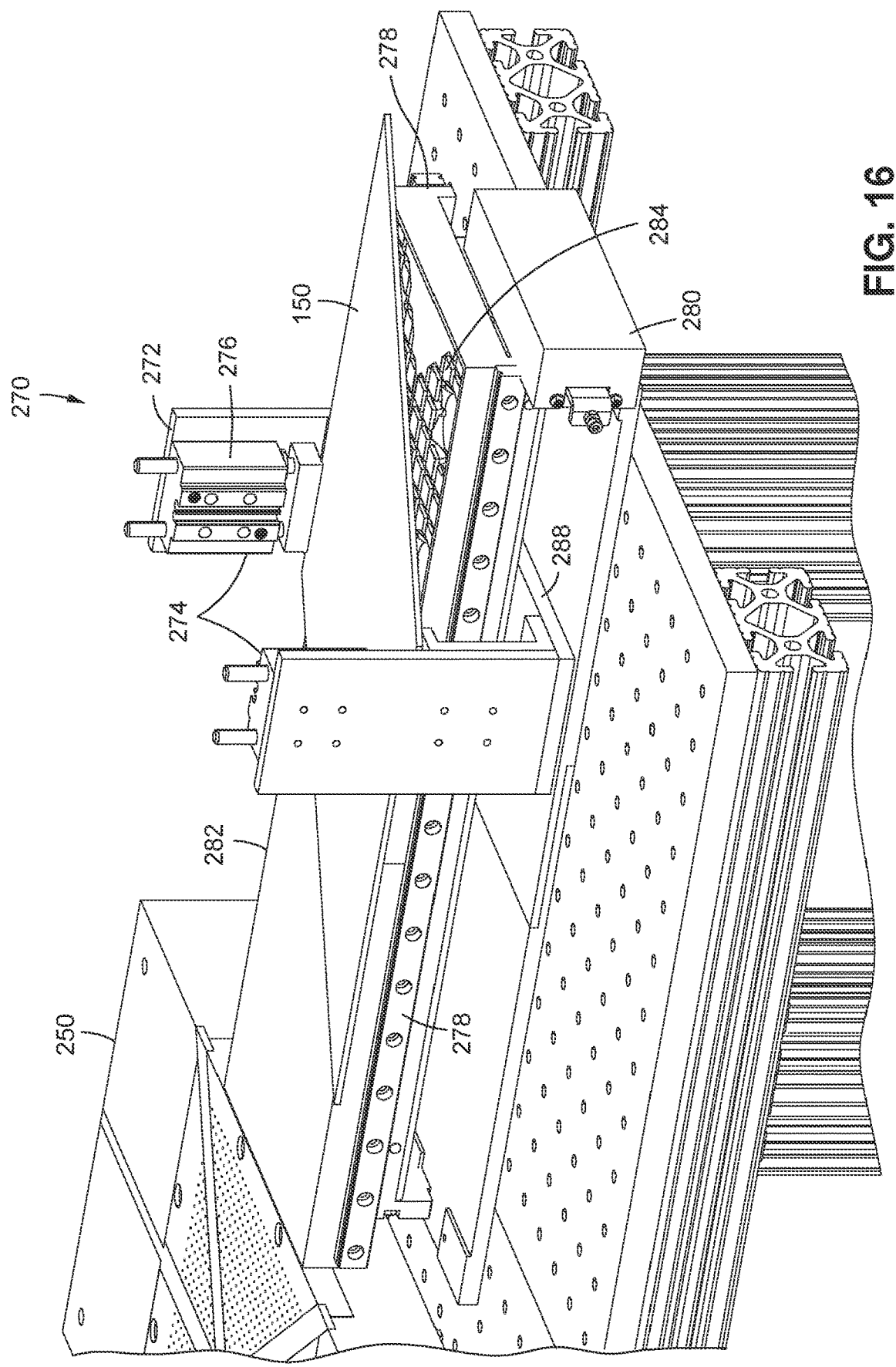
FIG. 16 shows the prepreg clamps transporting a prepreg segment from a home position to the segment pickup location.
Figure 17:
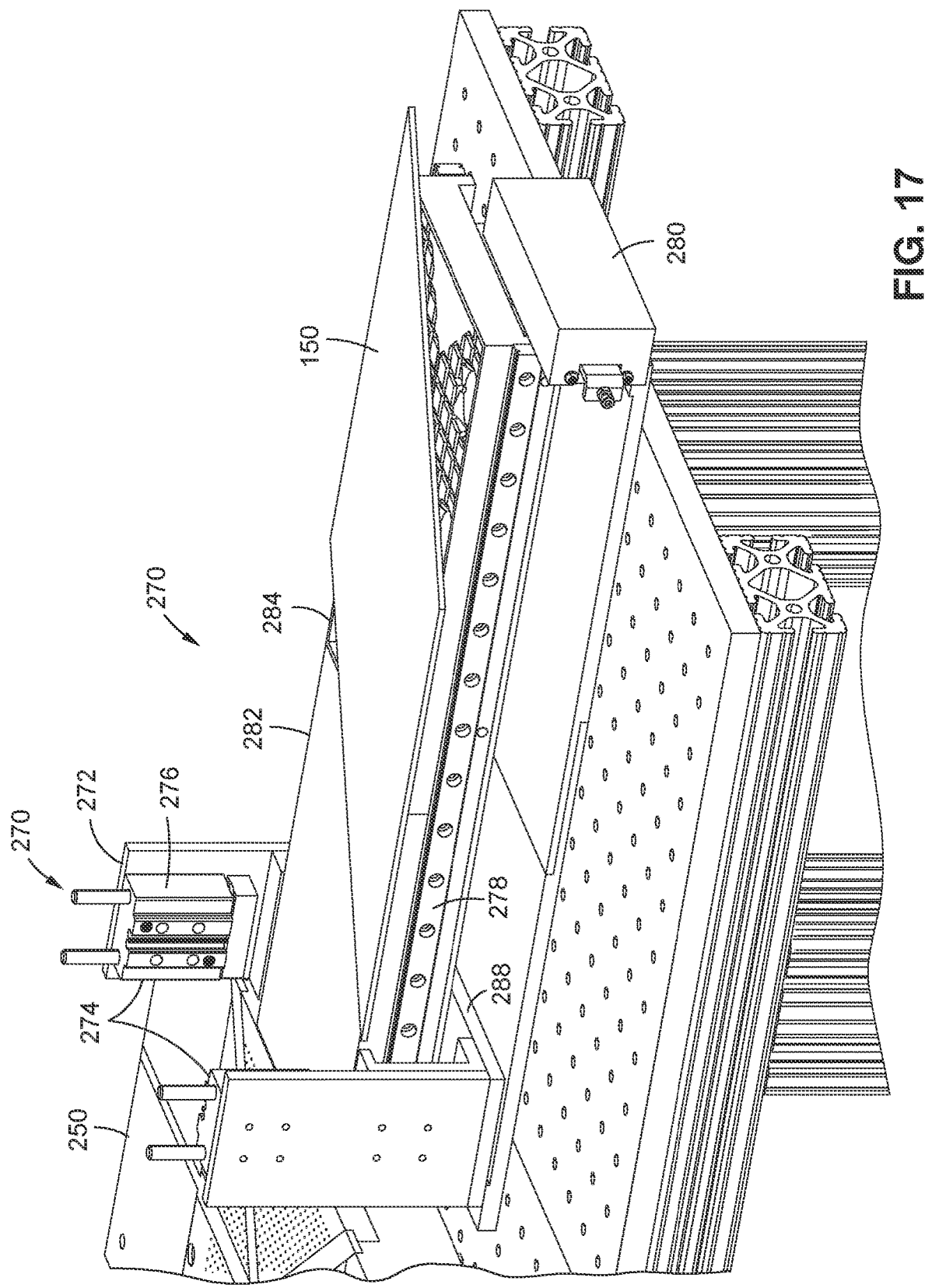
FIG. 17 shows the prepreg clamps returning back to the home position after releasing the prepreg segment at the segment pickup location.

Referring to FIGS. 15-17, the cutting machine 110 includes the above-mentioned segment pickup location 286 where each prepreg segment 150 is accessible for pickup by the pick-and-place system 300. Toward this end, the cutting machine 110 includes a segment delivery system 270 configured to transport each prepreg segment 150 from the cutting surface 250 to the segment pickup location 286. At the segment pickup location 286, the prepreg segment 150 is in an openly accessible location that provides clearance for the pick-and-place system 300 to pick up the prepreg segment 150. The segment delivery system 270 is located immediately downstream of the cutting surface 250.

In FIGS. 15-17, the segment delivery system 270 includes a segment clamping system 272 comprising a pair of prepreg clamps 274 configured to clamp onto the side edges of a downstream portion of the unidirectional prepreg 122 prior cutting by the cutting device 236 to produce a prepreg segment 150. Each prepreg clamp 274 has a prepreg clamp actuator 276 for vertically moving the prepreg clamp 274 between a clamped position (FIGS. 15-16) and an unclamped position (FIG. 17). The prepreg delivery system includes a delivery system support table 282 located adjacent to the cutting surface 250, and a delivery system vacuum table 284 located downstream of the delivery system support table 282. The delivery system support table 282 is configured to support the unidirectional prepreg 122 prior to and after cutting into a prepreg segment 150. The delivery system vacuum table 284 is configured to be fluidically coupled to a vacuum source for vacuum coupling each prepreg segment 150 to the segment pickup location 286 after being transported by the segment delivery system 270.

Each one of the prepreg clamps 274 is supported on a linear guide rail 278. In addition, the segment clamping system 272 includes a clamp transporter actuator 280, such as a linear actuator (e.g., a pneumatically-driven actuator). The clamp transporter actuator 280 is coupled to the prepreg clamps 274 via a transporter base plate 288 that is located underneath the delivery system support table 282 and delivery system vacuum table 284. The transporter base plate 288 extends between and interconnects the lower portions of the pair of prepreg clamps 274. Prior to vacuum coupling the unidirectional prepreg 122 to the cutting surface 250, the clamp transporter actuator 280 is configured to apply a small amount of tension (e.g., less than 10 pounds of force) to the unidirectional prepreg 122 as a means to remove any slack. The tension load applied to the unidirectional prepreg 122 by the clamp transporter actuator 280 is resisted by the nip roller assembly 200. Once tension load is applied to the unidirectional prepreg 122, vacuum pressure is activated at the cutting surface 250, after which the clamp transporter actuator 280 is disabled to thereby stop the application of tension to the unidirectional prepreg 122. The cutting device 236 is then driven across the unidirectional prepreg 122, resulting in a prepreg segment 150.

After cutting the unidirectional prepreg 122, the prepreg clamps 274 remain clamped to the prepreg segment 150. The vacuum pressure is deactivated at the cutting surface 250, and the clamp transporter actuator 280 moves the segment clamps along the linear guide rails 278 to thereby transport each prepreg segment 150 from the cutting station 230 to the segment pickup location 286 (FIGS. 15-16), which may occupy at least a portion of the delivery system vacuum table 284. Upon arrival at the segment pickup location 286, vacuum pressure is activated at the delivery system vacuum table 284 to secure the prepreg segment 150 in position, and the prepreg clamps 274 are moved upwardly into the unclamped position. The clamp transporter actuator 280 returns the prepreg clamps 274 back to the delivery system support table 282 (FIG. 15) in preparation for clamping onto another downstream portion of the unidirectional prepreg 122, when fed into the cutting station 230 by the nip roller assembly 200.

Referring to FIGS. 1-3 and 18-27, shown is an example of the pick-and-place system 300 configured as a robotic device 302. However, in another example not shown, the pick-in-place system may comprise an overhead gantry. As shown in FIGS. 18-27, the robotic device 302 has a robotic arm 304 configured to sequentially pick up the prepreg segments 150 at the segment pickup location 286 (FIGS. 24-25), and place the prepreg segments 150 on the conveyor belt 418 in end-to-end relation to each other, and in an orientation such that the segment cut edges 152 of the prepreg segments 150 are aligned with each other, and are parallel to a lengthwise direction of the conveyor belt 418.

Figure 18:
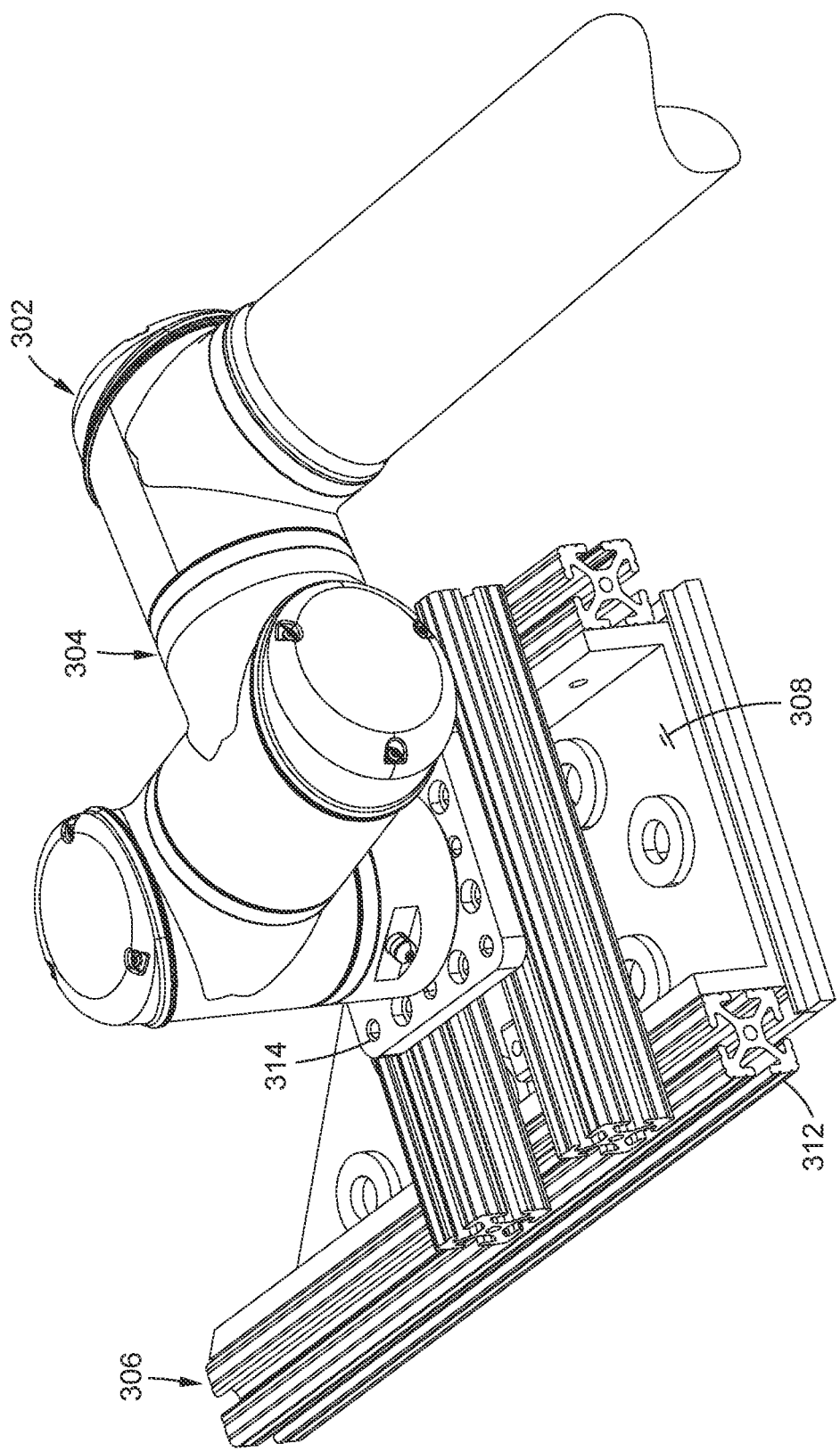
FIG. 18 is an enlarged view of a portion of the pick-and-place system (i.e., a robotic device) of FIG. 1, and illustrating an example of a vacuum end effector mounted to a robotic arm of the robotic device.

As shown in FIGS. 18-27, the robotic arm 304 includes a vacuum end effector 306 configured for vacuum coupling to the prepreg segments 150. The vacuum end effector 306 includes a vacuum plenum 308 (FIGS. 19-20) having a porous surface, such as a Vyon sheet having a plurality of small pores (e.g., a pore size of 50-90 microns). The vacuum plenum 308 is divided into two or more (e.g., three) vacuum zones 310 (FIGS. 20-23) that are shaped complementary to the shape of the prepreg segments 150, as cut by the cutting station 230. The vacuum plenum 308 includes a rigid plenum frame 312 to support the vacuum plenum 308. As shown in FIG. 18, the plenum frame 312 is configured to be attached to the robotic arm 304 via a plenum adapter fitting 314. Each one of the vacuum zones 310 (FIGS. 19-20) of the vacuum plenum 308 is fluidically coupled to a vacuum source such as a compressed air-powered vacuum generator, or to central shop vacuum. The vacuum zones 310 are independently activatable with vacuum pressure to allow the vacuum end effector 306 to engage with different shapes of the prepreg segment 150.

In the example vacuum end effector 306 of FIGS. 21-23, the vacuum plenum 308 includes vacuum zone A, vacuum zone B, and vacuum zone C, and which are shaped and configured specific to a situation where the width of the unidirectional prepreg 122 (i.e., the input material) is equivalent to the width of the backed cross-ply prepreg 416 (i.e., the output material). For example, the width of the unidirectional prepreg 122 may be 6 inches, and the width of the backed cross-ply prepreg 416 may also be 6 inches. However, for examples where the width of the unidirectional prepreg 122 (e.g., 12 inches) is different than the width of the backed cross-ply prepreg 416 (e.g., 6 inches), the vacuum zones would be shaped differently than the vacuum zones shown in FIGS. 21-23.

FIG. 21 illustrates a −90-degree prepreg segment 160, and the activation of vacuum zones A and B for vacuum coupling the vacuum end effector 306 to the 90-degree prepreg segment 160. FIG. 22 illustrates a −45-degree prepreg segment 162, and the activation of vacuum zones B and C for vacuum coupling the vacuum end effector 306 to the −45-degree prepreg segment 162. FIG. 23 illustrates a +45-degree prepreg segment 164, and the reorientation of the vacuum end effector 306 for vacuum coupling of the vacuum end effector 306 to the +45-degree prepreg segment 164.

Figure 24:
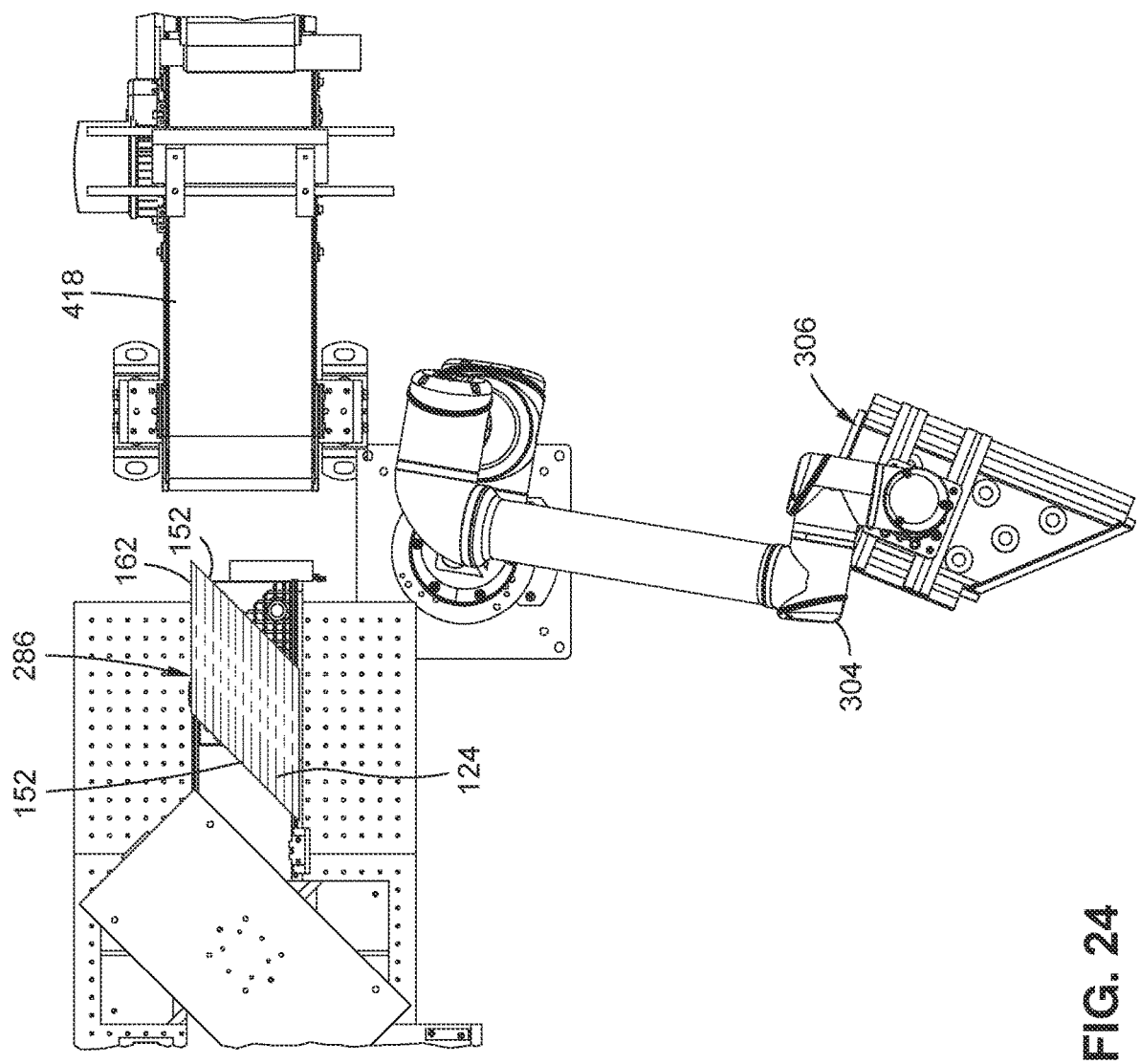
FIG. 24 is a top view of the robotic device and portions of the cutting machine and adhesion machine, and illustrating a −45-degree prepreg segment at the segment pickup location on the cutting machine, and further illustrating an example of the robotic device having the vacuum end effector.
Figure 25:
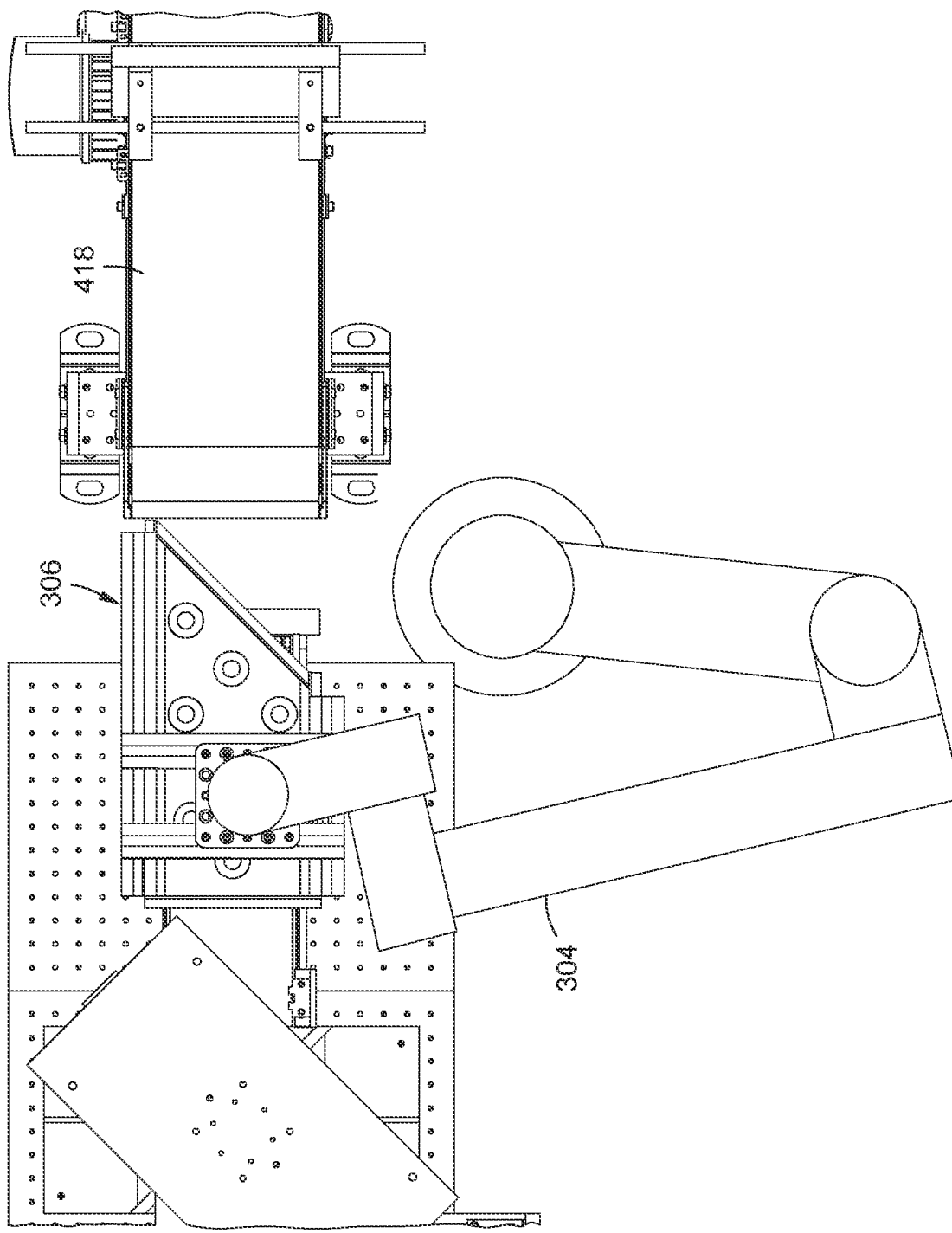
FIG. 25 shows the vacuum end effector picking up the −45-degree prepreg segment at the segment pickup location of the cutting machine.
Figure 26:
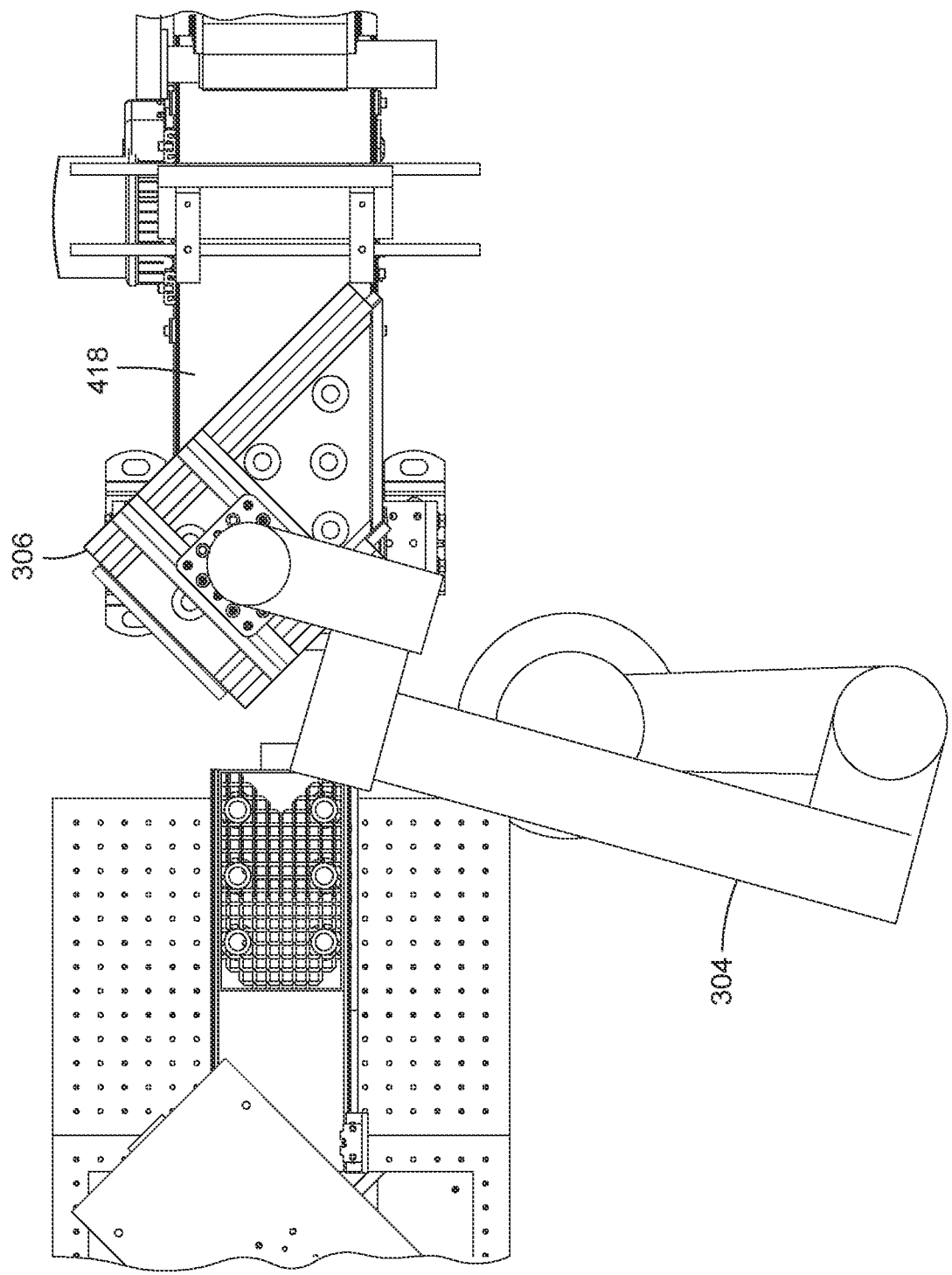
FIG. 26 shows the vacuum end effector rotated 45° relative to the orientation in FIG. 25, and showing the vacuum end effector placing the −45-degree prepreg segment on the adhesion machine.
Figure 27:
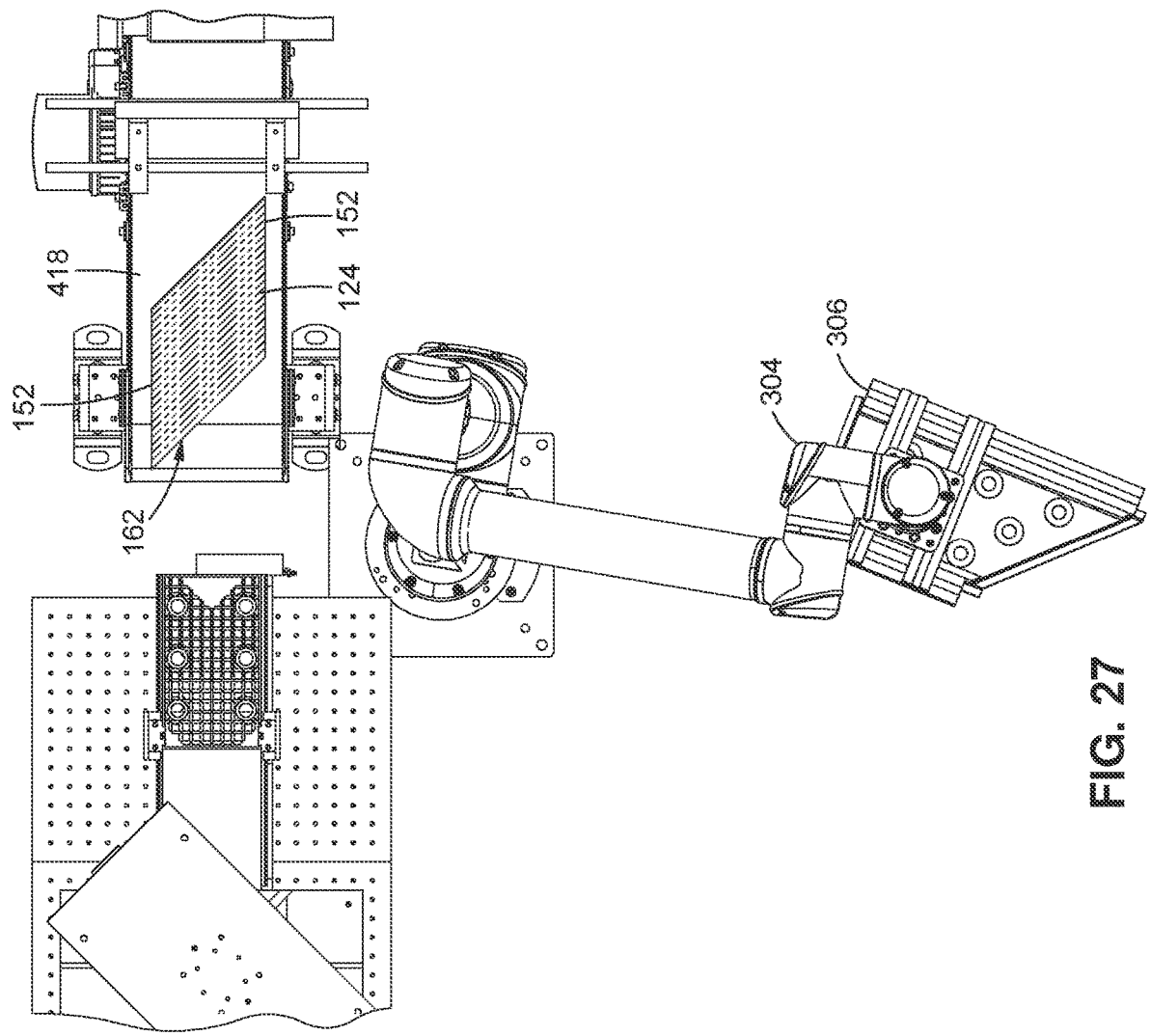
FIG. 27 shows the −45-degree prepreg segment on the conveyor belt of the adhesion machine.

FIG. 24 shows a −45-degree prepreg segment 162 at the segment pickup location 286 of the cutting machine 110. FIG. 25 shows the robotic arm 304 positioning the vacuum end effector 306 over the −45-degree prepreg segment 162 for vacuum engagement. FIG. 26 shows the robotic arm 304 re-orienting the −45-degree prepreg segment 162, and placing the −45-degree prepreg segment 162 on the conveyor belt 418 such that the segment cut edges 152 are parallel to the lengthwise direction of the conveyor belt 418. FIG. 27 shows the −45-degree prepreg segment 162 on the conveyor belt 418 after release from the vacuum end effector 306.

In the example of the manufacturing system 100, the conveyor belt 418 is configured to move at a constant speed, and the pick-and-place system 300 (e.g., the robotic arm 304) is configured to match the speed of the conveyor belt 418 when placing a prepreg segment 150 on the conveyor belt 418. In this regard, the speed at which the manufacturing system 100 produces backed cross-ply prepreg 416 is dictated by the speed of the conveyor belt 418, which may be independently driven and controlled using a manufacturer-provided drive and controller.

In the example shown, the conveyor belt 418 is a vacuum conveyor belt configured to be fluidically coupled to a vacuum source (not shown) for non-movably securing the prepreg segments 150 to the vacuum conveyor belt upon placement by the pick-and-place system 300. In this regard, the target for placement of the first prepreg segment 156 on the conveyor belt 418 may be nominally set to a global x,y coordinate location on the conveyor belt 418. Once the first prepreg segment 156 is placed on the conveyor belt 418, the conveyor belt 418 begins motion, and the pick-and-place system 300 continuously places prepreg segments 150 in end-to-end relation on the moving conveyor belt 418. The conveyor belt 418 may include a rotary encoder mounted to a conveyor belt shaft (not shown) for determining when the prepreg segments 150 has moved an appropriate distance to allow placement of the next prepreg segment 150. The robotic device 302 may be programmed to follow the conveyor belt 418 for a short distance in order to match the speed of the conveyor belt 418. Once the speed is matched, the end effector places the prepreg segment 150 on the conveyor belt 418, and vacuum pressure is disengaged from the vacuum end effector 306, thereby transferring the prepreg segment 150 to the conveyor belt 418.

Although not shown, the manufacturing system 100 may further include a vision system for increasing the accuracy of pickup and placement of the prepreg segments 150. The vision system may include an imaging device (e.g., a camera) configured to image each prepreg segment 150 at the segment pickup location 286, and transmit to the controller 102, the actual location (e.g., in x,y coordinates) and orientation (e.g., in angular degrees) relative to the nominal location and nominal orientation of the prepreg segment 150 at the segment pickup location 286. The controller 102 is configured to control the robotic device 302 in a manner to compensate for the difference between the actual location/orientation and the nominal location/orientation, to better align the end effector to the prepreg segment 150 at the segment pickup location 286. In this same regard, the vision system may facilitate increased accuracy of the pick-and-place system 300 in placing each prepreg segment 150 on the conveyor belt 418. The vision system may be mounted at any one of a variety of locations on the manufacturing system 100. For example, the vision system may be mounted on the robotic arm 304, on the end effector, on the cutting machine 110 at a location above and/or below the segment pickup location 286, and/or on the adhesion machine 400 above the location where the prepreg segments 150 are placed on the conveyor belt 418.

Referring now to FIGS. 28-33, shown is an example of the adhesion machine 400. As mentioned above, the adhesion machine 400 is configured to sequentially adhere the prepreg segments 150 to the backing material 404 in a manner transferring the prepreg segments 150 from the conveyor belt 418 to the backing material 404. In this regard, the adhesion force between the prepreg segments 150 in the backing material 404 is greater than the vacuum force coupling the prepreg segments 150 to the conveyor belt 418, resulting in each prepreg segment 150 gradually adhering to the backing material 404 while gradually releasing from vacuum engagement with the conveyor belt 418, and thereby resulting in the continuous length of backed cross-ply prepreg 416. The adhesion machine 400 is configured to wind the backed cross-ply material onto a cross-ply material collection drum 412 at a specified tension, as described in greater detail below.

Figure 28:
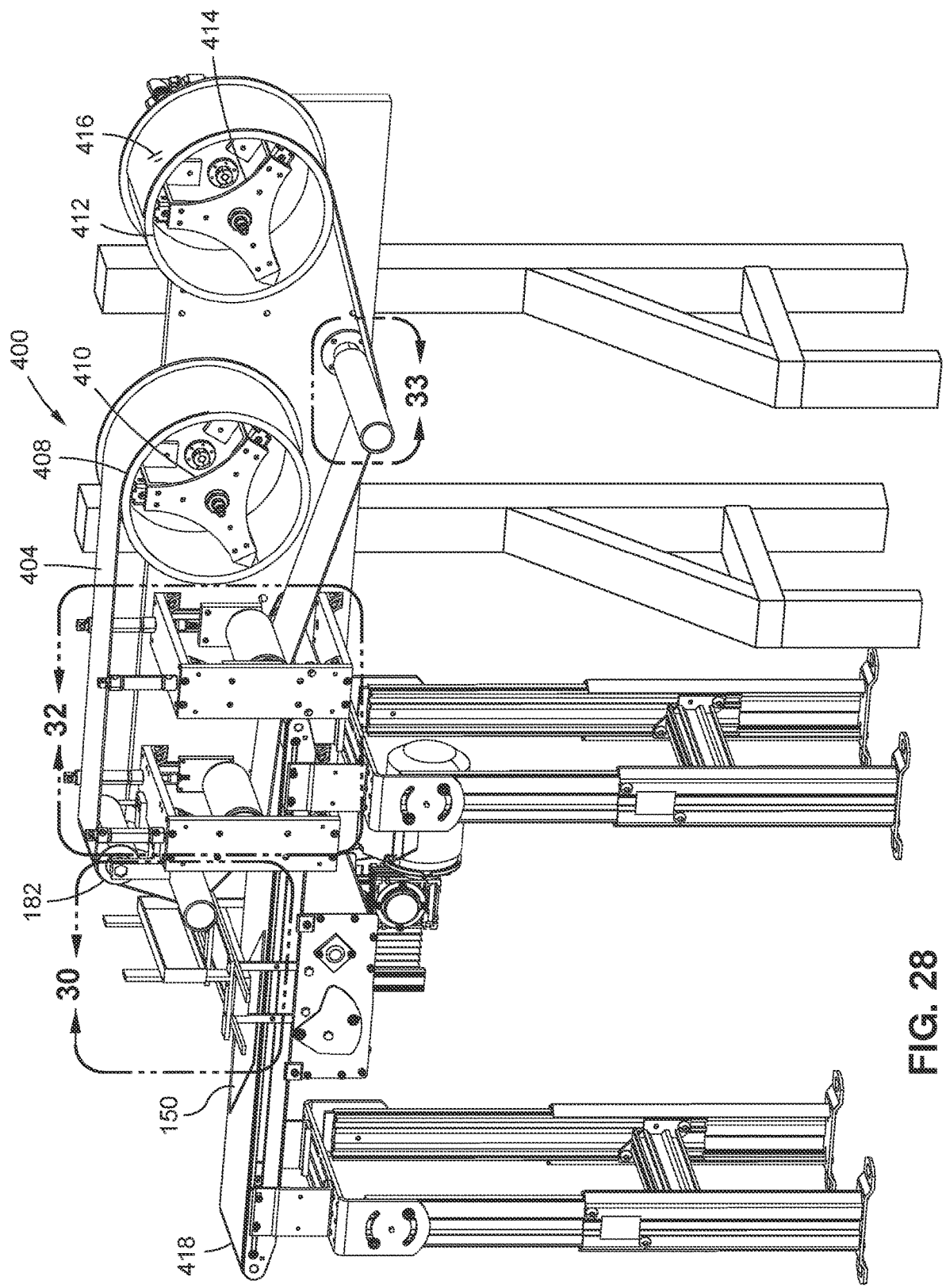
FIG. 28 is a perspective view of an example of the adhesion machine.
Figure 29:
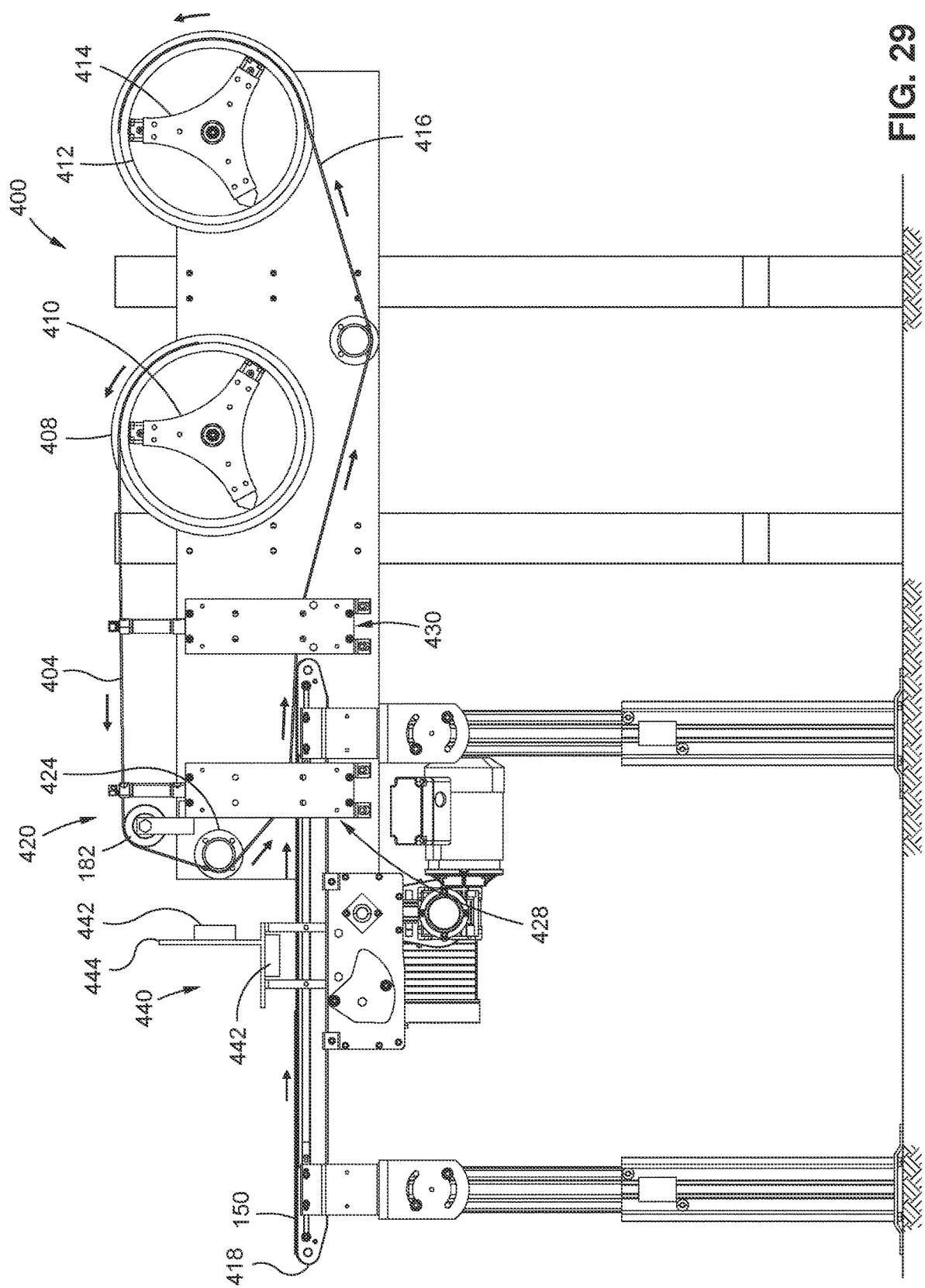
FIG. 29 is a side view of the adhesion machine of FIG. 28.
Figure 33:
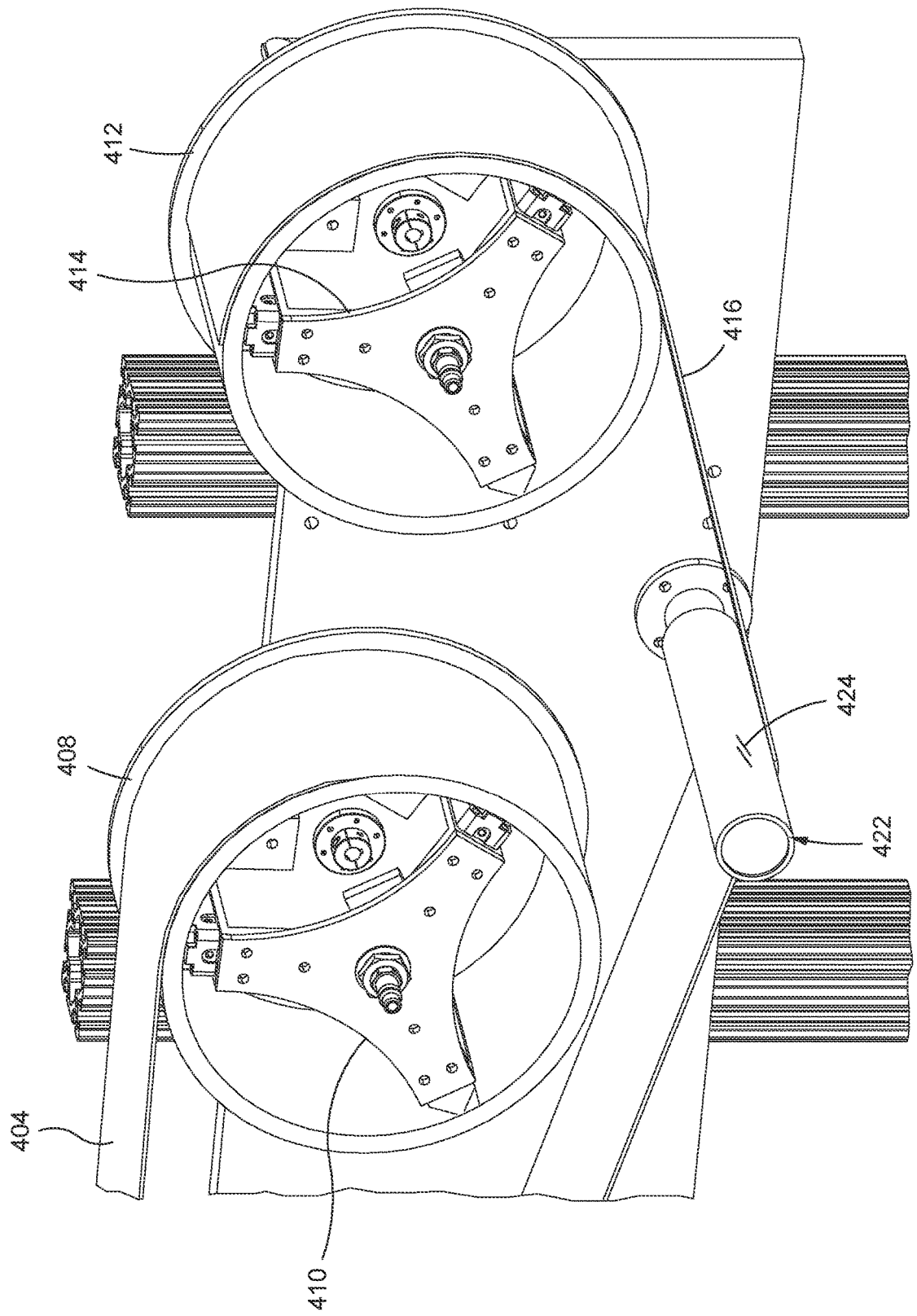
FIG. 33 is a perspective view of the portion of the adhesion machine identified by reference numeral 33 of FIG. 28, and illustrating an example of a tension-measuring device configured to measure tension load in the backed cross-ply prepreg prior to winding onto the cross-ply material collection drum.

Referring to FIGS. 28-29 and 33, the adhesion machine 400 includes a backing material chuck 410 configured to support a backing material drum 408. The backing material drum 408 supports a roll of the backing material 404. The backing material 404 is spooled off of the backing material drum 408, and is fed through the adhesion machine 400 at the same speed as the conveyor belt 418. The adhesion machine 400 further includes a cross-ply material collection chuck 414 configured to support a cross-ply material collection drum 412. The cross-ply material collection drum 412 is configured to collect the backed cross-ply prepreg 416 resulting from the adhesion of the prepreg segments 150 to the backing material 404. The backing material chuck 410 and the cross-ply material collection chuck 414 each have a chuck servomotor 118 (FIG. 1) for rotatably driving the backing material chuck 410 and the cross-ply material collection chuck 414.

Figure 31:
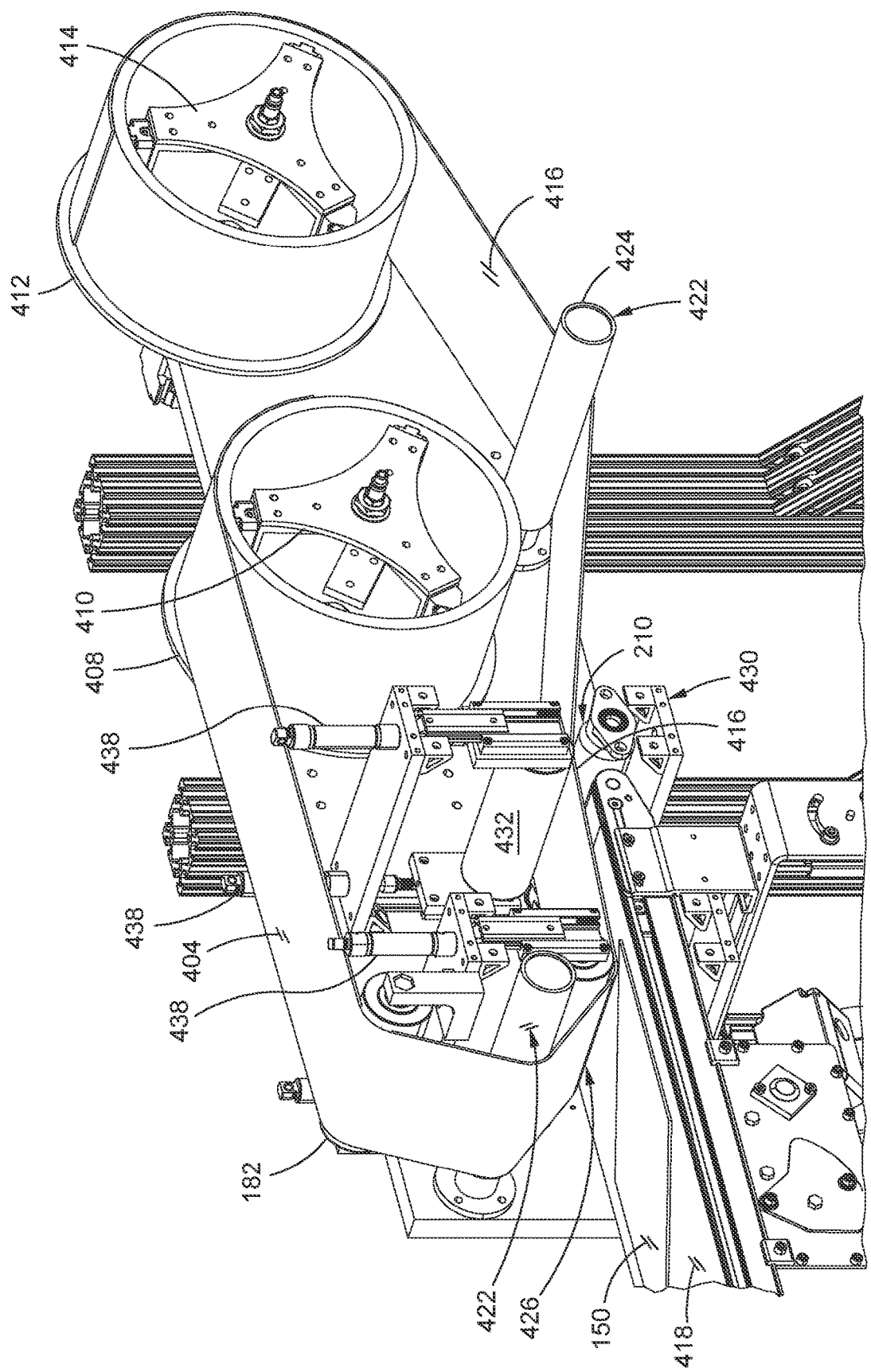
FIG. 31 is a perspective view of the adhesion machine showing an example of a backing material drum containing a roll of backed material, which is shown threaded through the adhesion machine, and further illustrating a cross-ply material collection drum for collecting the backed cross-ply prepreg resulting from the adhesion of the prepreg segments to the backing material.

Referring to FIG. 31, the adhesion machine 400 may include at least one idler roller 182 for redirecting the backing material 404 as it is spooled off of the backing material drum 408. Although not shown, the idler roller 182 may include a pair of circumferential alignment ridges spaced apart by a distance equivalent to the width of the backing material 404. As mentioned above with regard to the rollers of the cutting machine 110, the circumferential alignment ridges on the idler roller 182 of the adhesion machine 400 provide a means for maintaining the alignment of the backing material 404 with the prepreg segments 150 on the conveyor belt 418, thereby preventing the prepreg segments 150 from overhanging the edges of the backing material 404.

Figure 30:
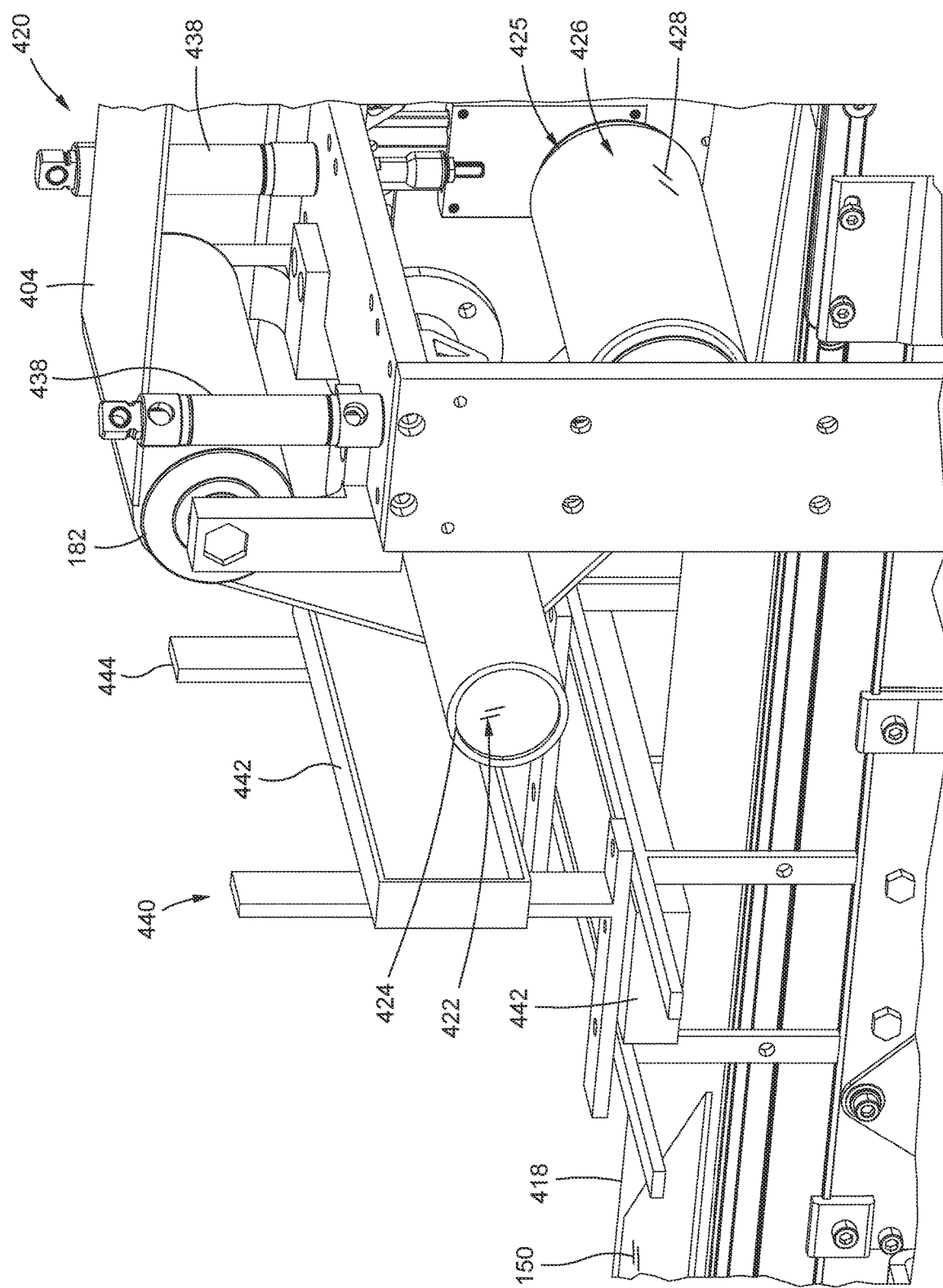
FIG. 30 is an enlarged view of the portion of the adhesion machine identified by reference numeral 30 of FIG. 28, and illustrating an example of a heating device configured to heat the backing material and/or the prepreg segments.
Figure 32:
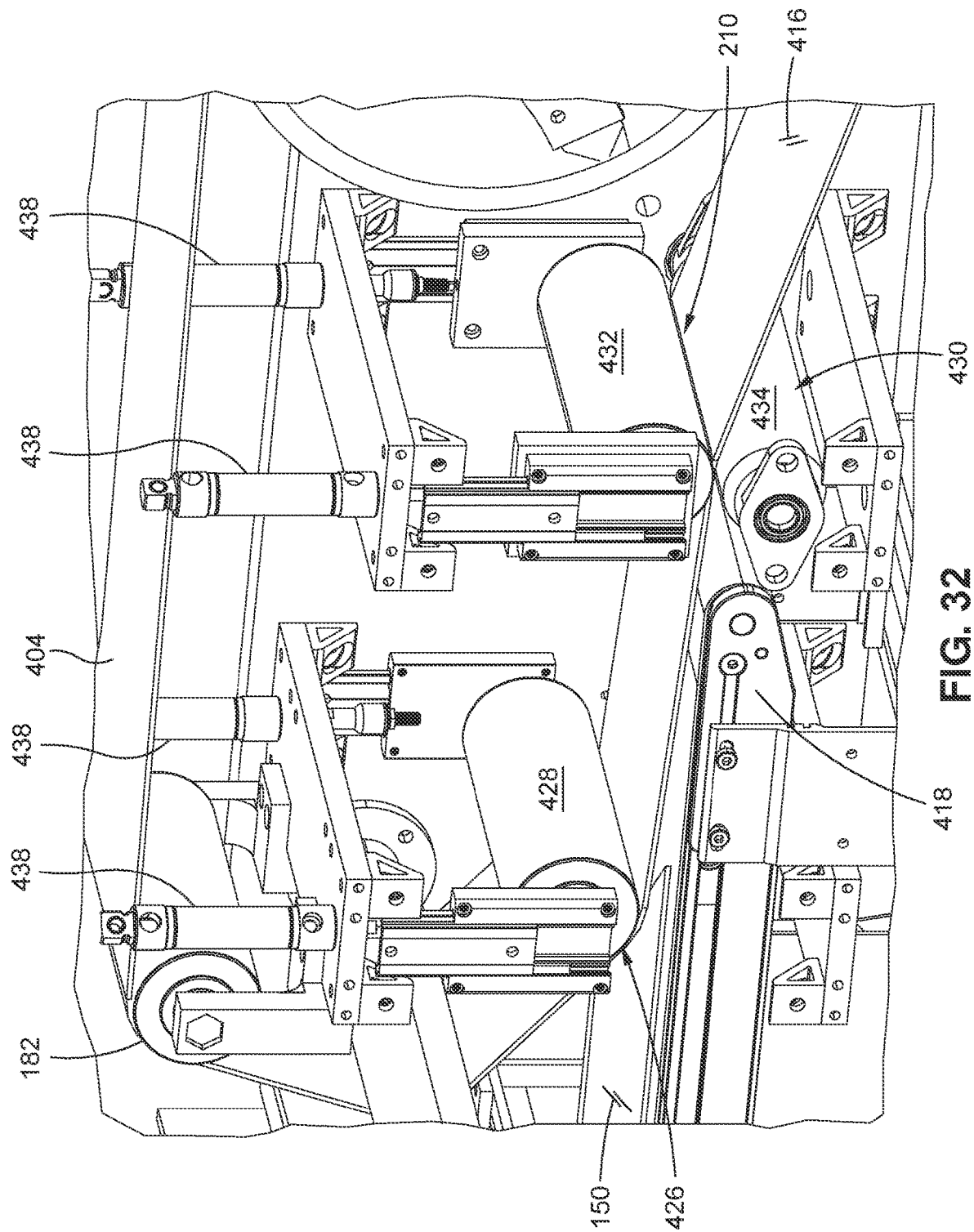
FIG. 32 is a perspective view of the portion of the adhesion machine identified by reference numeral 32 of FIG. 28, and illustrating an initial compaction stage and a secondary compaction stage configured to apply compaction pressure for curing the prepreg segments to the backing material.

Referring to FIGS. 30-32, the manufacturing system 100 includes at least one compaction stage 425 configured to compact the backing material 404 against the prepreg segments 150 for transferring the prepreg segments 150 to the backing material 404. For example, FIG. 32 shows an initial compaction stage 426 and a secondary compaction stage 430, each of which is configured to apply compaction pressure to the prepreg segments 150 against the backing material 404. In FIG. 31-32, several of the structural supports (e.g., see FIGS. 28-30) on one side of the initial compaction stage 426 and the secondary compaction stage 430 have been removed to better illustrate the components of the compaction stages 426, 430.

In FIGS. 30-32, the initial compaction stage 426 is located upstream of a downstream end of the conveyor belt 418. The initial compaction stage 426 has an initial compaction roller 428 configured to apply an initial compaction pressure to the backing material 404 against the prepreg segments 150 on the conveyor belt 418. The initial compaction stage 426 includes a pair of compaction actuators 438 (e.g., linear pneumatic actuators) located respectively on opposing ends of the initial compaction roller 428, for vertically applying compaction pressure of the initial compaction roller 428 against the prepreg segments 150 supported on the conveyor belt 418.

Referring to FIG. 32, the secondary compaction stage 430 is located downstream of the downstream end of the conveyor belt 418. The secondary compaction stage 430 has an upper compaction roller 432 and a lower compaction roller 434 vertically positioned relative to each other to define a roller interface 210. The vertical positioning of the upper compaction roller 432 relative to the lower compaction roller 434 negates the possibility of a horizontal force that may induce a horizontal component that would otherwise cause slipping at the interface between the prepreg segments 150 and the backing material 404.

The secondary compaction stage 430 includes a pair of compaction actuator 438 (e.g., linear pneumatic actuators) located respectively on opposing ends of the upper compaction roller 432, for vertically moving the upper compaction roller 432 toward and away from the lower compaction roller 434 for adjusting the size of the gap at the roller interface 210. The roller interface 210 receives the backed cross-ply prepreg 416 from the initial compaction stage 426, and applies a secondary compaction pressure of the prepreg segments 150 against the backing material 404 in a manner that increases the adhesion of the prepreg segments 150 to the backing material 404. The initial compaction roller 428 of the initial compaction stage 426, and the upper and lower compaction rollers 432, 434 of the secondary compaction stage 430 may have an outer surface formed of elastomeric material such as rubber (e.g., EPDM) to accommodate the potential non-uniform application of compaction force, and may thereby avoid damaging the prepreg segments 150 during compaction against the backing material 404.

Advantageously, the initial compaction stage 426 and the secondary compaction stage 430 provide two separate locations where the prepreg segments 150 are compacted against the backing material 404. In this regard, the two separate compaction stages 425 double the dwell time during which the prepreg segments 150 and backing material 404 are under compaction, thereby reducing the need for excessive compaction at any one of the compaction stages, and correspondingly reducing the potential for damage to the prepreg material. Furthermore, locating the secondary compaction stage 430 downstream of the conveyor belt 418 addresses the potential for the prepreg segments 150 to lose adhesion from the backing material 404 after the prepreg segments 150 release from the vacuum of the conveyor belt 418. In this regard, the secondary compaction stage 430 ensures that the prepreg segments 150 remain adhered to the backing material 404 as the backed cross-ply prepreg 416 is wound onto the cross-ply material collection drum 412. In addition, two separate compacting stages 425 provide a means for varying the compaction pressure applied at the initial compaction stage 426 and the secondary compaction stage 430. In this regard, the magnitude of the initial compaction force applied by the initial compaction roller 428 may be limited as a result of deflection of the structure of the conveyor belt 418. In such case, the secondary compaction stage 430 may apply an increased amount of compaction pressure to compensate for reduced compaction pressure at the initial compaction stage 426.

In FIG. 32, the lower compaction roller 434 is rotatably driven by a compaction roller servomotor 436 (FIG. 1) for pulling the backing material 404 through the adhesion station 420. The compaction roller servomotor 436 sets the speed at which the backing material 404 is drawn through the adhesion machine 400, which is equivalent to the speed of the conveyor belt 418, to thereby negate the potential for slippage at the interface between the prepreg segments 150 and the backing material 404, which may otherwise compromise the quality of the backed cross-ply prepreg 416. Although not shown, the backing material chuck 410 may include a brake that is configured to halt rotation of the backing material drum 408 if the secondary compaction stage 430 ceases to pull the backing material 404 through the adhesion station 420.

Referring to FIGS. 28-30, the adhesion machine 400 further include one or more heating devices 440 configured to heat the backing material 404 and/or the prepreg segments 150, as a means for increasing the adhesion of the prepreg segments 150 to the backing material 404. In the example shown, the adhesion machine 400 includes one or more heating devices 440 supported on a heating device support frame 444. The heating devices 440 are located above the conveyor belt 418 and upstream of the adhesion station 420. The heating devices 440 are configured to heat the prepreg segments 150 as a means to increase the tack of the resin in the prepreg segments 150 and/or slightly reduce the resin viscosity, all of which facilitates adhesion to the backing material 404.

In one example, the heating devices 440 are infrared emitters 442 configured as infrared heater bulbs. The infrared emitters 442 are located at a spaced distance away from the prepreg segments 150 and the backing material 404, to thereby avoid contamination that would otherwise occur using heating devices that require direct contact with the prepreg segments 150 or the backing material 404. Advantageously, infrared emitters 442 allow for precise control of the heat applied to the prepreg segments 150 and backing material 404 to avoid damage to the prepreg segments 150 or the backing material 404. Furthermore, infrared heaters allow for focusing heat accurately on the surfaces toward which they are aimed, thereby avoiding the heating of nearby components that may result in adverse effects, such as excessive resin buildup on indirectly heated components. In the example shown, the adhesion machine 400 includes a first ceramic infrared heater facing downwardly toward the prepreg segments 150 on the conveyor belt 418, and a second ceramic infrared heater facing horizontally toward the backing material 404 prior to contact with the prepreg segments 150 on the conveyor belt 418.

Referring to FIGS. 30-31 and 33, the adhesion machine 400 includes at least one tension-measuring device 422 configured to measure tension load in the backing material 404 and/or in the backed cross-ply prepreg 416. In the example shown, the tension-measuring devices 422 each comprise a cantilevered load cell 424 which has a cylindrical surface configured to measure tension load based on a side force applied to the cylindrical surface. For example, as shown in FIGS. 29-31, the adhesion machine 400 includes a load cell 424 between the idler roller 182 and the first compaction roller for measuring tension in the backing material 404, after spooling off of the backing material drum 408 and prior to making contact with the prepreg segments 150. FIGS. 28-29, 31, and 33 show a load cell 424 between the secondary compaction stage 430 and the cross-ply material collection drum 412 for measuring tension in the backed cross-ply prepreg 416 prior to winding onto the cross-ply material collection drum 412.

Each load cell 424 is configured to transmit tension measurements to a controller 102, which uses the tension measurements to control the torque load of the drums, as a means for maintaining tension load in the backing material 404 and in the backed cross-ply prepreg 416 within predetermined ranges. For example, the controller 102 uses the tension measurements from the load cell 424 between the idler roller 182 and the first compaction roller, to control the chuck servomotor 118 of the backing material chuck 410 to adjust the torque load on the backing material drum 408 in a manner maintaining the tension load on the backing material 404 within a predetermined load range. The controller 102 uses the tension measurements from the load cell 424 between the secondary compaction stage 430 and the backed cross-ply material collection drum 412 to control the chuck servomotor 118 of the cross-ply material collection chuck 414 to adjust the torque load on the cross-ply material collection drum 412 in a manner maintaining the tension load on the backed cross-ply prepreg 416 within a predetermined load range (e.g., 25-30 pounds of force).

Figure 34:
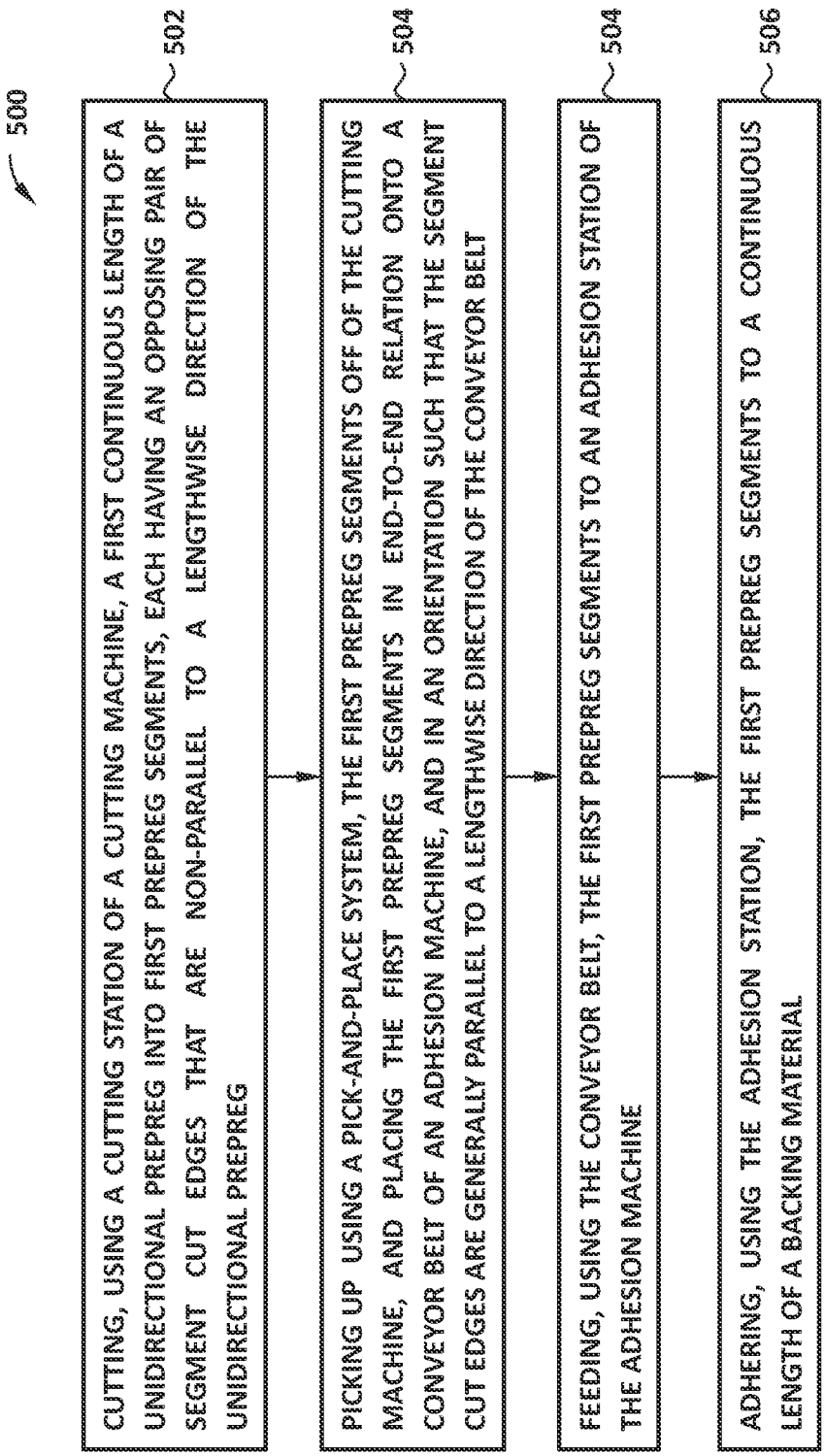
FIG. 34 is a flowchart of operations included in a method of manufacturing a continuous length of a backed cross-ply prepreg.

Referring to FIG. 34, shown is a flowchart of operations included in a method 500 of manufacturing a roll of a continuous length of a backed cross-ply prepreg 416. The method 500 includes supporting a first continuous length of unidirectional prepreg 128 (e.g., unidirectional prepreg tape) on a backed unidirectional prepreg drum 114. As mentioned above, the first continuous length of unidirectional prepreg 128 is backed by a backing layer 126 such as a backing paper or a polymeric film. The method includes separating the backing layer 126 from the first continuous length of unidirectional prepreg 128 while feeding the unidirectional prepreg 128 into the cutting station 230. In addition, the method includes collecting, on the backing layer collection drum 132, the backing layer 126 as the backing layer 126 is peeled off of the first continuous length of unidirectional prepreg 128.

The method 500 further comprises receiving the unidirectional prepreg 128 within a roller interface 210 of opposing nip rollers 202 of a nip roller assembly 200, and feeding, using the nip rollers 202, a lengthwise section of the unidirectional prepreg 128 into the cutting station 230 of the cutting machine 110. As mentioned above, the nip roller assembly 200 has an upper nip roller 204 and a lower nip roller 206 defining the roller interface 210. The upper nip roller 204 is movable, via a nip roller actuator 212, to adjust the gap of the roller interface 210 for receiving and clamping onto the unidirectional prepreg 128. The nip roller servomotor 208 rotatably drives the lower nip roller 206, causing the predetermined length of the unidirectional prepreg 128 to be fed into the cutting station 230 for cutting into a prepreg segment 150. The method 500 further comprises applying a substantially constant tension load on the unidirectional prepreg 128 as the nip roller assembly 200 feeds the unidirectional prepreg 128 into the cutting station 230.

The substantially constant tension load in the unidirectional prepreg 128 is controlled by the pneumatic dancer assembly 180, which is located between the backed unidirectional prepreg drum 114 and the nip roller assembly 200.

As shown in FIGS. 8-9 and described above, the backing layer collection drum 132 may optionally be located proximate the cutting station 230, in contrast to the arrangement shown in FIGS. 1-5 in which the backing layer collection drum 132 is located immediately adjacent to the backed unidirectional prepreg drum 114. In FIGS. 8-9, the step of separating the backing layer 126 from the first continuous length of unidirectional prepreg 128 comprises, separating the backing layer 126 from the unidirectional prepreg 128 as the unidirectional prepreg 128 exits the nip roller assembly 200 prior to entering the cutting station 230. The backing layer 126 is collected on the backing layer collection drum 132, which is located downstream of the nip roller assembly 200 and upstream of the cutting station 230. As mentioned above, the arrangement shown in FIGS. 8-9 improves the stability and accuracy with which the unidirectional prepreg 128 is controlled while passing through the cutting machine 110.

Step 502 of the method 500 includes cutting, using the cutting station 230, the first continuous length of the unidirectional prepreg 128 into first prepreg segments 156. Each one of the first prepreg segments 156 has an opposing pair of segment cut edges 152 that are non-parallel to the lengthwise direction of the unidirectional prepreg 122. Step 502 of cutting the unidirectional prepreg 128 comprises cutting the unidirectional prepreg 128 such that the segment cut edges 152 are oriented at +45 degrees, −45 degrees, 90 degrees, or other angles, relative to the lengthwise direction of the unidirectional prepreg 128. Toward this end, step 502 of cutting the unidirectional prepreg 128 comprises locking, via a turntable 242 of the cutting station 230, the orientation of the cutting device 236 (e.g., a cutting wheel, an ultrasonic device) relative to the lengthwise direction of the unidirectional prepreg 128. As described above, the turntable 242 has detents 244 for locking the orientation of the cutting device 236. Step 502 further includes translating the cutting device 236 across a width of the unidirectional prepreg 128 to cut the unidirectional prepreg 128 into the prepreg segments 150. In the example shown, the cutting assembly 232 includes a cutting device actuator 240 configured as a pneumatic air slide for translating the cutting device 236 across the width of the unidirectional prepreg 128.

Step 502 of cutting the first continuous length of unidirectional prepreg 128 additionally comprises securing, via vacuum pressure, the unidirectional prepreg 128 to the cutting surface 250 of the cutting station 230. As described above, the cutting surface 250 is porous or has a plurality of pores that are fluidically coupled to a vacuum source. Each time the nip roller assembly 200 extends a predetermined length of unidirectional prepreg 128 into the cutting station 230, the vacuum source is activated to vacuum couple the prepreg to the cutting surface 250 for securing the unidirectional prepreg 128 in position during cutting by the cutting device 236.

The method includes using the prepreg clamps 274 to clamp onto opposing sides of the unidirectional prepreg 128, and apply tension to the unidirectional prepreg 128 via the clamp transporter actuator 280 (e.g., a linear pneumatic actuator) of the segment delivery system 270. Once tension is applied, vacuum pressure is then applied to the cutting surface 250 to secure the unidirectional prepreg 128 to the cutting surface 250, after which the clamp transporter actuator 280 is deactivated to halt the application of tension on the unidirectional prepreg 128. The cutting device 236 is then driven across the unidirectional prepreg 128 to result in a prepreg segment 150. After cutting the unidirectional prepreg 128, the prepreg clamps 274 remain clamped onto the prepreg segment 150, and vacuum pressure is deactivated at the cutting surface 250 to allow the prepreg segment 150 to be translated off of the cutting surface 250. In some examples, the cutting surface 250 may discharge compressed air from the pores or porous surface of the cutting surface 250, to urge the prepreg segment 150 away from the cutting surface 250, and promote the sliding translation of the prepreg segment 150 off of the cutting surface 250.

The method 500 further comprises transporting, using the segment delivery system 270, each prepreg segment 150 from the cutting surface 250 to the segment pickup location 286 for pickup by the pick-and-place system 300. As described above, the segment delivery system 270 is located immediately downstream of the cutting surface 250. Transporting each prepreg segment 150 comprises moving, via the clamp transporter actuator 280, the prepreg clamps 274 along a pair of linear guide rails 278, to thereby transport each prepreg segment 150 to the segment pickup location 286. Upon arrival at the segment pickup location 286, vacuum pressure is applied to the delivery system vacuum table 284 to secure the prepreg segment 150 in position at the segment pickup location 286, and the prepreg clamps 274 are then moved to the unclamped position. The clamp transporter actuator 280 then translates the prepreg clamps 274 back to the delivery system support table 282 in preparation for clamping another downstream portion of unidirectional prepreg 128 that is fed into the cutting station 230 by the nip roller assembly 200.

Step 504 of the method 500 includes sequentially picking up, using the pick-and-place system 300, the first prepreg segments 156 at the segment pickup location 286, and placing the first prepreg segments 156 in end-to-end relation onto the conveyor belt 418, and in an orientation such that the segment cut edges 152 are generally parallel to a lengthwise direction of the conveyor belt 418. In the example shown in the figures, step 504 of picking up the first prepreg segments 156 comprises picking up each prepreg segment 150 using a robotic arm 304 of a robotic device 302. However, in other examples not shown, the prepreg segments 150 may be picked up by an overhead gantry system, or other mechanisms capable of transferring the prepreg segments 150 from the cutting machine 110 to the adhesion machine 400.

In the example shown, step 504 of picking up the first prepreg segments 156 comprises vacuum coupling, using a vacuum plenum 308, each prepreg segment 150 to the robotic arm 304. As described above, the vacuum plenum 308 has a porous surface coupled to a vacuum source. Vacuum coupling of each prepreg segment 150 to the robotic arm 304 comprises positioning the vacuum plenum 308 over the prepreg segment 150 at the segment pickup location 286, and applying vacuum pressure to one or more vacuum zones 310, based on the shape of the prepreg segment 150. In the above-described example of FIGS. 21-23, the vacuum plenum 308 includes vacuum zones A, B, and C. As described above, each one of the vacuum zones 310 is independently fluidically coupled to a vacuum source, to enable independently providing vacuum pressure to any combination of vacuum zones 310 to enable vacuum engagement to different shapes of the prepreg segment 150.

To facilitate alignment of the vacuum end effector 306 with the prepreg segment 150 prior to pick up, the method 500 may include imaging, using a vision system (e.g., a camera—not shown), each prepreg segment 150 at the segment pickup location 286, and indexing the robotic arm 304 to the prepreg segment 150 based on the imaging, as described above. As an alternative to mounting on the robotic arm 304, the vision system may be mounted to the cutting machine 110 at a location above and/or below the segment pickup location 286. Additionally, a vision system (e.g., a camera) may be mounted to the adhesion machine 400 above the location where the prepreg segments 150 are placed on the conveyor belt 418.

Step 506 of the method 500 includes feeding, using the conveyor belt 418, the first prepreg segments 156 to the adhesion station 420 of the adhesion machine 400. As mentioned above, step 506 of feeding the first prepreg segments 156 to the adhesion station 420 comprises moving the conveyor belt 418 at a constant speed, and matching the speed of the pick-and-place system 300 (e.g., the vacuum end effector 306) to the speed of the conveyor belt 418 when placing a prepreg segment 150 on the conveyor belt 418. To prevent movement of the prepreg segments 150 once placed on the conveyor belt 418, step 506 of feeding the first prepreg segments 156 to the adhesion station 420 comprises vacuum coupling the first prepreg segments 156 to a vacuum conveyor belt.

Step 508 of the method 500 includes sequentially adhering, using the adhesion station 420, the first prepreg segments 156 to a continuous length of a backing material 404. Vacuum coupling of the first prepreg segments 156 to the conveyor belt 418 may prevent movement of the first prepreg segments 156 when being adhered to the backing material 404. Step 508 of adhering the first prepreg segments 156 includes spooling the backing material 404 off of the backing material drum 408, and feeding the backing material 404 over the conveyor belt 418. As the backing material 404 is spooled off of the backing material drum 408 and the prepreg segments 150 are adhered to the backing material 404, the method includes collecting the resulting backed cross-ply prepreg 416 onto the cross-ply material collection drum 412. As described above, the backing material drum 408, and the cross-ply material collection drum 412 are each rotatably driven by a chuck servomotor 118.

Step 508 of adhering the first prepreg segments 156 to the backing material 404 comprises compacting, using at least one compaction stage 425, the backing material 404 against the prepreg segments 150 in such a manner causing the prepreg segments 150 to adhere to the backing material 404, and resulting in a continuous length of backed cross-ply prepreg 416. In the example shown, compacting the backing material 404 against the prepreg segments 150 comprises applying an initial compaction pressure to the backing material 404 against the prepreg segments 150 supported on the conveyor belt 418. The initial compaction pressure is applied using an initial compaction roller 428 at an initial compaction stage 426 located upstream of the downstream end of the conveyor belt 418. Following the application of the initial compaction pressure, the method additionally includes applying a secondary compaction pressure of the backing material 404 and the prepreg segments 150 against each other. The secondary compaction pressure is applied on the backed cross-ply prepreg 416 which his sandwiched between an upper compaction roller 432 and a lower compaction roller 434 at a secondary compaction stage 430 located downstream of the downstream end of the conveyor belt 418, as described above.

The method 500 further includes rotatably driving the upper compaction roller 432 and/or the lower compaction roller 434 to pull the backing material 404 through the adhesion station 420. As a safety precaution, method 500 may comprise halting, using a brake of the backing material chuck 410, rotation of the backing material drum 408 if the secondary compaction stage 430 ceases to pull the backing material 404 through the adhesion station 420. In the example shown, the lower compaction roller 434 is rotatably driven by a compaction roller servomotor 436 configured to pull the backing material 404 through the adhesion station 420 at the same speed as the conveyor belt 418. By applying compaction pressure at two separate compaction stages, the total amount of dwell time during which the prepreg segments 150 and backing material 404 are under compaction is doubled, relative to configurations (not shown) where a single compaction stage is relied upon to compact the prepreg segments 150 against the backing material 404.

To facilitate adhesion of the prepreg segments 150 to the backing material 404, the method 500 further comprises heating, using at least one heating device 440, the backing material 404 and/or the prepreg segments 150 prior to compaction. Heating the backing material 404 is performed using one or more heating devices 440 located above the conveyor belt 418. In one example, heating the backing material 404 may include heating the backing material 404 using one or more infrared emitters 442. For example, a first ceramic infrared heater may face downwardly toward the prepreg segments 150 on the conveyor belt 418. A second ceramic infrared heater may face horizontally toward the backing material 404 prior to contact with the prepreg segments 150 on the conveyor belt 418.

The method 500 further comprises measuring, using at least one tension-measuring device 422, tension load in the backing material 404 and/or tension load in the backed cross-ply prepreg 416. For example, tension load in the backing material 404 may be measured using a load cell 424 having a cylindrical outer surface configured to bear against the backing material 404 as it spools off of the backing material drum 408 prior to contacting the prepreg segments 150. Tension load in the backed cross-ply prepreg 416 may be measured using a similar load cell 424 located between the secondary compaction stage 430 and the cross-ply material collection drum 412. Advantageously, the tension-measuring devices 422 allow the controller 102 to control the chuck servomotors 118 to adjust the amount of torque load on the backing material drum 408 and the cross-ply material collection drum 412, as a means to maintain the tension load within predetermined limits.

Referring to FIGS. 35-49, shown are schematic illustrations of the processes for manufacturing different orientation combinations of the backed cross-ply prepreg 416. FIGS. 35-37 represent the processes for manufacturing 3 different orientations of a backed cross-ply prepreg 416 that has a single layer of prepreg material supported on a backing layer 126 (i.e., a single layer of cross-directional prepreg material on a backing layer 126). FIGS. 38-49 represent the processes for manufacturing 12 different orientations of a backed cross-ply prepreg 416 that has two layers of prepreg material supported on a backing layer 126, and in which at least one of the layers of prepreg material comprises a cross-directional prepreg material (i.e., the reinforcing fibers are non-parallel to the lengthwise direction of the backed cross-ply prepreg 416).

In FIGS. 35-37, each of the 3 processes involves the above-described steps 502, 504, and 506. Step 508 of the process comprises adhering the first prepreg segments 156 to a continuous length of a backing layer 126 that is devoid of prepreg material. FIG. 35 shows prepreg segments 150 being cut from the first continuous length of unidirectional prepreg 128 via the cutting machine 110, re-oriented via the pick-and-place system 300, and placed on the adhesion machine 400 as 90-degree prepreg segments 160, after which compaction pressure is applied by one or more compaction stages 425 for adhering the 90-degree prepreg segments 160 to the backing layer 126, and resulting in a 90-degree backed prepreg 450. FIG. 36 shows −45-degree prepreg segments 162 being cut from a first continuous length of unidirectional prepreg 128, re-oriented and placed on the adhesion machine 400, and then adhered via the compaction stages to a backing layer 126, and resulting in a −45-degree backed prepreg 452. FIG. 37 shows +45-degree prepreg segments 164 being cut from a first continuous length of unidirectional prepreg 128, re-oriented and placed on the adhesion machine 400, and then adhered via the compaction stages to a backing layer 126, and resulting in a +45-degree backed prepreg 454.

Referring to FIGS. 38-49, each of the 12 respectively represented processes involves the above-described steps 502, 504, and 506. FIGS. 38-40 represent processes in which step 508 comprises adhering, using the adhesion station 420, the first prepreg segments 156 to a continuous length of a prepreg-backing assembly 406, which comprises prepreg material backed by a backing layer 126. FIG. 38 shows prepreg segments 150 being cut from a first continuous length of unidirectional prepreg 128 via the cutting machine 110, re-oriented via the pick-and-place system 300, and placed on the conveyor belt 418 of the adhesion machine 400 as 90-degree prepreg segments 160, after which compaction pressure is applied by one or more compactions stages 425 for adhering the 90-degree prepreg segments 160 to a second continuous length of a unidirectional prepreg 130 (i.e., 0-degree prepreg) backed by a backing layer 126, and resulting in a 0/90-degree backed prepreg 456, wherein the 0-degree prepreg is sandwiched between the backing layer 126 and the 90-degree prepreg. FIG. 39 shows −45-degree prepreg segments 162 being cut from a first continuous length of unidirectional prepreg 128, re-oriented and placed on the conveyor belt 418, and then adhered via the compaction stages to a second continuous length of a unidirectional prepreg 130 backed by a backing layer 126, and resulting in a 0/−45-degree backed prepreg 458, wherein the 0-degree prepreg is sandwiched between the backing layer 126 and the −45-degree prepreg. FIG. 40 shows +45-degree prepreg segments 164 being cut from a first continuous length of unidirectional prepreg 128, and adhered to a second continuous length of a unidirectional prepreg 130 backed by a backing layer 126, and resulting in a 0/+45-degree backed prepreg 460, wherein the 0-degree prepreg is sandwiched between the backing layer 126 and the +45-degree prepreg.

FIGS. 41-46 represent processes in which step 508 comprises adhering, using the adhesion station 420, the first prepreg segments 156 to a continuous length of a prepreg-backing assembly 406, which comprises a backed cross-ply prepreg 416 (i.e., an intermediate backed cross-ply prepreg 480) previously manufactured by the manufacturing system 100. The backed cross-ply prepreg 416 to which the first prepreg segments 156 are adhered comprises a series of second prepreg segments 158 on a backing layer 126. In this regard, FIGS. 41-46 represent processes for which a series of first prepreg segments 156 are adhered to a series of second prepreg segments 158 of a previously-manufactured backed cross-ply prepreg 416, to result in a final backed cross-ply prepreg 482. In each example, the fiber angles of the first prepreg segments 156 are non-parallel to the fiber angles of the second prepreg segments 158.

FIG. 41 shows 90-degree prepreg segments 160 being cut from a first continuous length of unidirectional prepreg 128, re-oriented, and adhered to a series of −45-degree prepreg segments 162 backed by a backing layer 126 (i.e., the intermediate backed cross-ply prepreg 480), and resulting in a −45/90-degree backed prepreg 462 (i.e., the final backed cross-ply prepreg 482), wherein the −45-degree prepreg is sandwiched between the backing layer 126 and the 90-degree prepreg. FIG. 42 shows −45-degree prepreg segments 162 being cut from a first continuous length of unidirectional prepreg 128, and adhered to a series of 90-degree prepreg segments 160 backed by a backing layer 126, and resulting in a 90/−45-degree backed prepreg 464, wherein the 90-degree prepreg is sandwiched between the backing layer 126 and the −45-degree prepreg. FIG. 43 shows −45-degree prepreg segments 162 being cut from a first continuous length of unidirectional prepreg 128, and adhered to a series of +45-degree prepreg segments 164 backed by a backing layer 126, and resulting in a +45/−45-degree backed prepreg 466, wherein the +45-degree prepreg is sandwiched between the backing layer 126 and the −45-degree prepreg.

FIG. 44 shows +45-degree prepreg segments 164 being cut from a first continuous length of unidirectional prepreg 128, and adhered to a series of −45-degree prepreg segments 162 backed by a backing layer 126 (i.e., the intermediate backed cross-ply prepreg 480), and resulting in a −45/+45-degree backed prepreg 468 (i.e., the final backed cross-ply prepreg 482), wherein the −45-degree prepreg is sandwiched between the backing layer 126 and the +45-degree prepreg. FIG. 45 shows +45-degree prepreg segments 164 being cut from a first continuous length of unidirectional prepreg 128, and adhered to a series of 90-degree prepreg segments 160 backed by a backing layer 126, and resulting in a 90/+45-degree backed prepreg 470, wherein the 90-degree prepreg is sandwiched between the backing layer 126 and the +45-degree prepreg. FIG. 46 shows 90-degree prepreg segments 160 being cut from a first continuous length of unidirectional prepreg 128, and adhered to the continuous length of a series of +45-degree prepreg segments 164 backed by a backing layer 126, and resulting in a +45/90-degree backed prepreg 472, wherein the +45-degree prepreg is sandwiched between the backing layer 126 and the 90-degree prepreg.

FIGS. 47-49 represent processes in which, after performing step 508 of adhering the first prepreg segments 156 to a continuous length of backing material 404 devoid of other prepreg material, the method 500 further comprises feeding a second continuous length of unidirectional prepreg 130 to the adhesion station 420, and adhering the second continuous length of unidirectional prepreg 130 to the first prepreg segments 156 on the continuous length of backing material 404 (i.e., the intermediate backed cross-ply prepreg 480). The second continuous length of unidirectional prepreg 130 is fed through the cutting station 230 (without cutting), and into the adhesion station 420. Manufacturing the orientation combinations that are shown in FIGS. 47-49 requires that the cutting machine 110 is aligned with the adhesion machine 400, as shown in FIGS. 1-3. In this regard, the direction of movement of the second continuous length of unidirectional prepreg 130 through the cutting machine 110 is aligned with the direction of movement of the conveyor belt 418.

The processes represented by FIGS. 47-49 require mounting, on the adhesion machine 400, a roll of backed cross-ply prepreg comprising the first prepreg segments 156 on a backing layer 126 (i.e., an intermediate backed cross-ply prepreg 480). In addition, the processes require mounting, on the cutting machine 110, a roll of a second continuous length of unidirectional prepreg 130, and drawing the second continuous length of unidirectional prepreg 130 through the cutting machine 110, without cutting into prepreg segments 150. Instead, the processes of FIGS. 47-49 include feeding, using the conveyor belt 418, the second continuous length of unidirectional prepreg 130 onto the conveyor belt 418 of the adhesion station 420, while drawing over the conveyor belt 418, the continuous length of the first prepreg segments 156 on the backing layer 126. The processes also include adhering the second continuous length of unidirectional prepreg 130 to the continuous length of the first prepreg segments 156 on the backing layer 126, thereby resulting in two layers of prepreg segments 150 on the backing layer 126 (i.e., the final backed cross-ply prepreg 482).

FIG. 47 shows a second continuous length of unidirectional prepreg 130 (i.e., 0-degree prepreg) being adhered to a continuous length of a backed cross-ply prepreg 416 comprising a series of 90-degree prepreg segments 160 backed by a backing layer 126, and resulting in a 90/0-degree backed prepreg 474, wherein the 90-degree prepreg is sandwiched between the backing layer 126 and the 0-degree prepreg. FIG. 48 shows a second continuous length of unidirectional prepreg 130 being adhered to a continuous length of a backed cross-ply prepreg 416 comprising a series of −45-degree prepreg segments 162 backed by a backing layer 126, and resulting in a −45/0-degree backed prepreg 476, wherein the −45-degree prepreg is sandwiched between the backing layer 126 and the 0-degree prepreg. FIG. 49 shows a second continuous length of unidirectional prepreg 130 being adhered to a continuous length of a backed cross-ply prepreg 416 comprising a series of +45-degree prepreg segments 164 backed by a backing layer 126, and resulting in a +45/0-degree backed prepreg 478, wherein the +45-degree prepreg is sandwiched between the backing layer 126 and the 0-degree prepreg.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A method of manufacturing a backed cross-ply prepreg, comprising:
cutting, using a cutting station of a cutting machine, a first continuous length of a unidirectional prepreg into first prepreg segments, each having an opposing pair of segment cut edges that are non-parallel to a lengthwise direction of the unidirectional prepreg;
vertically lifting, using a pick-and-place system, the first prepreg segments off of the cutting machine, rotating the first prepreg segments into an orientation such that the segment cut edges are generally parallel to a lengthwise direction of a conveyor belt of an adhesion machine, and vertically lowering the first prepreg segments in end-to-end relation onto the conveyor belt;
feeding, using the conveyor belt, the first prepreg segments to an adhesion station of the adhesion machine; and
adhering, using the adhesion station, the first prepreg segments to a continuous length of a backing material.

2. The method of claim 1, further comprising:
feeding, using a nip roller assembly, the first continuous length of the unidirectional prepreg into the cutting station.

3. The method of claim 2, further comprising:
applying, using a pneumatic dancer assembly, a constant tension load on the first continuous length of the unidirectional prepreg as the nip roller assembly feeds the first continuous length of the unidirectional prepreg through the cutting machine.

4. The method of claim 1, wherein vertically lifting, using the pick-and-place system, the first prepreg segments off of the cutting machine comprises:
picking up, using a robotic device, the first prepreg segments off of the cutting machine.

5. The method of claim 4, wherein picking up, using the robotic device, the first prepreg segments off of the cutting machine comprises:
picking up the first prepreg segments using a vacuum end effector of the robotic device.

6. The method of claim 5, wherein picking up the first prepreg segments using the vacuum end effector comprises:
vacuum coupling the first prepreg segments to two or more vacuum zones of the vacuum end effector, and the vacuum zones are independently activated with vacuum pressure.

7. The method of claim 5, further comprising:
moving the vacuum end effector at a same speed as the conveyor belt when placing a prepreg segment of the prepreg segments on the conveyor belt.

8. The method of claim 1, further comprising:
vacuum coupling the first prepreg segments to the conveyor belt upon placement by the pick-and-place system.

9. The method of claim 1, further comprising:
placing the first prepreg segments in non-overlapping relation to each other on the conveyor belt, and at a maximum gap of 0.10 inch between adjacent prepreg segments.

10. The method of claim 1, further comprising:
orienting the first prepreg segments on the conveyor belt such that fiber angles of the prepreg segments are parallel to each other.

11. The method of claim 1, wherein adhering the first prepreg segments to the backing material comprises:
adhering, using the adhesion station, the first prepreg segments to a continuous length of a backing layer that is devoid of prepreg material.

12. The method of claim 1, wherein adhering the first prepreg segments to the backing material comprises:
adhering, using the adhesion station, the first prepreg segments to a continuous length of a prepreg-backing assembly, and the prepreg-backing assembly comprises prepreg material backed by a backing layer.

13. The method of claim 12, wherein adhering the first prepreg segments to the prepreg-backing assembly comprises:
adhering, using the adhesion station, the first prepreg segments to a continuous length of a backed cross-ply prepreg, and the backed cross-ply prepreg comprises an end-to-end series of second prepreg segments on a backing layer.

14. The method of claim 1, wherein after adhering the first prepreg segments to the continuous length of the backing material, the method further comprising:
feeding, using the conveyor belt, a second continuous length of unidirectional prepreg to the adhesion station; and
adhering, using the adhesion station, the second continuous length of unidirectional prepreg to the first prepreg segments on a continuous length of backing layer.

15. The method of claim 14, further comprising:
positioning the cutting machine upstream of the adhesion machine, in a manner such that a direction of movement of unidirectional prepreg through the cutting machine is aligned with the direction of movement of the conveyor belt;
mounting, on the adhesion machine, a roll of a backed cross-ply prepreg comprising the first prepreg segments on a continuous length of a backing layer;
mounting, on the cutting machine, a roll of a second continuous length of unidirectional prepreg;
drawing the second continuous length of unidirectional prepreg through the cutting machine, without cutting the second continuous length of the unidirectional prepreg into prepreg segments;
feeding, using the conveyor belt, the second continuous length of unidirectional prepreg to the adhesion station, while drawing over the conveyor belt the continuous length of the first prepreg segments on the backing layer; and
adhering, using the adhesion station, the second continuous length of unidirectional prepreg to the continuous length of the first prepreg segments on the backing layer, thereby resulting in two layers of prepreg segments on the backing layer.

16. The method of claim 1, wherein cutting the unidirectional prepreg comprises:
cutting, via the cutting station, the continuous length of the unidirectional prepreg into prepreg segments each having segment cut edges that are oriented at one of +45 degrees, −45 degrees, or 90 degrees, relative to the lengthwise direction of the unidirectional prepreg.

17. The method of claim 16, wherein cutting the unidirectional prepreg comprises:
locking, via a turntable included with the cutting station, an orientation of a cutting device relative to the lengthwise direction of the unidirectional prepreg; and
translating the cutting device across a width of the unidirectional prepreg and along the orientation locked by the turntable.

18. The method of claim 17, further comprising:
transporting, using a segment delivery system located adjacent to the cutting station, each prepreg segment from the cutting device to a segment pickup location where the prepreg segment is picked up by the pick-and-place system.

19. The method of claim 1, further comprising:
positioning the cutting machine in alignment with the adhesion machine such that a direction of movement of the unidirectional prepreg through the cutting machine is aligned with the direction of movement of the conveyor belt.

20. A method of manufacturing a backed cross-ply prepreg, comprising:
cutting, using a cutting machine, a first continuous length of a unidirectional prepreg into first prepreg segments, each having an opposing pair of segment cut edges that are non-parallel to a lengthwise direction of the unidirectional prepreg;
vertically lifting, using a pick-and-place system, the first prepreg segments off of the cutting machine, rotating the first prepreg segments into an orientation such that the segment cut edges are generally parallel to a lengthwise direction of a conveyor belt of an adhesion machine, and vertically lowering the first prepreg segments in end-to-end relation onto the conveyor belt;
feeding, using the conveyor belt, the first prepreg segments to an adhesion station of the adhesion machine;
adhering, using the adhesion station, the first prepreg segments to a continuous length of a backing layer, to thereby form a continuous length of an intermediate backed cross-ply prepreg; and
adhering, using the adhesion station, either a second continuous length of a unidirectional prepreg or an end-to-end series of second prepreg segments to the first prepreg segments of the intermediate backed cross-ply prepreg, thereby resulting in a final backed cross-ply prepreg.

* * * * *